United States Patent
Sete et al.

(10) Patent No.: US 12,511,567 B2
(45) Date of Patent: Dec. 30, 2025

(54) CONTROLLING A TUNABLE FLOATING COUPLER DEVICE IN A SUPERCONDUCTING QUANTUM PROCESSING UNIT

(71) Applicant: Rigetti & Co, LLC, Berkeley, CA (US)

(72) Inventors: Eyob A. Sete, Walnut Creek, CA (US); Stefano Poletto, Orinda, CA (US); Riccardo Manenti, Berkeley, CA (US); Angela Q Chen, Oakland, CA (US); Shobhan Kulshreshtha, Berkeley, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 637 days.

(21) Appl. No.: 17/901,633

(22) Filed: Sep. 1, 2022

(65) Prior Publication Data

US 2022/0414517 A1    Dec. 29, 2022

Related U.S. Application Data

(63) Continuation of application No. PCT/US2021/020707, filed on Mar. 3, 2021.
(Continued)

(51) Int. Cl.
*G06N 10/40* (2022.01)
*G06N 10/20* (2022.01)
(Continued)

(52) U.S. Cl.
CPC ............ *G06N 10/40* (2022.01); *G06N 10/20* (2022.01); *G06N 10/70* (2022.01); *G06N 10/80* (2022.01)

(58) Field of Classification Search
USPC ........................................................ 716/100
See application file for complete search history.

(56) References Cited

U.S. PATENT DOCUMENTS

| 2004/0028598 A1 | 2/2004 | Harneit et al. |
| 2015/0358022 A1 | 12/2015 | Mcdermott et al. |

(Continued)

FOREIGN PATENT DOCUMENTS

| KR | 20190077518 | 7/2019 |
| WO | 2015178990 A2 | 11/2015 |
| WO | 2021178562 | 9/2021 |

OTHER PUBLICATIONS

EPO, Extended European Search Report issued in Application No. 21764100.0 on Mar. 13, 2024, 6 pages.
(Continued)

*Primary Examiner* — Brian Ngo
(74) *Attorney, Agent, or Firm* — Henry Patent Law Firm PLLC

(57) ABSTRACT

In a general aspect, a superconducting quantum processing unit includes a first qubit device, a second qubit device, and a tunable floating coupler device coupled between the first and second qubit devices. Values of a coupling strength of the first and second qubit devices at a plurality of operating points of the tunable floating coupler device are measured. The operating points correspond to respective values of a magnetic flux applied to the tunable floating coupler device. Based on the measured values of the coupling strength, a parking value of the magnetic flux is identified. The parking value of the magnetic flux corresponds to a magnitude of the coupling strength being less than or equal to a threshold value; the threshold value is associated with a target gate fidelity for the superconducting quantum processing unit.

19 Claims, 24 Drawing Sheets

Related U.S. Application Data

(60) Provisional application No. 63/141,348, filed on Jan. 25, 2021, provisional application No. 62/984,717, filed on Mar. 3, 2020.

(51) Int. Cl.
    *G06N 10/70*    (2022.01)
    *G06N 10/80*    (2022.01)

(56) References Cited

U.S. PATENT DOCUMENTS

| | | | |
|---|---|---|---|
| 2017/0193388 A1 | 7/2017 | Filipp et al. | |
| 2018/0330267 A1 | 11/2018 | Rigetti et al. | |
| 2019/0007051 A1* | 1/2019 | Sete | H03K 19/195 |
| 2022/0374755 A1* | 11/2022 | Didier | G06N 10/40 |

OTHER PUBLICATIONS

Li, X., et al., "A tunable coupler for suppressing adjacent superconducting qubit coupling", arXiv:1912.10721v2, Dec. 23, 2019, 13 pages.

WIPO, International Search Report and Written Opinion mailed Jun. 18, 2021, in PCT/US2021/020707, 9 pgs.

Arute, et al., "Quantum supremacy using a programmable superconducting processor", Nature, 574, Oct. 24, 2019, 7 pgs.

Arute, et al., "Supplementary Information for: Quantum supremacy using a programmable superconducting processor", arXiv:1910.11333, Dec. 28, 2019, 67 pgs.

Barends, et al., "Diabatic gates for frequency-tunable superconducting qubits", arXiv:1907.02510, Jul. 2019, 9 pgs.

Collodo, et al., "Implementation of Conditional-Phase Gates based on tunable ZZ-Interaction", arXiv:2005.08863v1, May 18, 2020, 10 pgs.

Devoret, et al., "Circuit-QED: How strong can the coupling between a Josephson junction atom and a transmission line resonator be?", Ann. Phys. 16, 767, Oct. 10, 2007, 13 pgs.

Foxen, et al., "Demonstrating a Continuous Set of Two-qubit Gates for Near-term Quantum Algorithms", arXiv:2001.08343v2, Feb. 3, 2020, 20 pgs.

Foxen, et al., "Demonstrating a Continuous Set of Two-qubit Gates for Near-term Quantum Algorithms", Phys.Rev.Lett. 125, 120504, Sep. 15, 2020, 6 pgs.

Li, et al., "A tunable coupler for suppressing adjacent superconducting qubit coupling", arXiv:1912.10721v2, Jan. 7, 2020, 13 pgs.

Stehlik, et al., "Tunable Coupling Architecture for Fixed-frequency Transmons", arXiv:2101.07746v1, Jan. 19, 2021, 7 pgs.

Yan, et al., "A tunable coupling scheme for implementing high-fidelity two-qubit gates", arXiv:1803.09813v1, Mar. 26, 2018, 10 pgs.

Yan, et al., "Tunable Coupling Scheme for Implementing High-Fidelity Two-Qubit Gates", Phys. Rev. Applied 10, 054062, Nov. 28, 2018, 9 pgs.

EPO, Communication pursuant to Article 94(3) issued in Application No. 21764100.0 on Apr. 30, 2025, 9 pages.

EPO, Third Party Observations for Application No. 21764100.0 submitted Aug. 29, 2024, 4 pages.

Mundada, Pranav, et al., "Suppression of Qubit Crosstalk in a Tunable Coupling Superconducting Circuit", arXiv:1810.04182v2, May 31, 2019, 11 pages.

Mundada et al., "Suppression of Qubit Crosstalk in a Tunable Coupling Superconducting Circuit," pp. 1-11, Phys. Rev. Applied 12, 054023, Published by the American Physical Society on Nov. 11, 2019. https://doi.org/10.1103/PhysRevApplied.12.054023.†

P. Krantz, M. Kjaergaard, F. Yan, T. P. Orlando, S. Gustavsson, W. D. Oliver; "A quantum engineer's guide to superconducting qubits," pp. 1-58, Appl. Phys. Rev. Jun. 1, 2019; 6 (2): 021318. https://doi.org/10.1063/1.5089550.†

Jerry M. Chow et al., "Simple All-Microwave Entangling Gate for Fixed-Frequency Superconducting Qubits,," pp. 1-5, Phys. Rev. Lett. 107, 080502—Published by the American Physical Society on Aug. 17, 2011. https://doi.org/10.1103/PhysRevLett.107.080502.†

\* cited by examiner
† cited by third party

| parameters | Design | Measured |
|---|---|---|
| $f_{01,1}$ (GHz) | 4.027 | 4.011 |
| $f_{01,2}$ (GHz) | 4.087 | 3.971 |
| $f_{01,c}$ (GHz) | 6.041 | 0.018 |
| $\eta_1/2\pi$ (MHz) | 211 | 230 |
| $\eta_2/2\pi$ (MHz) | 231 | 233 |
| $g_{12}/2\pi$ (MHz) | -9.06 | -5.7 |
| $g_{1c}/2\pi$ (MHz) | -111 | -107.8 |
| $g_{2c}/2\pi$ (MHz) | -111 | -107.8 |
| flux offset ($\Phi_0$) | - | -0.126 |

FIG. 8A

CONTROLLING A TUNABLE FLOATING COUPLER DEVICE IN A SUPERCONDUCTING QUANTUM PROCESSING UNIT

This application is a continuation of PCT/US2021/020707, filed Mar. 3, 2021, which claims priority to U.S. Provisional Application No. 62/984,717 filed on Mar. 3, 2020, and entitled "Quantum Processor with Adjustable Coupler," and U.S. Provisional Application No. 63/141,348 filed on Jan. 25, 2021 and entitled "Floating Couplers." The above-referenced priority applications are hereby incorporated by reference.

BACKGROUND

The following description relates to controlling a tunable floating coupler device in a superconducting quantum processing unit.

Quantum computers can perform computational tasks by storing and processing information within quantum states of quantum systems. For example, qubits (i.e., quantum bits) can be stored in and represented by an effective two-level sub-manifold of a quantum coherent physical system. A variety of physical systems have been proposed for quantum computing applications. Examples include superconducting circuits, trapped ions, spin systems, and others.

BRIEF DESCRIPTION OF THE DRAWINGS

FIG. 8A is a table showing device parameters of the superconducting quantum circuit devices in the example quantum processing unit in FIG. 3 represented by the example equivalent circuit in FIG. 6.

DETAILED DESCRIPTION

Figure 1:
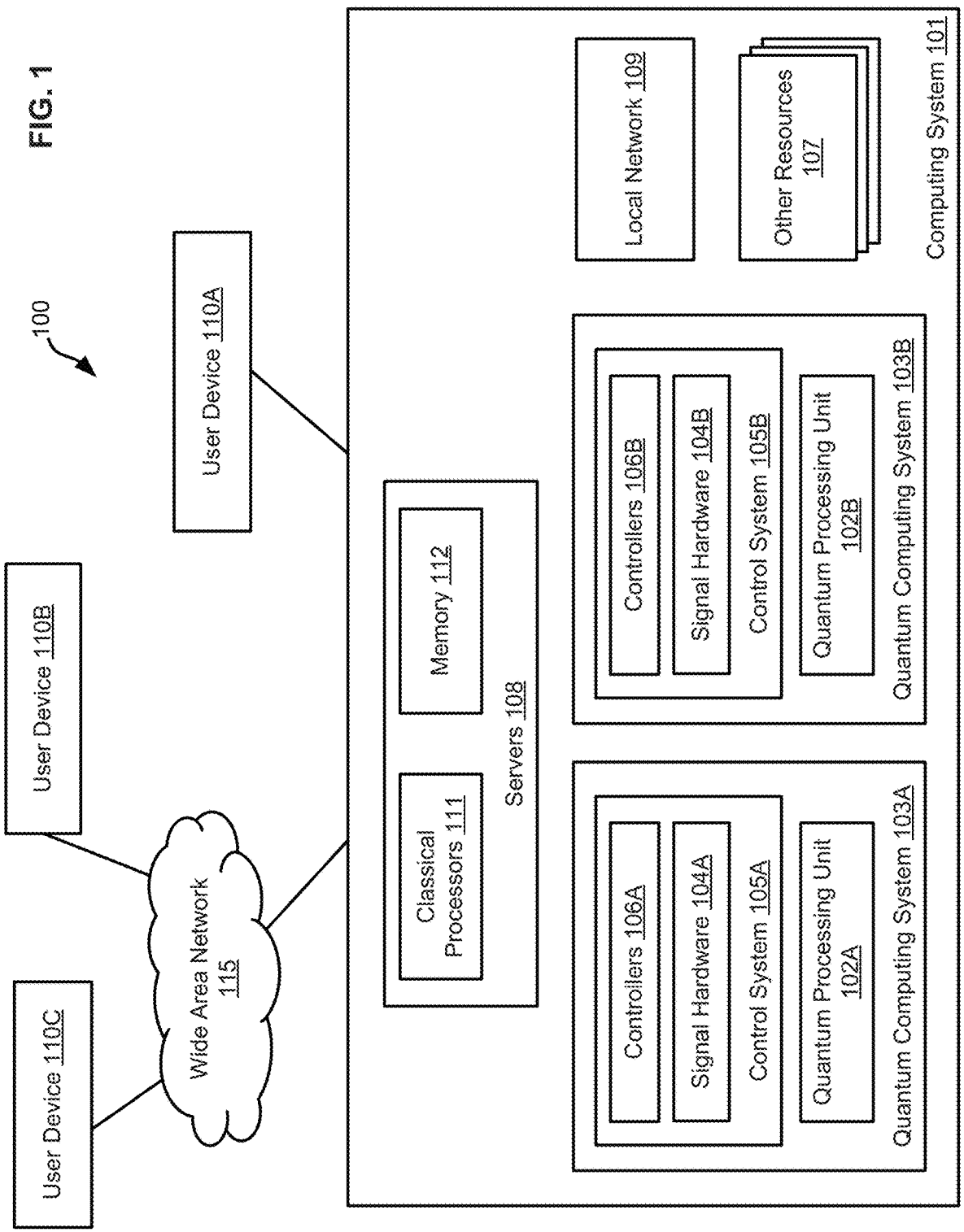
FIG. 1 is a block diagram of an example computing system.

In some aspects of what is described here, a quantum processing unit includes two qubit devices operably coupled to each other by a tunable floating coupler device. In some examples, the tunable floating coupler device includes a superconducting circuit loop with one or more Josephson junctions connected in parallel between two coupler electrodes. In such cases, the two coupler electrodes of the tunable floating coupler device are electrically floating (the coupler electrodes are not directly connected to ground); for instance, the electrodes are not conductively connected to a ground plane or a grounded electrode.

The tunable floating coupler device can enable a tunable coupling strength between the two qubit devices. For instance, the tunable floating coupler device can be controlled to selectively activate and de-activate (turn on or off) coupling between the two qubit devices, for example, to allow two-qubit quantum logic gates or other types of control operations to be applied to qubits defined by the qubit devices. In some instances, the coupling is activated or de-activated by tuning the tunable floating coupler device. For example, the tunable floating coupler device can be tuned by changing a magnetic flux bias applied to a superconducting circuit loop of the tunable floating coupler device. In some instances, the magnetic flux can be changed from a parking value to a gate-activating value to activate the coupling, or the magnetic flux can be changed from the gate-activating value to the parking value to de-activate the coupling.

In some implementations, the systems and techniques described here can provide technical advantages and improvements. For instance, the systems and techniques described here can optimize performance of quantum logic gates and provide high gate fidelities of quantum logic gates by compensating variations in a coupling strength caused by fabrication processes. For example, a total coupling strength can be tuned, when a measured coupling strength between two qubit devices on a manufactured quantum processing unit is higher than a designed value, to avoid a high "always-on" coupling when the two qubit devices are idle. For another example, a total coupling strength can be tuned, when a measured coupling strength between two qubit devices on a manufactured quantum processing unit is less than a designed value, to avoid a slow gate that has a long gate time (due to weak coupling). Therefore, in some cases, the methods and systems disclosed here can enable faster quantum logic gates with higher gate fidelities, as well as other advantages.

In some implementations, the systems and methods presented here can enable scalable quantum processors. For example, the systems and techniques described here may eliminate or relax the requirement on a static direct capacitive coupling to cancel the total coupling strength between two qubit devices. This allows to the opportunity to increase a pitch size between two neighboring qubit devices, providing space for other quantum circuit components of the quantum processor unit, for example, readout resonators, tunable couplers, qubit drive lines, flux bias control lines, bonding bumps for caps, etc., which may contribute to achieving a scalable architecture.

In some implementations, a tunable floating coupler device in a quantum processing unit includes asymmetric Josephson junctions. In this case, a tunable floating coupler device allows the operation of multi-qubit quantum logic gates at a minimum frequency value of the tunable floating coupler device, e.g., when the flux bias $\Phi_{ec}=0.5\Phi_0$. In some cases, a total coupling strength g between the qubit devices is first-order insensitive to flux fluctuations, and thus can produce stable quantum logic gates. In some cases, a combination of these and potentially other advantages and improvements may be obtained.

FIG. 1 is a block diagram of an example computing environment 100. The example computing environment 100 shown in FIG. 1 includes a computing system 101 and user devices 110A, 110B, 110C. A computing environment may include additional or different features, and the components of a computing environment may operate as described with respect to FIG. 1 or in another manner.

The example computing system 101 includes classical and quantum computing resources and exposes their functionality to the user devices 110A, 110B, 110C (referred to collectively as "user devices 110"). The computing system 101 shown in FIG. 1 includes one or more servers 108, quantum computing systems 103A, 103B, a local network 109, and other resources 107. The computing system 101 may also include one or more user devices (e.g., the user device 110A) as well as other features and components. A computing system may include additional or different features, and the components of a computing system may operate as described with respect to FIG. 1 or in another manner.

The example computing system 101 can provide services to the user devices 110, for example, as a cloud-based or remote-accessed computer system, as a distributed computing resource, as a supercomputer or another type of high-performance computing resource, or in another manner. The computing system 101 or the user devices 110 may also have access to one or more other quantum computing systems (e.g., quantum computing resources that are accessible through the wide area network 115, the local network 109, or otherwise).

The user devices 110 shown in FIG. 1 may include one or more classical processors, memory, user interfaces, communication interfaces, and other components. For instance, the user devices 110 may be implemented as laptop computers, desktop computers, smartphones, tablets, or other types of computer devices. In the example shown in FIG. 1, to access computing resources of the computing system 101, the user devices 110 send information (e.g., programs, instructions, commands, requests, input data, etc.) to the servers 108; and in response, the user devices 110 receive information (e.g., application data, output data, prompts, alerts, notifications, results, etc.) from the servers 108. The user devices 110 may access services of the computing system 101 in another manner, and the computing system 101 may expose computing resources in another manner.

In the example shown in FIG. 1, the local user device 110A operates in a local environment with the servers 108 and other elements of the computing system 101. For instance, the user device 110A may be co-located with (e.g., located within 0.5 to 1 km of) the servers 108 and possibly other elements of the computing system 101. As shown in FIG. 1, the user device 110A communicates with the servers 108 through a local data connection.

The local data connection in FIG. 1 is provided by the local network 109. For example, some or all of the servers 108, the user device 110A, the quantum computing systems 103A, 103B, and the other resources 107 may communicate with each other through the local network 109. In some implementations, the local network 109 operates as a communication channel that provides one or more low-latency communication pathways from the server 108 to the quantum computer systems 103A, 103B (or to one or more of the elements of the quantum computer systems 103A, 103B). The local network 109 can be implemented, for instance, as a wired or wireless Local Area Network, an Ethernet connection, or another type of wired or wireless connection. The local network 109 may include one or more wired or wireless routers, wireless access points (WAPs), wireless mesh nodes, switches, high-speed cables, or a combination of these and other types of local network hardware elements. In some cases, the local network 109 includes a software-defined network that provides communication among virtual resources, for example, among an array of virtual machines operating on the server 108 and possibly elsewhere.

In the example shown in FIG. 1, the remote user devices 110B, 110C operate remote from the servers 108 and other elements of the computing system 101. For instance, the user devices 110B, 110C may be located at a remote distance (e.g., more than 1 km, 10 km, 100 km, 1,000 km, 10,000 km, or farther) from the servers 108 and possibly other elements of the computing system 101. As shown in FIG. 1, each of the user devices 110B, 110C communicates with the servers 108 through a remote data connection.

The remote data connection in FIG. 1 is provided by a wide area network 115, which may include, for example, the Internet or another type of wide area communication network. In some cases, remote user devices use another type of remote data connection (e.g., satellite-based connections, a cellular network, a virtual private network, etc.) to access the servers 108. The wide area network 115 may include one or more internet servers, firewalls, service hubs, base stations, or a combination of these and other types of remote networking elements. Generally, the computing environment 100 can be accessible to any number of remote user devices.

The example servers 108 shown in FIG. 1 can manage interaction with the user devices 110 and utilization of the quantum and classical computing resources in the computing system 101. For example, based on information from the user devices 110, the servers 108 may delegate computational tasks to the quantum computing systems 103A, 103B and the other resources 107; the servers 108 can then send information to the user devices 110 based on output data from the computational tasks performed by the quantum computing systems 103A, 103B, and the other resources 107.

As shown in FIG. 1, the servers 108 are classical computing resources that include classical processors 111 and memory 112. The servers 108 may also include one or more communication interfaces that allow the servers to communicate via the local network 109, the wide area network 115 and possibly other channels. In some implementations, the servers 108 may include a host server, an application server, a virtual server or a combination of these and other types of servers. The servers 108 may include additional or different features, and may operate as described with respect to FIG. 1 or in another manner.

The classical processors 111 can include various kinds of apparatus, devices, and machines for processing data, including, by way of example, a microprocessor, a central processing unit (CPU), a graphics processing unit (GPU), an FPGA (field programmable gate array), an ASIC (application specific integrated circuit), or combinations of these. The memory 112 can include, for example, a random-access memory (RAM), a storage device (e.g., a writable read-only memory (ROM) or others), a hard disk, or another type of storage medium. The memory 112 can include various forms of volatile or non-volatile memory, media, and memory devices, etc.

Each of the example quantum computing systems 103A, 103B operates as a quantum computing resource in the computing system 101. The other resources 107 may include additional quantum computing resources (e.g., quantum computing systems, quantum simulators, or both) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the servers 108 generate programs, identify appropriate computing resources (e.g., a QPU or QVM) in the computing system 101 to execute the programs, and send the programs to the identified resources for execution. For example, the servers 108 may send programs to the quantum computing system 103A, the quantum computing system 103B, or any of the other resources 107. The programs may include classical programs, quantum programs, hybrid classical/quantum programs, and may include any type of function, code, data, instruction set, etc.

In some instances, programs can be formatted as source code that can be rendered in human-readable form (e.g., as text) and can be compiled, for example, by a compiler running on the servers 108, on the quantum computing systems 103, or elsewhere. In some instances, programs can be formatted as compiled code, such as, for example, binary code (e.g., machine-level instructions) that can be executed directly by a computing resource. Each program may include instructions corresponding to computational tasks that, when performed by an appropriate computing resource, generate output data based on input data. For example, a program can include instructions formatted for a quantum computer system, a simulator, a digital microprocessor, co-processor or other classical data processing apparatus, or another type of computing resource.

In some cases, a program may be expressed in a hardware-independent format. For example, quantum machine instructions may be provided in a quantum instruction language such as Quil, described in the publication "A Practical Quantum Instruction Set Architecture," arXiv: 1608.03355v2, dated Feb. 17, 2017, or another quantum instruction language. For instance, the quantum machine instructions may be written in a format that can be executed by a broad range of quantum processing units or simulators. In some cases, a program may be expressed in high-level terms of quantum logic gates or quantum algorithms, in lower-level terms of fundamental qubit rotations and controlled rotations, or in another form. In some cases, a program may be expressed in terms of control signals (e.g., pulse sequences, delays, etc.) and parameters for the control signals (e.g., frequencies, phases, durations, channels, etc.). In some cases, a program may be expressed in another form or format. In some cases, a program may utilize Quil-T, described in the publication "Gain deeper control of Rigetti quantum processors with Quil-T," available at https://medium.com/rigetti/gain-deeper-control-of-rigetti-quantum-processors-with-quil-t-ea8943061e5b dated Dec. 10, 2020, which is hereby incorporated by reference in the present disclosure.

In some implementations, the servers 108 include one or more compilers that convert programs between formats. For example, the servers 108 may include a compiler that converts hardware-independent instructions to binary programs for execution by the quantum computing systems 103A, 103B. In some cases, a compiler can compile a program to a format that targets a specific quantum resource in the computer system 101. For example, a compiler may generate a different binary program (e.g., from the same source code) depending on whether the program is to be executed by the quantum computing system 103A or the quantum computing system 103B.

In some cases, a compiler generates a partial binary program that can be updated, for example, based on specific parameters. For instance, if a quantum program is to be executed iteratively on a quantum computing system with varying parameters on each iteration, the compiler may generate the binary program in a format that can be updated with specific parameter values at runtime (e.g., based on feedback from a prior iteration, or otherwise); the parametric update can be performed without further compilation. In some cases, a compiler generates a full binary program that does not need to be updated or otherwise modified for execution.

In some implementations, the servers 108 generate a schedule for executing programs, allocate computing resources in the computing system 101 according to the schedule, and delegate the programs to the allocated computing resources. The servers 108 can receive, from each computing resource, output data from the execution of each program. Based on the output data, the servers 108 may generate additional programs that are then added to the schedule, output data that is provided back to a user device 110, or perform another type of action.

In some implementations, all or part of the computing environment operates as a cloud-based quantum computing (QC) environment, and the servers 108 operate as a host system for the cloud-based QC environment. The cloud-based QC environment may include software elements that operate on both the user devices 110 and the computer system 101 and interact with each other over the wide area network 115. For example, the cloud-based QC environment may provide a remote user interface, for example, through a browser or another type of application on the user devices 110. The remote user interface may include, for example, a graphical user interface or another type of user interface that obtains input provided by a user of the cloud-based QC environment. In some cases the remote user interface includes, or has access to, one or more application programming interfaces (APIs), command line interfaces, graphical user interfaces, or other elements that expose the services of the computer system 101 to the user devices 110.

In some cases, the cloud-based QC environment may be deployed in a "serverless" computing architecture. For instance, the cloud-based QC environment may provide on-demand access to a shared pool of configurable computing resources (e.g., networks, servers, storage, applications, services, quantum computing resources, classical computing resources, etc.) that can be provisioned for requests from user devices 110. Moreover, the cloud-based computing systems 101 may include or utilize other types of computing resources, such as, for example, edge computing, fog computing, etc.

In an example implementation of a cloud-based QC environment, the servers 108 may operate as a cloud provider that dynamically manages the allocation and provisioning of physical computing resources (e.g., GPUs, CPUs, QPUs, etc.). Accordingly, the servers 108 may provide services by defining virtualized resources for each user account. For instance, the virtualized resources may be formatted as virtual machine images, virtual machines, containers, or virtualized resources that can be provisioned for a user account and configured by a user. In some cases, servers 108 include a container management and execution system that is implemented, for example, using KUBERNETES® or another software platform for container management. In some cases, the cloud-based QC environment is implemented using a resource such as, for example, OPENSTACK®. OPENSTACK® is an example of a software platform for cloud-based computing, which can be used to provide virtual servers and other virtual computing resources for users.

In some cases, the server 108 stores quantum machine images (QMI) for each user account. A quantum machine image may operate as a virtual computing resource for users of the cloud-based QC environment. For example, a QMI can provide a virtualized development and execution environment to develop and run programs (e.g., quantum programs or hybrid classical/quantum programs). When a QMI operates on the server 108, the QMI may engage either of the quantum processor units 102A, 102B, and interact with a remote user device (110B or 110C) to provide a user programming environment. The QMI may operate in close physical proximity to and have a low-latency communication link with the quantum computing systems 103A, 103B. In some implementations, remote user devices connect with QMIs operating on the servers 108 through secure shell (SSH) or other protocols over the wide area network 115.

In some implementations, all or part of the computing system 101 operates as a hybrid computing environment. For example, quantum programs can be formatted as hybrid classical/quantum programs that include instructions for execution by one or more quantum computing resources and instructions for execution by one or more classical resources. The servers 108 can allocate quantum and classical computing resources in the hybrid computing environment, and delegate programs to the allocated computing resources for execution. The quantum computing resources in the hybrid environment may include, for example, one or more quantum processing units (QPUs), one or more quantum virtual machines (QVMs), one or more quantum simulators, or possibly other types of quantum resources. The classical computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the servers 108 can select the type of computing resource (e.g., quantum or classical) to execute an individual program, or part of a program, in the computing system 101. For example, the servers 108 may select a particular quantum processing unit (QPU) or other computing resource based on availability of the resource, speed of the resource, information or state capacity of the resource, a performance metric (e.g., process fidelity) of the resource, or based on a combination of these and other factors. In some cases, the servers 108 can perform load balancing, resource testing and calibration, and other types of operations to improve or optimize computing performance.

Each of the example quantum computing systems 103A, 103B shown in FIG. 1 can perform quantum computational tasks by executing quantum machine instructions (e.g., a binary program compiled for the quantum computing system). In some implementations, a quantum computing system can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum computing system can operate using gate-based models for quantum computing. For example, the qubits can be initialized in an initial state, and a quantum logic circuit comprised of a series of quantum logic gates can be applied to transform the qubits and extract measurements representing the output of the quantum computation. Individual qubits may be controlled by single-qubit quantum logic gates, and pairs of qubits may be controlled by two-qubit quantum logic gates (e.g., entangling gates that are capable of generating entanglement between the pair of qubits). In some implementations, a quantum computing system can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation. Other computational regimes may be used; for example, quantum computing systems may operate in non-fault-tolerant regimes. In some implementations, a quantum computing system is constructed and operated according to a scalable quantum computing architecture. For example, in some cases, the architecture can be scaled to a large number of qubits to achieve large-scale general purpose coherent quantum computing. Other architectures may be used; for example, quantum computing systems may operate in small-scale or non-scalable architectures.

The example quantum computing system 103A shown in FIG. 1 includes a quantum processing unit 102A and a control system 105A, which controls the operation of the quantum processing unit 102A. Similarly, the example quantum computing system 103B includes a quantum processing unit 102B and a control system 105B, which controls the operation of a quantum processing unit 102B. A quantum computing system may include additional or different features, and the components of a quantum computing system may operate as described with respect to FIG. 1 or in another manner.

In some instances, all or part of the quantum processing unit 102A functions as a quantum processor, a quantum memory, or another type of subsystem. In some examples, the quantum processing unit 102A includes a quantum circuit system. The quantum circuit system may include qubit devices, readout devices, and possibly other devices that are used to store and process quantum information. In some cases, the quantum processing unit 102A includes a superconducting circuit, and the superconducting circuit includes two qubit devices operatively coupled to each other by a coupler device. In certain examples, the qubit devices and the coupler device are implemented as superconducting quantum circuit devices that include Josephson junctions, for example, in Superconducting QUantum Interference Device (SQUID) loops or other arrangements, and are controlled by radio-frequency signals, microwave signals, and bias signals delivered to the quantum processing unit 102A.

In some examples, each of the two qubit devices can be a tunable qubit device with a tunable transition frequency or a fixed-frequency qubit device with a fixed transition frequency. In some examples, each ach of the two qubit devices can be a floating qubit device with two respective qubit electrodes electrically floating at a certain potential (without being conductively connected to a ground plane, or to a grounded electrode of a qubit device). In some instances, the coupler device can be a tunable floating coupler device with a tunable transition frequency and two respective coupler electrodes electrically floating at a certain potential, without being conductively connected to the ground plane.

During operation, a flux bias control signal can be provided to control a magnetic flux applied to the tunable floating coupler device, for example, to compensate a static coupling and cause the total coupling strength between the two qubit devices to vanish (effectively zero coupling). A parking value of the magnetic flux that causes the total coupling strength of the two qubit devices to vanish can be identified (e.g., by the example process 1700 or in another manner) and to operate the quantum processor. In some cases, the frequency of the tunable floating coupler device can be tuned to a first frequency (e.g., minimum frequency) with the magnetic flux at the parking value to deactivate the coupling between the two qubit devices. In some instances, when the coupling is deactivated, the total coupling strength of the two qubit devices vanishes, e.g., becomes equal to zero, or less than or equal to a predetermined threshold value. The flux bias control signal can tune the tunable floating coupler device by changing the magnetic flux from the parking value to a gate-activating value, when a quantum logic gate is performed on the two qubit devices. When the quantum logic gates are completed, the flux bias control signal can tune the frequency of the tunable floating coupler device to a second value (e.g., a maximum value) by changing the magnetic flux from the gate-activating value to the parking value.

In some cases, the quantum processing unit 102A includes an ion trap system, and the qubit devices are implemented as trapped ions controlled by optical signals delivered to the quantum processing unit 102A. In some cases, the quantum processing unit 102A includes a spin system, and the qubit devices are implemented as nuclear or electron spins controlled by microwave or radio-frequency signals delivered to the quantum processing unit 102A. The quantum processing unit 102A may be implemented based on another physical modality of quantum computing.

The quantum processing unit 102A may include, or may be deployed within, a controlled environment. The controlled environment can be provided, for example, by shielding equipment, cryogenic equipment, and other types of environmental control systems. In some examples, the components in the quantum processing unit 102A operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In some implementations, the example quantum processing unit 102A can process quantum information by applying control signals to the qubits in the quantum processing unit 102A. The control signals can be configured to encode information in the qubits, to process the information by performing quantum logic gates or other types of operations, or to extract information from the qubits. In some examples, the operations can be expressed as single-qubit quantum logic gates, two-qubit quantum logic gates, or other types of quantum logic gates that operate on one or more qubits. A quantum logic circuit, which includes a sequence of quantum logic operations, can be applied to the qubits to perform a quantum algorithm. The quantum algorithm may correspond to a computational task, a hardware test, a quantum error correction procedure, a quantum state distillation procedure, or a combination of these and other types of operations.

The example control system 105A includes controllers 106A and signal hardware 104A. Similarly, control system 105B includes controllers 106B and signal hardware 104B. All or part of the control systems 105A, 105B can operate in a room-temperature environment or another type of environment, which may be located near the respective quantum processing units 102A, 102B. In some cases, the control systems 105A, 105B include classical computers, signaling equipment (microwave, radio, optical, bias, etc.), electronic systems, vacuum control systems, refrigerant control systems, or other types of control systems that support operation of the quantum processing units 102A, 102B.

The control systems 105A, 105B may be implemented as distinct systems that operate independent of each other. In some cases, the control systems 105A, 105B may include one or more shared elements; for example, the control systems 105A, 105B may operate as a single control system that operates both quantum processing units 102A, 102B. Moreover, a single quantum computer system may include multiple quantum processing units, which may operate in the same controlled (e.g., cryogenic) environment or in separate environments.

The example signal hardware 104A includes components that communicate with the quantum processing unit 102A. The signal hardware 104A may include, for example, waveform generators, amplifiers, digitizers, high-frequency sources, DC sources, AC sources, etc. The signal hardware may include additional or different features and components. In the example shown, components of the signal hardware 104A are adapted to interact with the quantum processing unit 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processing unit 102A during operation of the quantum computing system 103A. For instance, the signal hardware 104A may generate signals to implement quantum logic operations, readout operations, or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processing unit 102A to operate qubit devices, readout devices, bias devices, coupler devices, or other types of components in the quantum processing unit 102A.

In some instances, the signal hardware 104A receives and processes signals from the quantum processing unit 102A. The received signals can be generated by the execution of a quantum program on the quantum computing system 103A. For instance, the signal hardware 104A may receive signals from the devices in the quantum processing unit 102A in response to readout or other operations performed by the quantum processing unit 102A. Signals received from the quantum processing unit 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processing unit 102A.

In some implementations, the signal hardware 104A includes signal delivery hardware that interfaces with the quantum processing unit 102A. For example, the signal hardware 104A may include filters, attenuators, directional couplers, multiplexers, diplexers, bias components, signal channels, isolators, amplifiers, power dividers, and other types of components. In some instances, the signal delivery hardware performs preprocessing, signal conditioning, or other operations to the control signals to be delivered to the quantum processing unit 102A. In some instances, signal delivery hardware performs preprocessing, signal conditioning or other operations on readout signals received from the quantum processing unit 102A.

The example controllers 106A communicate with the signal hardware 104A to control operation of the quantum computing system 103A. The controllers 106A may include classical computing hardware that directly interface with components of the signal hardware 104A. The example controllers 106A may include classical processors, memory, clocks, digital circuitry, analog circuitry, and other types of systems or subsystems. The classical processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory or another type of computer storage medium. The controllers 106A may also include one or more communication interfaces that allow the controllers 106A to communicate via the local network 109 and possibly other channels. The controllers 106A may include additional or different features and components.

In some implementations, the controllers 106A include memory or other components that store quantum state information, for example, based on qubit readout operations performed by the quantum computing system 103A. For instance, the states of one or more qubits in the quantum processing unit 102A can be measured by qubit readout operations, and the measured state information can be stored in a cache or other type of memory system in or more of the controllers 106A. In some cases, the measured state information is subsequently used in the execution of a quantum program, a quantum error correction procedure, a quantum processing unit (QPU) calibration or testing procedure, or another type of quantum process.

In some implementations, the controllers 106A include memory or other components that store a quantum program containing quantum machine instructions for execution by the quantum computing system 103A. In some instances, the controllers 106A can interpret the quantum machine instructions and perform hardware-specific control operations according to the quantum machine instructions. For example, the controllers 106A may cause the signal hardware 104A to generate control signals that are delivered to the quantum processing unit 102A to execute the quantum machine instructions.

In some instances, the controllers 106A extract qubit state information from qubit readout signals, for example, to identify the quantum states of qubits in the quantum processing unit 102A or for other purposes. For example, the controllers may receive the qubit readout signals (e.g., in the form of analog waveforms) from the signal hardware 104A, digitize the qubit readout signals, and extract qubit state information from the digitized signals. In some cases, the controllers 106A compute measurement statistics based on qubit state information from multiple shots of a quantum program. For example, each shot may produce a bitstring representing qubit state measurements for a single execution of the quantum program, and a collection of bitstrings from multiple shots may be analyzed to compute quantum state probabilities.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some implementations, the controllers 106A may include classical computer resources that perform some or all of the operations of the servers 108 described above. For example, the controllers 106A may operate a compiler to generate binary programs (e.g., full or partial binary programs) from source code; the controllers 106A may include an optimizer that performs classical computational tasks of a hybrid classical/quantum program; the controllers 106A may update binary programs (e.g., at runtime) to include new parameters based on an output of the optimizer, etc.

The other quantum computer system 103B and its components (e.g., the quantum processing unit 102B, the signal hardware 104B, and controllers 106B) can be implemented as described above with respect to the quantum computer system 103A; in some cases, the quantum computer system 103B and its components may be implemented or may operate in another manner.

In some implementations, the quantum computer systems 103A, 103B are disparate systems that provide distinct modalities of quantum computation. For example, the computer system 101 may include both an adiabatic quantum computer system and a gate-based quantum computer system. As another example, the computer system 101 may include a superconducting circuit-based quantum computer system and an ion trap-based quantum computer system. In such cases, the computer system 101 may utilize each quantum computing system according to the type of quantum program that is being executed, according to availability or capacity, or based on other considerations.

Figure 2:
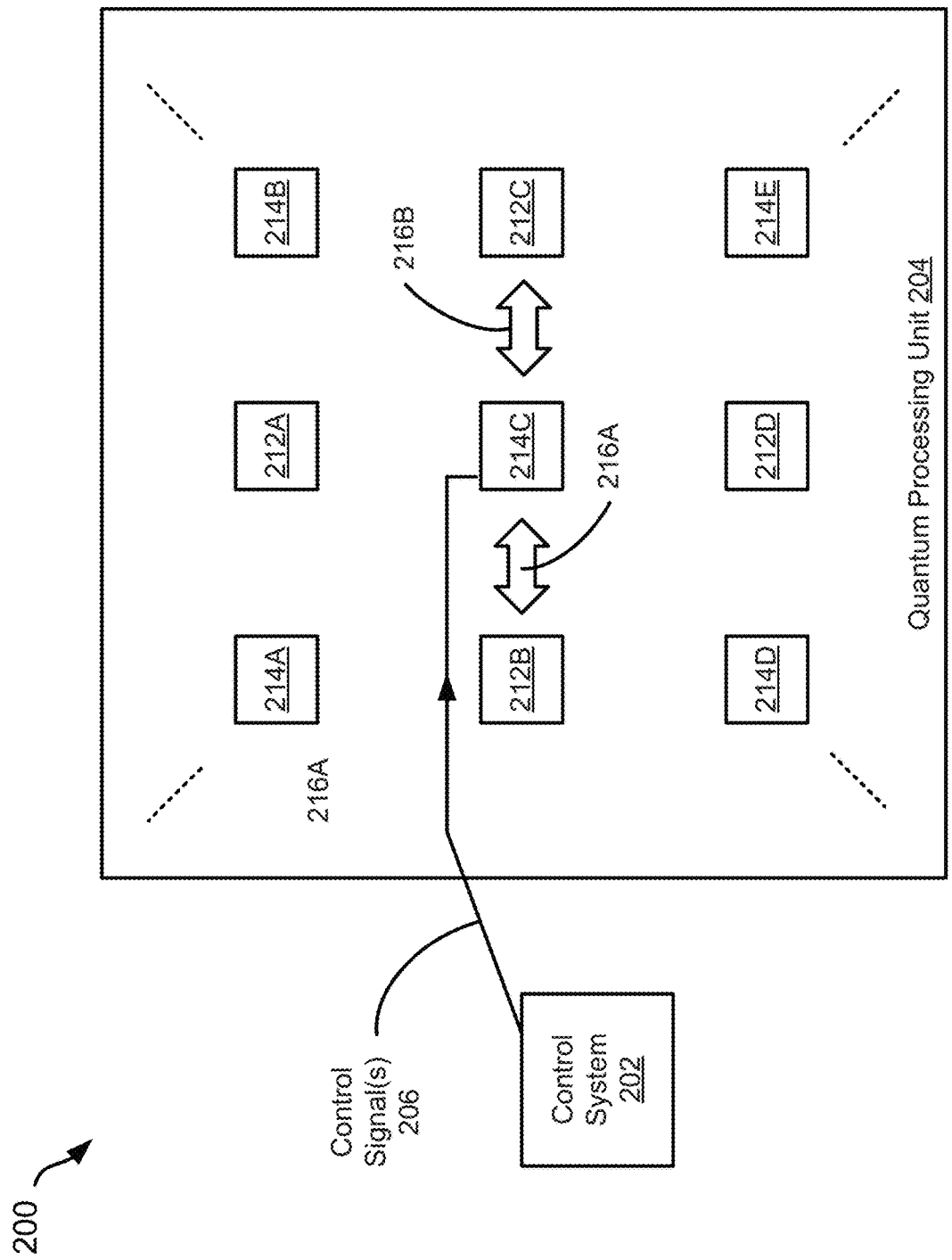
FIG. 2 is a block diagram showing devices and interactions in an example quantum computing system.

FIG. 2 is a block diagram showing devices and interactions in an example quantum computing system 200. The example quantum computing system 200 includes a control system 202 and a quantum processing unit 204. The example quantum processing unit 204 includes a device array, which includes quantum circuit devices arranged in a two-dimensional or three-dimensional lattice structure. Nine of the quantum circuit devices in the device array are shown in FIG. 2. In particular, FIG. 2 shows four qubit devices 212, e.g., 212A, 212B, 212C, 212D and five tunable coupler devices 214, e.g., 214A, 214B, 214C, 214D, 214E. The quantum computing system 200 may include additional or different features, and the components may be arranged in another manner.

In the example shown in FIG. 2, the quantum circuit devices are arranged in a rectilinear (e.g., rectangular, or square) array that extends in two spatial dimensions (e.g., in the plane of the page). In some implementations, the devices can be arranged in another type of ordered array. In some instances, the rectilinear array also extends in a third spatial dimension (e.g., in/out of the page), for example, to form a cubic array or another type of three-dimensional array. For example, the devices can be arranged in device arrays 1000, and 1100 shown in FIGS. 10-11. The quantum processing unit 204 may include additional devices, including additional qubit devices, readout resonators, or other quantum circuit devices.

In some implementations, the control system 202 interfaces with the quantum processing unit 204 through a signal delivery system that includes connector hardware elements. For example, the connector hardware elements of the control system 202 can include signal lines, signal processing hardware, filters, feedthrough devices (e.g., light-tight feedthroughs, etc.), and other types of components. In some implementations, the control system connector hardware can span multiple different temperature and noise regimes. For example, the connector hardware elements can include a series of temperature stages operating at different temperatures, e.g., 60 Kelvin (K), 3 K, 800 milli Kelvin (mK), 150 mK, that decrease between a higher temperature regime of the example control system 202 and a lower temperature regime of the example quantum processing unit 204.

In some implementations, the example quantum processing unit 204, and all or part of the signal delivery system and connector hardware elements, can be maintained in a controlled cryogenic environment. The environment can be provided, for example, by shielding equipment, cryogenic equipment, and other types of environmental control systems. In some examples, the components in the quantum processing unit 204 operate in a cryogenic temperature regime and are subject to very low electromagnetic and thermal noise. For example, magnetic shielding can be used to shield the system components from stray magnetic fields, optical shielding can be used to shield the system components from optical noise, and thermal shielding and cryogenic equipment can be used to maintain the system components at controlled temperatures, etc.

In certain instances, the example control system 202 shown in FIG. 2 may include, for example, a signal generator system, a program interface, a signal processing system, and possibly other components. In some instances, components of the control system 202 can operate in a room temperature regime, an intermediate temperature regime, or both. For example, the control system 202 can be configured to operate at much higher temperatures and be subject to much higher levels of noise than are present in the environment of the quantum processing unit 204.

In the example quantum processing unit 204 shown in FIG. 2, the qubit devices 212 can be encoded with a single bit of quantum information. Typically, each of the qubit devices 212 has two eigenstates that are used as computational basis states (e.g., |0⟩ and |1⟩), and each qubit device 212 can transition between its computational basis states or exist in an arbitrary superposition of its computational basis states. In some examples, the two lowest energy levels (e.g., the ground state and first excited state) of each qubit device 212 are defined as a qubit and used as computational basis states for quantum computation. In some examples, higher energy levels (e.g., a second excited state or a third excited state) are also defined by a qubit device 212 and may be used for quantum computation in some instances.

In some implementations, the qubit devices 212 are housed between neighboring pairs of the tunable coupler devices 214 in a device array within the quantum processing unit 204. Quantum states (e.g., qubits) of respective qubit devices 212 can be manipulated by control signals, or read by readout signals, generated by the control system 202. The qubit devices 212 can be controlled individually, for example, by delivering control signals to the respective qubit devices 212. In some cases, a set of neighboring quantum circuit devices (e.g., the qubit devices 212B, 212C and the tunable coupler device 214C) is controlled jointly by delivering control signals to the set. In some cases, readout devices can detect the states of the qubit devices 212, for example, by interacting directly with the respective qubit devices 212.

In the example shown in FIG. 2, the energy difference E between any two adjacent energy levels in a qubit device 212 can be represented as a transition frequency ω of the qubit device (e.g., according to $\omega=E/\hbar$). In some examples, a transition frequency of a qubit device 212 is tunable (e.g., a tunable qubit device), for example, by application of an offset field. For instance, a superconducting tunable qubit device (e.g., tunable transmon qubit devices, flux qubit devices, capacitively shunted flux qubit devices, flatsonium qubit devices, fluxonium qubit devices, or other types of tunable qubit devices) may include a superconducting circuit loop (e.g., a SQUID loop), which can receive a magnetic flux that tunes the transition frequency of the tunable qubit device. As an example, the superconducting circuit loop may include two Josephson junctions connected in parallel, and the tunable qubit device may also include a shunt capacitor in parallel with the two Josephson junctions. For another example, the superconducting circuit loop may include three Josephson junctions, a single Josephson junction and a linear indicator in parallel, or another loop. In some implementations, the transition frequency of the tunable qubit device may be defined at least in part by Josephson energies of the two Josephson junctions, a capacitance of the shunt capacitor, and a magnetic flux threading the superconducting circuit loop. In some implementations, the qubit devices 212 may be implemented as the first/second tunable floating qubit devices 312/314, 402/404, 602/604, 1212/1214; or 1312/1314 shown in FIGS. 3-4, 6, 12, 13, the first/second tunable grounded qubit devices 1412/1414 or 1502/1504 shown in FIGS. 14-15, or in another manner.

In some examples, the transition frequency of a qubit device 212 is not tunable by application of an offset field and is independent of magnetic flux experienced by the qubit device 212. For instance, a fixed-frequency qubit device may have a fixed transition frequency that is defined by an electronic circuit of the qubit device. As an example, a superconducting fixed-frequency qubit device (e.g., a fixed-frequency transmon qubit device) may be implemented without a SQUID loop. In some examples, the fixed-frequency qubit device includes one Josephson junction, and the transition frequency of the fixed-frequency qubit device is defined at least in part by a Josephson energy of the Josephson junction and a capacitance of the shunt capacitor, which is independent of a magnetic flux experienced by the fixed-frequency qubit device. In some implementations, the qubit devices 212 may be implemented as the first/second fixed-frequency floating qubit devices 1912/1914, 2002/2004 shown in FIGS. 19-20, or in another manner.

In certain instances, the qubit device 212 includes one qubit electrode. In this case, the qubit device 212 is considered a "grounded" qubit device when the one or more Josephson junctions of the qubit device 212 are connected between the qubit electrode and a ground plane (e.g., two or more Josephson junctions may be connected in parallel between the qubit electrode and a ground plane, as in the example shown in FIG. 14); and the shunt capacitor is caused by the qubit electrode and the ground plane. In other instances, the qubit device 212 includes two qubit electrodes. In this case, the qubit device 212 is considered a "floating" qubit device when the one or more Josephson junctions of the qubit device 212 are connected between the two qubit electrodes that are not directly connected to ground (e.g., two or more Josephson junctions may be connected in parallel between the two qubit electrodes, as in the example shown in FIG. 3); and the shunt capacitor is caused by the two qubit electrodes. In some implementations, one or more of the qubit devices 212A, 212B, 212C, 212D within the quantum processing unit 204 are tunable floating qubit devices. Both of the two coupler electrodes of a tunable floating qubit device are electrically floating at a certain potential without being conductively connected to a ground plane. In other words, neither of the two coupler electrodes is conductively coupled to ground. In some implementations, the two coupler electrodes of a tunable floating device can be capacitively coupled to the ground plane, e.g., through a residual capacitance between each of the two qubit electrodes and the ground plane.

The tunable coupler devices 214A, 214B, 214C, 214D, 214E may be implemented by tunable transmon qubit devices, flux qubit devices, flatsonium qubit devices, fluxonium qubit devices, or other types of tunable qubit devices. In some implementations, the tunable coupler device 214 includes a superconducting circuit loop (e.g., a SQUID loop), which can receive a magnetic flux that tunes the transition frequency of the tunable coupler device 214. In some instances, the tunable coupler device 214 includes two coupler electrodes; the two Josephson junctions of the tunable coupler device 214 are connected in parallel between the two coupler electrodes; the shunt capacitor is caused by the two qubit electrodes; and the tunable coupler device 214 is a tunable "floating" coupler device. In some implementations, the tunable coupler devices 214 may be implemented as the tunable floating coupler device 316, 406, 606, 1216, 1316, 1416, 1516, or 1916 shown in FIGS. 3-4, 6, 12-15, 19, or in another manner.

Figure 4:
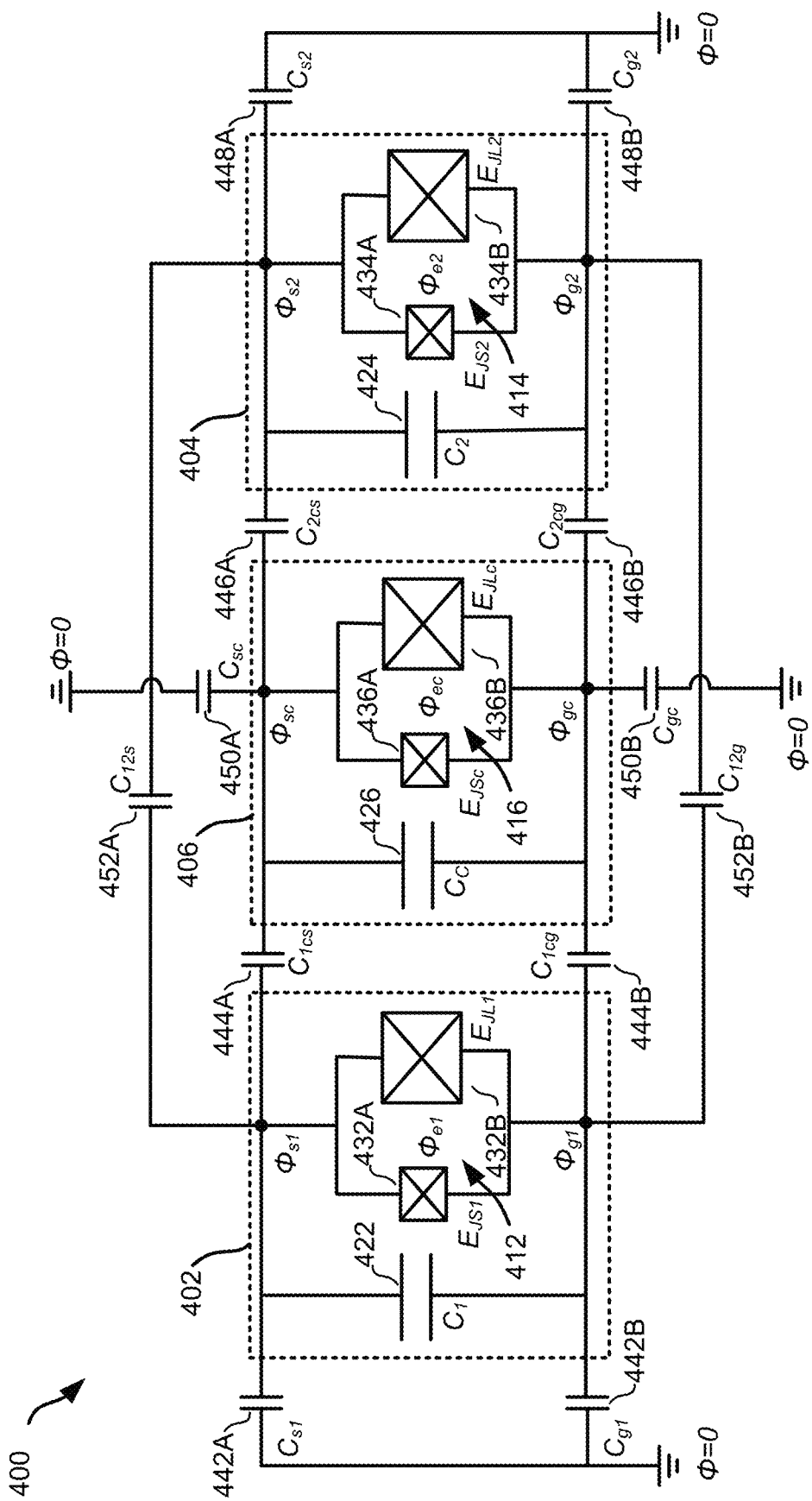
FIG. 4 is a circuit diagram showing an example equivalent circuit of the example quantum processing unit in FIG. 3.

As a particular example, FIG. 4 shows an equivalent circuit of example tunable floating qubit devices 402, 404, which include respective superconducting circuit loops 412, 414. Each of the respective superconducting circuit loops 412, 414 can receive a magnetic flux $\Phi(t)$ that controls the transition frequency of the example tunable floating qubit devices 402, 404. Manipulating the magnetic flux $\Phi(t)$ through the superconducting circuit loop 412, 414 can increase or decrease the transition frequencies of the example tunable floating qubit devices 402, 404. In this example, the magnetic flux $\Phi(t)$ through the superconducting circuit loops 412, 414 are offset fields that can be modified in order to tune the transition frequencies of the tunable floating qubit devices 402, 404. In some cases, inductors or other types of flux bias devices as part of control lines carrying the control signals 206 are coupled to the respective superconducting circuit loops 412, 414 by respective mutual inductances, and the magnetic flux $\Phi(t)$ through the superconducting circuit loops 412, 414 can be controlled by the current through the inductors.

In certain examples, an offset field can be, for example, a magnetic flux bias, a DC electrical voltage, or another type of field. In some implementations, the tunability of the qubit devices 212A, 212B, 212C, 212D, in the quantum processing unit 204 allows pairs of devices to be selectively coupled on-demand to perform multi-qubit quantum logic gates, to entangle pairs of qubits defined by pairs of qubit devices 212, or to perform other types of control operations. The qubit devices can have a high "on/off" ratio, which refers to the ratio of the effective coupling rate provided by control of the tunable coupler device. In some implementations, the tunable coupler devices 214A, 214B, 214C, 214D, 214E, when activated or deactivated, can enable or disable coupling between two neighboring qubit devices 212, respectively.

In some cases, the qubit devices 212A, 212B, 212C, 212D, can be selectively activated by an offset field (e.g., when the qubit devices are tunable qubit devices) that does not directly affect the information encoded in the tunable coupler devices 214A, 214B, 214C, 214D, 214E. For instance, although the offset field may cause the qubit device 212A to interact with the tunable coupler devices 214C, the offset field does not modify the transition frequencies of the tunable coupler devices 214A, 214B, 214C, 214D, 214E (even if the other devices experience the offset field).

In some instances, information is encoded in the qubit devices in the quantum processing unit 204, and the information can be processed by operation of the qubit devices 212A, 212B, 212C, 212D. For instance, input information can be encoded in the computational states or computational subspaces defined by some or all of the qubit devices in the quantum processing unit 204. The information can be processed, for example, by applying a quantum algorithm or other operations to the input information. The quantum algorithm may be decomposed as quantum logic gates or instruction sets that are performed by the qubit devices 212 and tunable coupler devices 214 over a series of clock cycles. For instance, a quantum algorithm may be executed by a combination of single-qubit quantum logic gates and two-qubit quantum logic gates. In some cases, information is processed in another manner. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations.

In some aspects of operation, the control system 202 sends control signals to the qubit devices 212 in the quantum processing unit 204. The control signals can be configured to modulate, increase, decrease, or otherwise manipulate the transition frequencies of the qubit devices 212A, 212B, 212C, 212D (e.g., when the qubit devices are tunable qubit devices). For example, the control signal can be a flux bias control signal that varies a magnetic flux experienced by the tunable qubit device, and varying the magnetic flux can change the transition frequency of the tunable qubit device. In some implementations, a control signal 206 can be a direct current (DC) signal communicated from the control system 202 to the individual qubit device 212. In some implementations, a control signal can be an alternating current (AC) signal communicated from the control system 202 to the individual qubit device 212. In some cases, the AC signal may be superposed with a direct current (DC) signal. Other types of control signals may be used.

In the example shown in FIG. 2, the control system 202 sends control signals 206 to the tunable coupler device 214C to generate interactions between the tunable coupler device 214C and the neighboring qubit devices 212B, 212C. For instance, the control signals 206 can generate a first interaction 216A between the qubit device 212B and the tunable coupler device 214C, a second interaction 216B between the qubit device 212C and the tunable coupler device 214C, or a combination of them in series or in parallel. In some cases, the control signals 206 can generate an interaction that is mediated by the tunable coupler device 212C. For instance, the control signals 206 may generate an interaction between a pair of the tunable devices 212B, 212C in which the other device 214C mediates the interaction generated by the control signals 206 (e.g., as in the examples described below).

In some implementations, the control signals 206 are configured to generate interactions that perform quantum logic gates on the quantum states of one or more of the qubit devices. For example, in some cases, one or more of the control signals 206 generate an interaction that applies a two-qubit quantum logic gate to a pair of qubits defined by two of the tunable qubit devices 212 coupled through a tunable coupler device 214 in the quantum processing unit 204. A control signal 206 may be a current signal, a voltage signal, or another type of electrical signal which can be used to control a control line, for example with a flux bias device, to modulate a magnetic flux and generate a modulated magnetic flux (e.g., a modulated flux bias). The control signals 206 may activate quantum logic gates by modulating a transition frequency of the tunable coupler device 214C.

In some cases, the control line (which receives the control signal 206) may include a flux bias device that is inductively coupled to the superconducting circuit loop of the tunable coupler device 212C to control the magnetic flux through a superconducting circuit loop in the tunable device 212C. The control signal 206 may cause the flux bias device to modulate the magnetic flux at multiple modulation frequencies. In some instances, the control line and the superconducting circuit loop are implemented as the control line 318 and the circuit loop 324 shown in FIG. 3.

In some instances, the control system 202 identifies a quantum logic gate to be applied to a pair of qubits in the quantum processing unit 204. The pair of qubits includes, for example, a first qubit defined by the qubit device 212B and a second qubit defined by the qubit device 212C in the qubit device array through the tunable coupler device 214C. The control signal 206 can be configured to turn on the tunable coupler device 214C to enable the coupling between the tunable qubit devices 212B and 212C. The control signal 206 can be further configured to perform a control operation (e.g., multi-qubit quantum logic gate) on the qubit devices 212B, 212C. The control system 202 can perform the quantum logic gate by communicating the control signal 206 to a control line that is coupled to the tunable coupler device 214C in the quantum processing unit 204.

The parameters of the control signal 206 can be selected to achieve a specified multi-qubit quantum logic gate. In some systems, the control signal 206 contains one or more modes, e.g., radio frequency or microwave frequency modes, for example, in the range of 1 MHz to 20 GHz. In some systems, the duration of the control signal 206 is less than a coherence time of the qubit (e.g., in the range of 1 nanosecond to 1 millisecond in some example systems). Other parameter regimes may be used in superconducting systems or other types of systems.

In some systems, applying the two-qubit quantum logic gate to the pair of qubits defined by a pair of tunable qubit devices may include applying any quantum logic gate from the XY family of gates, the controlled-phase family of gates, the iSWAP family of gates, or another family of gates. In some cases, applying the two-qubit quantum logic gate to the pair of qubits includes applying a controlled-phase gate (e.g., a controlled-Z gate) to the pair of qubits. In some cases, applying the two-qubit quantum logic gate to the pair of qubits includes applying a Bell-Rabi gate, a square-root-of-Bell-Rabi gate, or another two-photon gate to the pair of qubits.

In some implementations, the control system 202, or another type of system associated to the quantum computing system 200, determines gate parameters for applying parametrically activated quantum logic gates in the quantum processing unit 204 and determines values of parameters for the control signal 206. For example, values of the parameters for the control signal 206 may be determined by a gate calibration process defined in software, firmware, or hardware or a combination thereof. In some cases, the control system 202 executes a gate calibration process when the quantum processing unit 204 is first installed for use in the quantum computing system 200, and the gate calibration process may be repeated at other times (e.g., as needed, periodically, according to a calibration schedule, etc.). For instance, a gate calibration module may execute a calibration process that obtains values of device parameters of the qubit devices 212 and the tunable coupler devices 214 in the quantum processing unit 204. For example, the device parameters include a range of qubit operating frequency and anharmonicity of the qubit devices 212 (e.g., when the qubit devices 212 are tunable qubit devices), an operating frequency and anharmonicity of the qubit devices 212 (e.g., when the qubit devices 212 are fixed-frequency qubit devices), and a coupling between the qubit devices and the tunable coupler devices, or another parameter.

In some instances, the values of the device parameters are used to determine the values of the parameters for the control signal. In some implementations, the parameters for the control signal 206 may include the relative duration, relative phase, modulation frequency, modulation amplitude, or another parameter. When the qubit devices 212B, 212C are tunable qubit devices, the control signal with the determined parameters can be applied to one or more of the qubit devices 212B, 212C to bring the qubit devices 212B, 212C into resonance with each other. The control signal 206 can vary values of the magnetic flux applied to the tunable coupler device 214C to determine a parking value which causes a total coupling strength of the qubit devices 212B, 212C to vanish or to be less than or equal to a predetermined threshold value. The control signal 206 can vary values of the magnetic flux applied to the tunable coupler device 214C to determine a gate-activating value which corresponds to a maximal value of the total coupling strength. In some implementations, the parking value and the gate-activating value of the magnetic flux applied to the tunable coupler device 214C can be identified with respect to the example process 1700 shown in FIG. 17 or in another manner.

In some cases, the parking value is determined based on a threshold value for the coupling strength between the qubits. The threshold value can be determined based on target operating parameters of the quantum processing unit or target operating parameters for processes (e.g., quantum logic gates or other operations) to be performed by the quantum processing unit. In some cases, the threshold value represents a maximum value of the coupling strength that is small enough to allow single-qubit gates (or other types of quantum logic gates) to be performed at or above a target gate fidelity. Zero coupling strength is often ideal, but a non-zero value of the coupling strength can be effectively equal to zero when it is small enough to still allow single-qubit gates to be performed at or above the target gate fidelity. In such cases, target operating parameters may be achieved by using a parking value that minimizes the magnitude of the coupling strength or otherwise causes the magnitude of the coupling strength to be less than the threshold value (effectively equal to zero). Thus, a threshold value of the coupling strength can define a maximum value of the coupling strength that still preserves single-qubit gate fidelities above a target gate fidelity. Other types gate fidelities and other criteria may be used to define a threshold value of the coupling strength.

Figure 3:
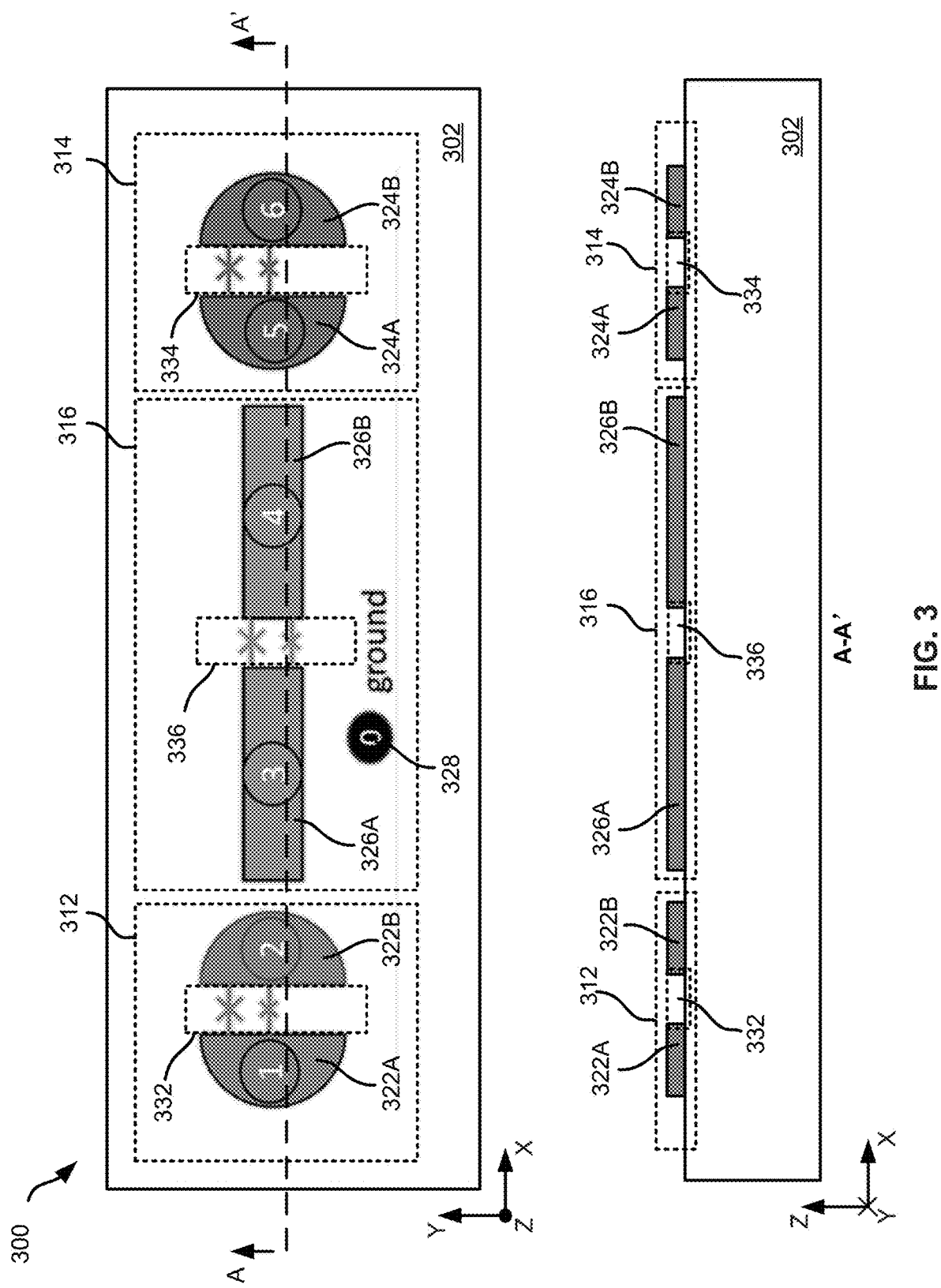
FIG. 3 are schematic diagrams of a top view and a cross-sectional view of an example quantum processing unit.

FIG. 3 are schematic diagrams of a top view and a cross-sectional view of an example quantum processing unit 300. The example quantum processing unit 300 includes superconducting quantum circuit devices. As shown in FIG. 3, the superconducting quantum circuit devices in the example quantum processing unit 300 include a first tunable floating qubit device 312, a second tunable floating qubit device 314, and a tunable floating coupler device 316. As shown in FIG. 3, the example quantum processing unit 300 includes a ground plane 328 surrounding the first and second tunable floating qubit devices 312, 314 and the tunable floating coupler device 316, and other superconducting quantum circuit devices.

Figure 10:
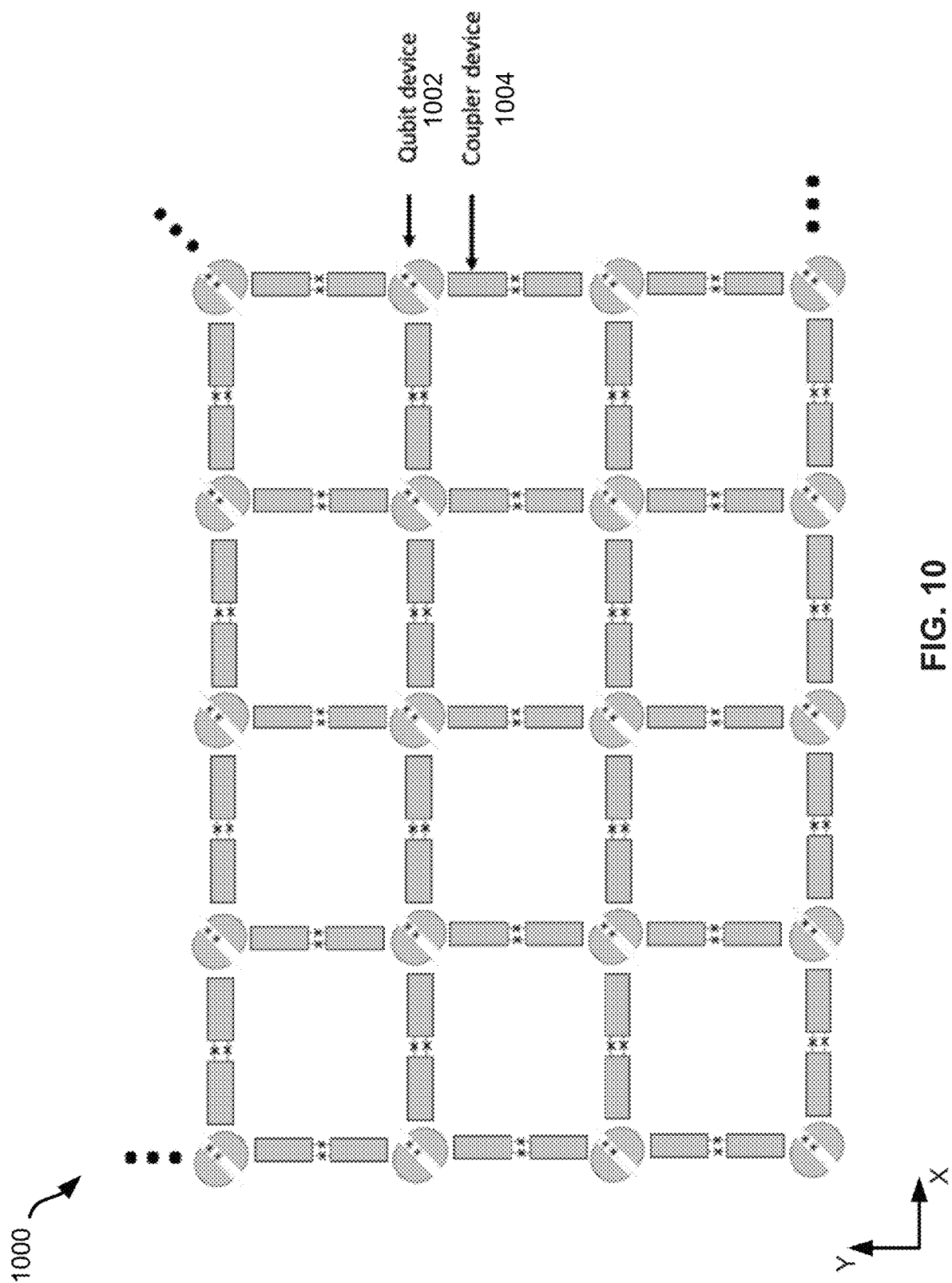
FIG. 10 is a schematic diagram showing a top view of an example quantum processing unit.
Figure 11:
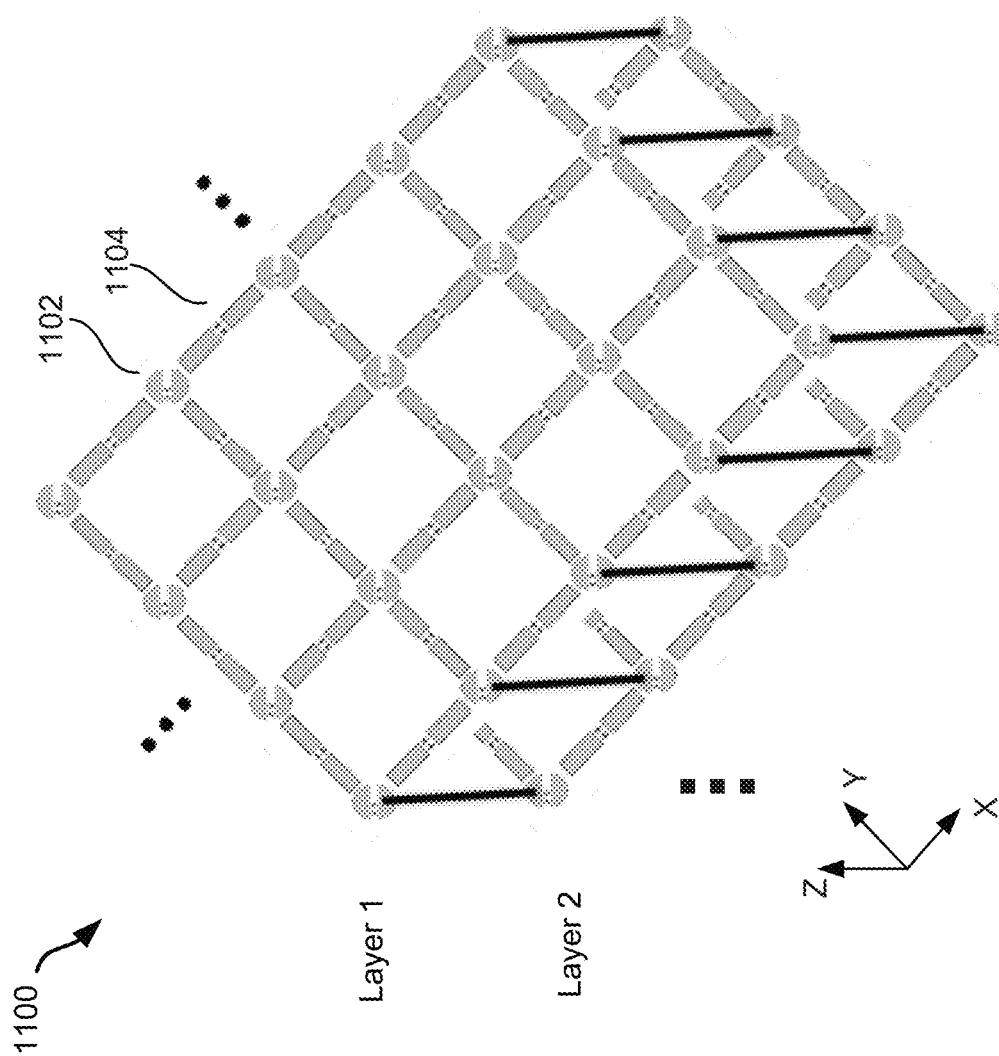
FIG. 11 is a schematic diagram showing a perspective view of an example quantum processing unit.

In some examples, the first and second tunable floating qubit devices 312, 314 and the tunable floating coupler device 316 may be implemented by other types of systems, and the features and components represented in FIG. 3 can be extended in a larger two-dimensional or three-dimensional array of devices (e.g., the two-dimensional and three-dimensional arrays 1000, 1100 shown in FIGS. 10-11). The example quantum processing unit 300 may include additional or different features and components, which may be configured in another manner. For example, the superconducting quantum circuit devices may include respective readout resonator devices associated with the first and second tunable floating qubit devices 312, 314 for performing readout operations. For another example, the example quantum processing unit 300 may include control lines (e.g., flux bias control lines and/or XY qubit control lines) for providing control signals (e.g., to activate or deactivate coupling between the first and second tunable floating qubit devices 312, 314) and performing multi-qubit quantum logic gates.

Each of the first and second tunable floating qubit devices 312, 314 and the tunable floating coupler device 316 includes a superconducting circuit loop that has two Josephson junctions connected in parallel. Particularly, the first tunable floating qubit device 312 includes a first superconducting circuit loop 332; the second tunable floating device 314 includes a second superconducting circuit loop 334; and the tunable floating coupler device 316 includes a third superconducting circuit loop 336. In some implementations, each of the first, second, and third superconducting circuit loops 332, 334, and 336 can be inductively coupled to (has a mutual inductance with) a respective control line, which can individually tune a magnetic flux in a respective superconducting circuit loop. The control lines are connected to an external control system (e.g., the control system 202 in FIG. 2) which is configured to generate respective flux control signals. The two Josephson junctions in a superconducting circuit loop include an asymmetric Superconducting Quantum Interference Device (SQUID). In some instances, the first and second tunable floating qubit devices 312, 314 and the tunable coupler device 316 may include additional or different features, and may operate as described with respect to FIG. 3 or in another manner. For example, the superconducting circuit loops 332, 334, and 336 may include more than two Josephson junctions, e.g., the first and second tunable floating qubit devices 312, 314 and the tunable floating coupler device 316 may be implemented as the first and second tunable floating qubit devices 1202, 1204 and the tunable floating coupler device 1206 shown in FIG. 12, respectively.

As shown in FIG. 3, each of the first and second tunable floating qubit devices 312, 314 and the tunable coupler device 316 includes a pair of qubit electrodes. Particularly, the first tunable floating qubit device 312 includes a first pair of qubit electrodes 322A/322B; the second tunable floating qubit device 314 includes a second pair of qubit electrodes 324A/324B; and the tunable floating coupler device 316 includes a third pair of coupler electrodes 326A/326B. Each of the first, second and third pairs of qubit electrodes are electrically floating at a certain potential without being conductively connected to the ground plane 328. In other words, since the ground plane 328 are configured around superconducting quantum circuit devices, the qubit electrodes 322A/322B, 324A/324B, and coupler electrodes 326A/326B are capacitively coupled to the ground plane 328.

In some examples, a shunt capacitor can be formed between two qubit electrodes from the same superconducting quantum circuit device. As shown in the example equivalent circuit 400 of the example quantum processing unit 300, the shunt capacitors 422, 424, 426 are caused by the two qubit electrodes 322A/322B, 324A/324B, and coupler electrodes 326A/326B in the first and second tunable floating qubit devices 402, 404, and the tunable floating coupler device 406, respectively. In some instances, a residual capacitor can be formed between two qubit electrodes from two distinct superconducting quantum circuit devices forming a capacitive coupling between the two distinct superconducting quantum circuit devices. As shown in the example equivalent circuit 400 of the example quantum processing unit 300, a residual capacitor can be formed between a coupler electrode of the tunable floating coupler device 316 and a qubit electrode of first or second tunable floating qubit devices 312, 314. In some instances, a residual capacitor can be formed between a qubit electrode of the first tunable floating qubit device 312 and a qubit electrode of the second tunable floating qubit device 314. Therefore, a static capacitive coupling ($g_{12}$) between the first and second tunable floating qubit devices 402, 404 includes two components, e.g., a direct capacitive coupling component and an indirect capacitive coupling component. In some instances, the direct capacitive coupling component is caused by the capacitance formed between qubit electrodes 322A/322B of the first tunable floating qubit device 312 and qubit electrodes 324A/324B of the second tunable floating qubit device 314. In some instances, the indirect capacitive coupling component is a capacitive coupling mediated by the tunable floating coupler device 406. The indirect capacitive coupling component is caused by the capacitances formed between coupler electrodes 326A/326B of the tunable floating coupler device 406 and qubit electrodes 322A/322B/324A/324B of the first and second tunable floating qubit devices 402, 404.

The example quantum processing unit 300 shown in FIG. 3 resides on the top surface of a substrate 302. In certain instances, the substrate 302 may be an elemental semiconductor, for example silicon (Si), germanium (Ge), selenium (Se), tellurium (Te), or another elemental semiconductor. In some instances, the substrate 302 may also include a compound semiconductor such as aluminum oxide (sapphire), silicon carbide (SiC), gallium arsenic (GaAs), indium arsenide (InAs), indium phosphide (InP), silicon germanium (SiGe), silicon germanium carbide (SiGeC), gallium arsenic phosphide (GaAsP), gallium indium phosphide (GaInP), or another compound semiconductor. In some instances, the substrate 302 may also include a superlattice with elemental or compound semiconductor layers. In certain instances, the substrate 302 includes an epitaxial layer. In some examples, the substrate 302 may have an epitaxial layer overlying a bulk semiconductor or may include a semiconductor-on-insulator (SOI) structure.

The electrodes 322A, 322B, 324A, 324B, 326A, and 326B and the ground plane 328 include superconductive materials and can be formed by patterning one or more superconductive (e.g. superconducting metal) layers or other materials on the surface of the substrate 302. In some implementations, each of the one or more superconductive layers include a superconducting metal, such as aluminum (Al), niobium (Nb), tantalum (Ta), titanium (Ti), vanadium (V), tungsten (W), zirconium (Zr), or another superconducting metal. In some implementations, each of the one or more superconductive layers may include a superconducting metal alloy, such as molybdenum-rhenium (Mo/Re), niobium-tin (Nb/Sn), or another superconducting metal alloy. In some implementations, each of the superconductive layers may include a superconducting compound material, including superconducting metal nitrides and superconducting metal oxides, such as titanium-nitride (TiN), niobium-nitride (NbN), zirconium-nitride (ZrN), hafnium-nitride (HfN), vanadium-nitride (VN), tantalum-nitride (TaN), molybdenum-nitride (MoN), yttrium barium copper oxide (Y—Ba—Cu—O), or another superconducting compound material. In some instances, the electrodes 322A, 322B, 324A, 324B, 326A, and 326B and the ground plane 328 may include multilayer superconductor-insulator heterostructures.

In some implementations, the electrodes 322A, 322B, 324A, 324B, 326A, and 326B and the ground plane 328 are fabricated on the top surface of the substrate 302 and patterned using a microfabrication process or in another manner. For example, the electrodes 322A, 322B, 324A, 324B, 326A, and 326B and the ground plane 328 may be formed by performing at least some of the following fabrication steps: using chemical vapor deposition (CVD), physical vapor deposition (PVD), atomic layer deposition (ALD), spin-on coating, and/or other suitable techniques to deposit respective superconducting layers on the substrate 302; and performing one or more patterning processes (e.g., a lithography process, a dry/wet etching process, a soft/hard baking process, a cleaning process, etc.) to form openings in the respective superconducting layers.

FIG. 4 is a circuit diagram showing an example equivalent circuit 400 of the example quantum processing unit 300 in FIG. 3. The example equivalent circuit 400 represented in FIG. 4 includes a first tunable floating qubit device 402, a second tunable floating qubit device 404, and a tunable floating coupler device 406. For instance, the equivalent circuit 400 in FIG. 4 can represent a pair of qubit devices 212B, 212C and the tunable coupler device 214C in the quantum processing unit 204 in FIG. 2, or the equivalent circuit 400 in FIG. 4 can represent devices in another type of system or environment.

In the example shown in FIG. 4, each of the first and second tunable floating qubit devices 402, 404 and the tunable floating coupler device 406 is implemented as a tunable-frequency transmon qubit device. As shown, the first tunable floating qubit device 402 includes two Josephson junctions, e.g., a first Josephson junction 432A and a second Josephson junction 432B. The first and second Josephson junctions 432A, 432B having Josephson energies $E_{JS1}$ and $E_{JL1}$ are connected in parallel with each other to form a first superconducting circuit loop 412. The first tunable floating qubit device 402 also includes a shunt capacitor 422 with a capacitance $C_1$, which is connected in parallel with the two Josephson junctions 432A, 432B. The shunt capacitor 422 is caused by two qubit electrodes of the first tunable floating qubit device 402, e.g., the two qubit electrodes 322A, 322B as shown in the first tunable floating qubit device 312 in FIG. 3.

The second tunable floating qubit device 404 includes two Josephson junctions, e.g., a third Josephson junction 434A and a fourth Josephson junction 434B. The third and fourth Josephson junctions 434A, 434B having Josephson energies $E_{JS2}$ and $E_{JL2}$ are connected in parallel with each other to form a second superconducting circuit loop 414. The second tunable floating qubit device 404 also includes a shunt capacitor 424 with a capacitance $C_2$, which is connected in parallel with the two Josephson junctions 434A, 434B. The shunt capacitor 424 is caused by two qubit electrodes of the second tunable floating qubit device 404, e.g., the two qubit electrodes 324A, 324B as shown in the second tunable floating qubit device 314 in FIG. 3.

The tunable floating coupler device 406 includes two Josephson junctions, e.g., a fifth Josephson junction 436A and a sixth Josephson junction 436B. The fifth and sixth Josephson junctions 436A, 436B having Josephson energies $E_{JS2}$ and $E_{JL2}$ are connected in parallel with each other to form a third superconducting circuit loop 416. The tunable floating coupler device 406 also includes a shunt capacitor 426 with a capacitance $C_C$, which is connected in parallel with the two Josephson junctions 436A, 436B. The shunt capacitor 426 is caused by two electrodes of the tunable floating coupler device 406, e.g., the two coupler electrodes 326A, 326B as shown in the tunable floating coupler device 316 in FIG. 3.

In the example shown in FIG. 4, each of the first and second tunable floating qubit devices 402, 404 and the tunable floating coupler device 406 is capacitively coupled to the ground plane (e.g., ($\Phi$=0) through respective residual capacitors. Particularly, the first tunable floating qubit device 402 is coupled to the ground plane via residual capacitors 442A, 442B having respective capacitances $C_{s1}$ and $C_{g1}$; the second tunable floating qubit device 404 is coupled to the ground plane via residual capacitors 448A, 448B having respective capacitances $C_{s2}$ and $C_{g2}$; and the tunable floating coupler device 406 is coupled to the ground plane via residual capacitors 450A, 450B having respective capacitances $C_{sc}$ and $C_{gc}$.

As shown in FIG. 4, the tunable floating coupler device 406 is capacitively coupled to each of the first and second tunable floating qubit devices 402, 404 via respective residual capacitors. Particularly, the tunable floating coupler device 406 is coupled to the first tunable floating qubit device 402 via residual capacitors 444A, 444B with respective capacitances $C_{1cs}$ and $C_{1cg}$; and the tunable floating coupler device 406 is coupled to the second tunable floating qubit device 404 via residual capacitors 446A, 446B with respective capacitances $C_{2cs}$ and $C_{2cg}$. The residual capacitors 444A/444B and 446A/446B represent the indirect capacitive coupling component between the first and second tunable floating qubit devices 402, 404. Further, the first and second tunable floating qubit devices 402, 404 are also capacitively coupled to each other via respective residual capacitors 452A, 452B with respective capacitances $C_{12s}$ and $C_{12g}$. Therefore, the residual capacitors 452A/452B represent the direct capacitive coupling component between the first and second tunable qubit devices 402, 404. The first and second tunable floating qubit devices 402, 404 can be configured apart causing a vanishing direct capacitive coupling component. As discussed below in FIG. 6, such a direct capacitive coupling component between the first and second tunable floating qubit devices 402, 404 is not necessary to cause a total coupling strength to be zero or less than or equal to a predetermined threshold value.

In some implementations, control operations can be performed on the superconducting circuit by providing control signals to the first and second tunable floating qubit devices 402, 404 and the tunable floating coupler device 406 via control lines. The control lines can receive the control signals, for example, from an external control system. In some implementations, each of the control lines can be a conductor, an inductor, or another type of circuit component configured to carry a respective current I, which generates a respective magnetic flux $\Phi(t)$ through the superconducting circuit loops 412, 414 or 416. For instance, the control line may include an inductor (e.g., a partial loop, a single loop, or multiple loops of a conductor) that has a mutual inductance with the superconducting circuit loop 412, 414, or 416. In the example shown, the transition frequency of the first tunable floating qubit device 402 is tuned by tuning a magnetic flux $\Phi_{e1}$ in the first superconducting circuit loop 412; the transition frequency of the second tunable floating qubit device 404 is tuned by tuning a magnetic flux $\Phi_{e2}$ in the second superconducting circuit loop 414; and the transition frequency of the tunable floating coupler device 406 is tuned by tuning a magnetic flux $\Phi_{ec}$ in the third superconducting circuit loop 416. In some instances, the transition frequencies may be controlled in another manner, for instance, by another type of control signal. In some implementations, the control lines may include an inductance loop or another type of flux bias device that is coupled (e.g., conductively, capacitively, or inductively) to a control port to receive control signals, and to the first or second tunable floating qubit device 402, 404. In certain instances, the control signals on the control lines may cause the flux bias device to generate and modulate the magnetic flux in the superconducting circuit loop 412, 414, or 416. In some implementations, the control signals on the control line are implemented as the control signals 206 as shown in FIG. 2.

In some implementations, when the two tunable floating qubit devices 402, 404 are coupled through the tunable floating coupler device 406, the coupling between the two tunable floating qubit devices 402, 404 can be enabled/disabled by tuning a magnetic field applied to the tunable floating coupler device 406. For example, a separate control signal (e.g., a DC or an AC current) can be applied to a control line to tune the magnetic flux threading to the third superconducting circuit loop 416 of the tunable floating coupler device 406 to adjust the transition frequency of the tunable floating coupler device 406. When the magnetic flux on the tunable floating coupler device 406 is at a parking value, the coupling between the two tunable floating qubit devices 402, 404 can be turned off or deactivated. When the magnetic flux on the tunable floating coupler device 406 is at a gate-activating value, the coupling between the two tunable floating qubit device 402, 404 can be activated for performing a multi-qubit quantum logic gate. In another instances, operation for determining the parking value and the gate-activating value of the magnetic flux on the tunable floating coupler device 406 can be implemented with respect to the example process 1700 shown in FIG. 17 or in another manner.

In some implementations, each of the first and second tunable floating qubit devices 402, 404 includes highly asymmetric Josephson junctions (e.g., $E_{JS1} \ll E_{JL1}$, and $E_{JS2} \ll E_{JL2}$) that form the respective superconducting circuit loops 412, 414. The tunable floating coupler device 406 includes symmetric Josephson junctions or asymmetric Josephson junctions. In some implementations, a tunable floating coupler device 406 with asymmetric Josephson junctions allows operating entangling gates by tuning the transition frequency of the tunable floating coupler device 406 to a minimal value to obtain gate stability against flux fluctuations. The strong asymmetry can result in much smaller tunability of the first and second tunable floating qubit devices than that of the tunable floating coupler device 406. The systems and techniques presented here can reduce sensitivity of the tunable floating qubit devices 402, 404 to flux noise thereby improving their coherence times.

The Hamiltonian of the equivalent circuit 400 shown in FIG. 4 is defined by:

$$H = \frac{1}{2}Q^T C^{-1} Q + V(\phi_1, \phi_2, \phi_c) \quad (1)$$

where C is the capacitance matrix, Q is the charge matrix, $V(\phi_1, \phi_2, \phi_c)$ is the potential energy, $\phi_k$, and $\phi_c$ are reduced fluxes representing modes of the tunable floating qubit devices 402, 404, and the tunable floating coupler device 406, respectively. The capacitance matrix C $$C = \frac{1}{4}\begin{pmatrix} 4C_1 + C_{1P} & C_{1M} & -C_{1cm}+C_{1xp} & -C_{1cm}+C_{1xm} & -C_{12p} & -C_{12m} \\ C_{1M} & C_{1P} & -C_{12m}-C_{1xm} & -C_{1cp}-C_{1xp} & -C_{12m} & -C_{12p} \\ -C_{1cm}+C_{1xp} & -C_{12m}-C_{1xm} & 4C_c + C_{\Sigma cs} & C_{12M} & -C_{2cm}+C_{2xp} & -C_{2cm}-C_{2xm} \\ -C_{1cm}+C_{1xm} & -C_{1cp}-C_{1xp} & C_{12M} & C_{\Sigma cs} & -C_{2cp}-C_{2xm} & -C_{2cp}-C_{2xp} \\ -C_{12p} & -C_{12m} & -C_{2cm}+C_{2xp} & -C_{2cp}-C_{2xm} & 4C_2 + C_{2P} & C_{2M} \\ -C_{12m} & -C_{12p} & -C_{2cm}-C_{2xm} & -C_{2cp}-C_{2xp} & C_{2M} & C_{2P} \end{pmatrix} \quad (2)$$

where $C_{\Sigma js} = C_{sj} + C_{jcs} + C_{12s} + C_{jcsg}$ $C_{\Sigma jg} = C_{gj} + C_{jcg} + C_{12g} + C_{jcsg}$ $C_{\Sigma cs} = C_{1cs} + C_{1cgs} + C_{1cs} + C_{1csg} + C_{2cs} + C_{2cgs} + C_{2cs} + C_{2csg}$ $C_{12p/m} = C_{12s} \pm C_{12g}$ $C_{jcp/m} = C_{jcs} \pm C_{jcg}$ $C_{jxp/m} = C_{jcgs} \pm C_{jcgs}$ $C_{jM} = C_{12m} + C_{2cm} + C_{1m} - C_{1xm}$ $C_{jP} = C_{1p} + C_{\Sigma jg} + C_{\Sigma js}$ $j \in \{1,2\} \quad (3)$ where the potential energy $V(\phi_1, \phi_2, \phi_c)$ is given by $V(\phi_1, \phi_2, \phi_c) = -E_{J1}\cos(\phi_1 + \phi_{01}) - E_{jc}\cos(\phi_c + \phi_{0c}) - E_{J1}\cos(\phi_2 + \phi_{02}) \quad (4)$ where $E_{Jk} = \sqrt{E_{JSk}^2 + E_{JLk}^2 + 2E_{JSk}E_{JLk}\cos(2\pi\phi_k)} \quad (5)$ $\phi_{0k} = \tan^{-1}\left(\frac{E_{JSk} - E_{JLk}}{E_{JSk} + E_{JLk}}\tan\frac{\varphi_{ext}}{2}\right),$ $k \in \{1,2,c\}$ Quantizing the Hamiltonian shown in Equation (1) yields $H = 4E_{C1}\hat{\eta}_1^2 + 4E_{C2}\hat{\eta}_2^2 + 4E_{Cc}\hat{\eta}_c^2 + 4E_{1c}\hat{\eta}_1\hat{\eta}_c + 4E_{2c}\hat{\eta}_2\hat{\eta}_c + 4E_{12}\hat{\eta}_1\hat{\eta}_2 + \hat{V}(\hat{\phi}_1, \hat{\phi}_2, \hat{\phi}_c), \quad (6)$ where $E_{Ck}$ are charging energies, $\hat{\eta}_k$ Cooper pair number operators, $E_{jc}$ and $E_{12}$ are the qubit-coupler and qubit-qubit coupling energies, and $\hat{\phi}_k$ are the reduced flux operators.

$\hat{V}(\hat{\phi}_1, \hat{\phi}_2, \hat{\phi}_c) = -E_{J1}\cos(\hat{\phi}_1 + \phi_{01}) - E_{jc}\cos(\hat{\phi}_c + \phi_{0c}) - E_{J1}\cos(\hat{\phi}_2 + \phi_{02}), \quad (7)$ The Hamiltonian can be expressed as:

$$H = \sum_{k=1}^{2,c}\left[\omega_k + \frac{E_{C_k}}{2} - \frac{E_{C_k}}{2}a_k^\dagger a_k\right]a_k^\dagger a_k + \sum_{j=1}^{2}g_{jc}\left(a_j a_c^\dagger + a_j^\dagger a_c - a_j a_c - a_j^\dagger a_c^\dagger\right) + g_{12}\left(a_1 a_2^\dagger + a_1^\dagger a_2 - a_1 a_2 - a_1^\dagger a_2^\dagger\right) \quad (8)$$

where $a_k$ and $a_k^\dagger$ are annihilation and creation operator of harmonics oscillator, $\omega_k$ ($k \in \{1, 2, c\}$) is the transition frequencies of the first and second tunable floating qubit devices 402, 404, and the tunable floating coupler device 406; $g_{jc}$ ($j \in \{1,2\}$) represents coupling strength of the first tunable floating qubit device 402 and the tunable floating coupler device 406, and between the second tunable floating qubit device 404 and the tunable floating coupler device 406, respectively; and $g_{12}$ represents the coupling strength of the first and second tunable floating qubit devices 402, 404. The transition frequency $\omega_k$ is given by:

$\omega_k = \sqrt{8E_{Jk}E_{Ck}} - E_{Ck}, k \in \{1,2,c\} \quad (9)$ and $g_{jc} = \frac{E_{jc}}{2}\left(\frac{E_{Jj}}{E_{Cj}}\frac{E_{Jc}}{E_{Cc}}\right), j \in \{1,2\} \quad (10)$ $g_{12} = \frac{E_{12}}{2}\left(\frac{E_{J1}}{E_{C1}}\frac{E_{J2}}{E_{C2}}\right)$ The effective qubit-qubit Hamiltonian can be derived by adiabatically eliminating the tunable floating coupler device 406 in the dispersive limit, where the couplings between the tunable floating coupler device 406 and the respective tunable floating qubit devices 402, 404 are much smaller than their respective detunings. In some implementations, this can be done using the Schrieffer-Wolff transformations. In the limit that the qubits associated with the two tunable floating qubit devices approximated by the lowest two energy levels, the diagonalized Hamiltonian has the form as below:

$\tilde{H} \approx \tilde{\omega}_1\sigma_1^\dagger\sigma_1 + \tilde{\omega}_2\sigma_2^\dagger\sigma_2 + g(\sigma_1 + \sigma_1^\dagger)\sigma_2 + \sigma_2^\dagger) \quad (11)$ where the dressed qubit frequencies are defined as below $\tilde{\omega}_j = \omega_j - g_{jc}^2\left(\frac{1}{\omega_c - \omega_j} + \frac{1}{\omega_c + \omega_j}\right), j \in \{1,2\} \quad (12)$ The total coupling between the first and second tunable floating qubit devices 402, 404 is given by:

$g = g_{12} - g_{eff} \quad (13)$

In some implementations, the tunable floating coupler device 406 is not populated and remains in its ground state.

As shown in Equation (13), the total coupling strength g has two parts, e.g., $g_{12}$ representing a static capacitive coupling, and $g_{eff}$ representing an effective virtual coupling. The effective virtual coupling strength $g_{eff}$ is given by:

$$g_{eff} = \frac{g_{1c}g_{2c}}{2} \sum_{j=1,2} \left( \frac{1}{\omega_c - \omega_j} + \frac{1}{\omega_c + \omega_j} \right). \quad (14)$$

In some implementations, the static capacitive coupling $g_{12}$ includes a contribution from a direct capacitive coupling (e.g., capacitors 452A, 452B) and an indirect coupler-mediated capacitive coupling (e.g., the capacitors 444A, 444B, 446A, 446B). The coupling strength value (e.g., magnitude and sign) of the static coupling $g_{12}$ is fixed after the quantum processing unit 300 is fabricated. In some examples, the sign of the coupling strength value of the static coupling $g_{12}$ is positive under typical device parameters for tunable-frequency transmon qubit devices. On the other hand, once the device is fabricated, the value of the effective virtual coupling $g_{eff}$ can be adjusted to compensate the value of the static coupling $g_{12}$. As shown in Equation (14), the magnitude and the polarity of the effective virtual coupling $g_{eff}$ is affected by the transition frequencies of the tunable floating qubit device 402, 404, the transition frequency of the tunable floating coupler device 406.

For example, when the frequency of the tunable floating coupler device 406 is greater than the frequencies of the two tunable floating qubit devices 402, 404 (e.g., $\omega_c > \omega_j$, $j \in \{1, 2\}$), the summation term in Equation (14) is greater than zero, the value of the effective virtual coupling $g_{eff}$ can be tuned to positive by adjusting the polarity of the coupling strength $g_{1c}$ and/or $g_{2c}$ according to Equation (10). In this case, this allows exchange of energy between the qubits defined by the tunable floating qubit devices 402, 404 without populating the states of the tunable floating coupler device 406. For another example, when the frequency of the tunable floating coupler device 406 is less than the frequencies of the two tunable floating qubit devices 402, 404 (e.g., $\omega_c < \omega_j$, $j \in \{1,2\}$), the summation term in Equation (14) is less than zero, the value of the effective virtual coupling $g_{eff}$ can still be tuned to positive by adjusting the polarity of the coupling strength $g_{1c}$ and/or $g_{2c}$ according to Equation (10).

In some instances, such effective virtual coupling $g_{eff}$ is via a virtual photon coupling or another type of coupling mechanism. Since the effective virtual coupling $g_{eff}$ depends on the detuning between the tunable floating coupler device 406 and the tunable floating qubit devices 402, 404, it can be controlled by tuning the transition frequency of the tunable floating coupler device 406. Therefore, the value of the total coupling g can be adjusted to zero by tuning the transition frequency of the tunable floating coupler device 406 by tuning the magnetic flux in the third superconducting circuit loop 416 of the tunable floating coupler device 406, such that the static coupling and the effective virtual coupling are equal, e.g., $g_{12} = g_{eff}$. In some instances, when the coupling strength is tuned to zero, the qubits defined by the two tunable floating qubit devices may stay at respective initial states. The value of the magnetic flux for tuning the frequency of the tunable floating coupler device 406 causes a magnitude of the total coupling strength g to vanish (e.g., equal to zero, close to zero, or less than or equal to a threshold value) is a parking value.

In some implementations, the threshold value of the coupling strength is associated with one or more circuit performance parameters. In some instances, a threshold value of the total coupling strength can be determined according to a target gate fidelity or a target gate error rate. In some instances, a gate fidelity is limited by the coherence time. In some instances, the coupling strength of a ZZ coupling between the first and second tunable floating qubit devices can be determined based on a gate time and a target gate fidelity or a gate error rate. In certain examples, the threshold value of the coupling strength of the ZZ coupling, the target gate fidelity (F), and a gate time ($t_g$) of a single-qubit quantum logic gate are related such that $$\zeta \leq \frac{2}{t_g} \sqrt{6(1-F)};$$

here, the threshold value is $$\frac{2}{t_g} \sqrt{6(1-F)},$$

but another threshold value may be used. In some examples, the coupling strength of the ZZ coupling that the parking value of the magnetic flux corresponds to, the target gate fidelity (F), and a gate time ($t_g$) of a single-qubit quantum logic gate are related according to a different relationship. For example, a threshold value of the total coupling strength may be different for target gate fidelity values of 0.99, 0.999, 0.9999. In some examples, when the target gate fidelity is 0.9999, the threshold value of the coupling strength $$\left(\frac{\zeta}{2\pi}\right)$$

of the ZZ coupling is 260 kilohertz (kHz); that is to say, the parking value of the magnetic flux corresponds to a coupling strength that is less than or equal to 260 kilohertz (kHz).

The total coupling strength may include a coupling strength of an XX coupling or a coupling strength of a ZZ coupling between the first and second tunable floating qubit devices 402, 404. A coupling strength of each of the XX coupling and the ZZ coupling is a function of control parameters (e.g., the magnetic flux in the third superconducting circuit loop 416, or a bias current on a flux bias control line associated with the third superconducting circuit loop 416), which can cross zero. In some instances, the XX coupling and the ZZ coupling crosses zero (e.g., vanishes) at the same values of the control parameters. In some instances, the XX coupling and the ZZ coupling cross zero at different values of the control parameters. For example, when the XX coupling crosses zero at the parking value of a control parameter (e.g., the magnetic flux applied to the third superconducting circuit loop 416), there can be a nonvanishing residual ZZ coupling.

Figure 5A:
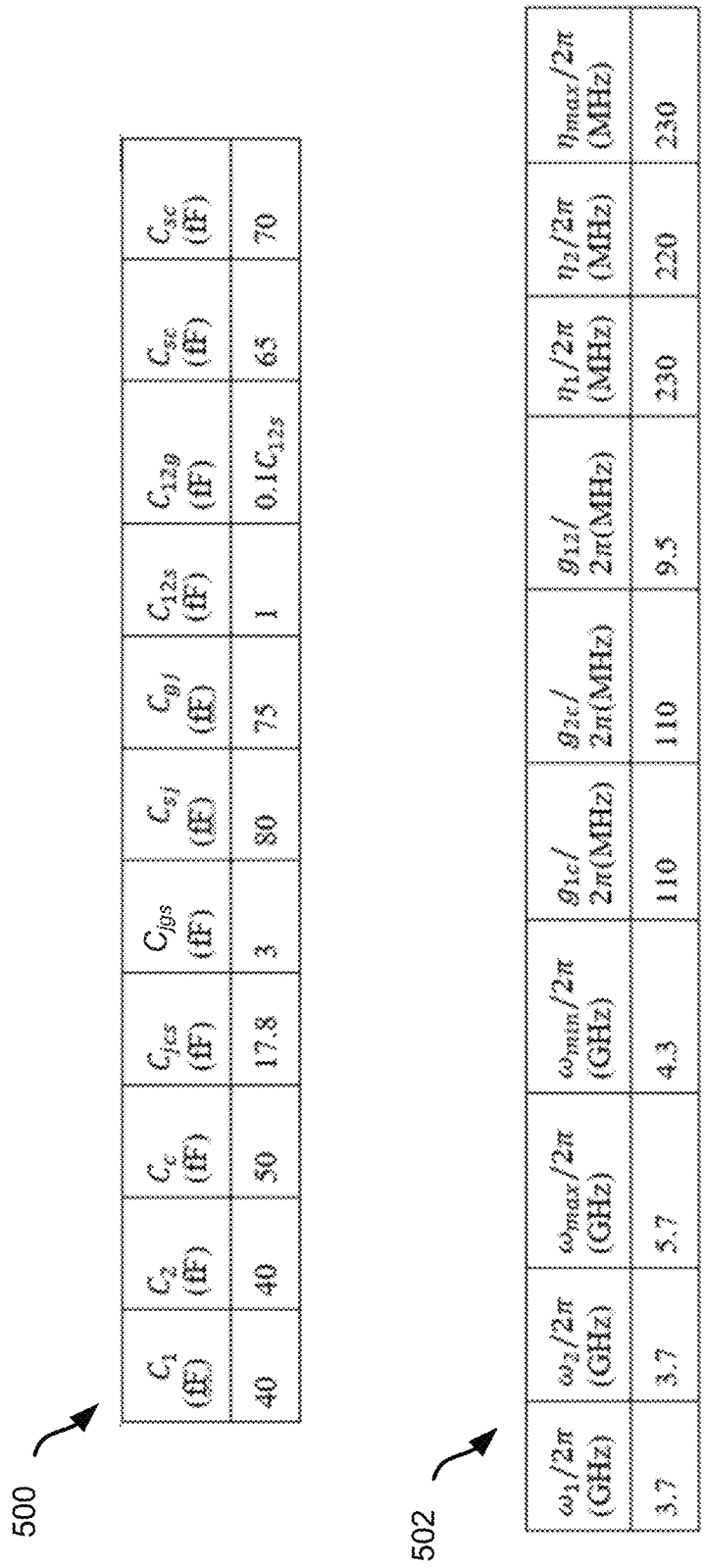
FIG. 5A are tables showing circuit parameters of the circuit components and device parameters of the superconducting quantum circuit devices in the example quantum processing unit in FIG. 3 represented by the example equivalent circuit in FIG. 4.

FIG. 5A are tables 500, 502 showing circuit parameters of the circuit components and device parameters of the superconducting quantum circuit devices in the example quantum processing unit in FIG. 3 represented by the example equivalent circuit in FIG. 4. The device parameters are for the two tunable floating qubit devices 402, 404 and the tunable floating coupler device 406 shown in FIG. 4. The circuit parameters and the device parameters shown in the tables 500, 502 of FIG. 5A are used for performing a numerical study of the example quantum processing unit 300 represented by the example equivalent circuit 400.

Figure 5B:
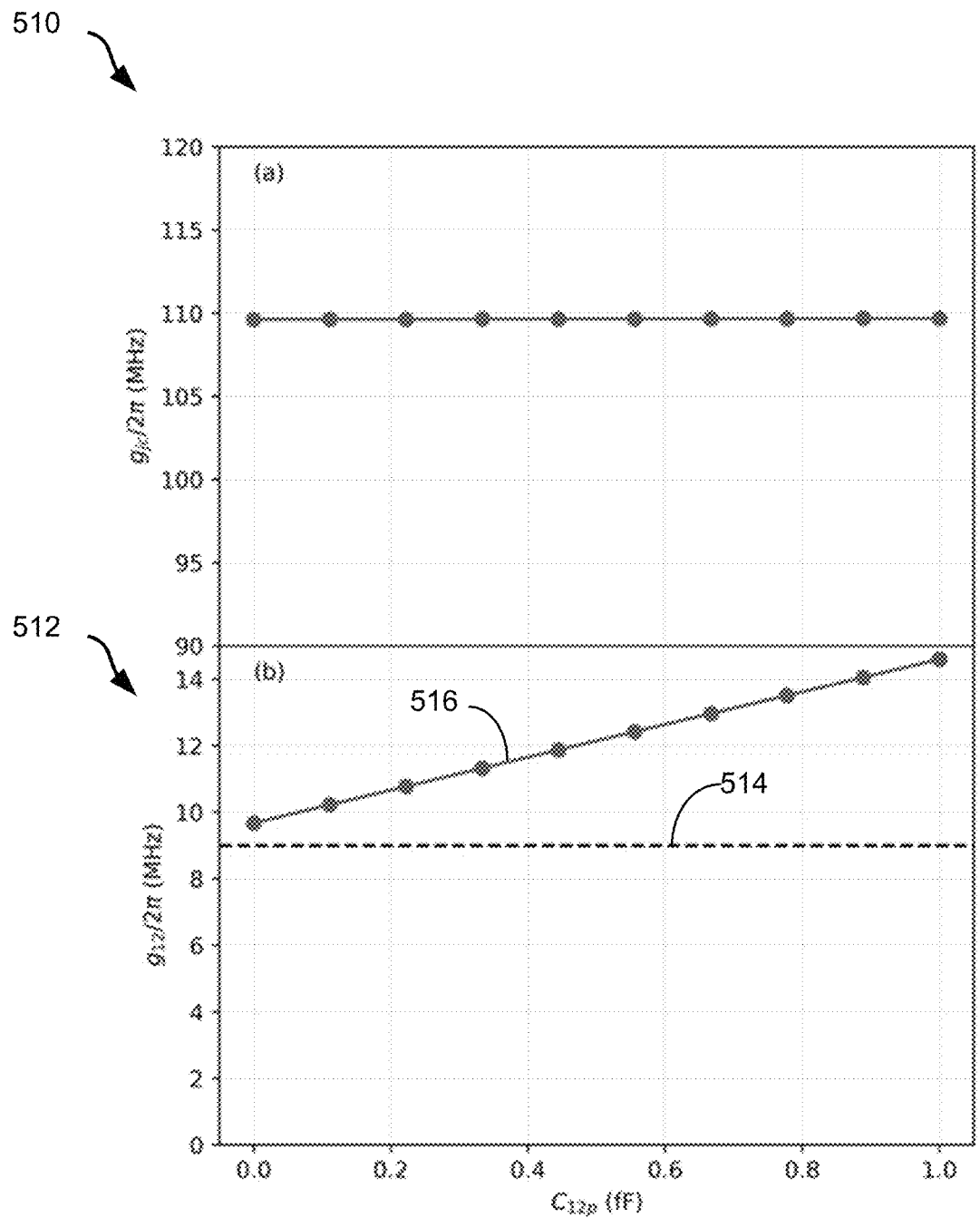
FIG. 5B are plots showing a coupling strength $g_{jc}$ between a tunable floating qubit device and a tunable floating coupler device and a static coupling strength $g_{12}$ between two tunable floating qubit devices in the example quantum processing unit in FIG. 3 as functions of a direct residual capacitance $C_{12p}$.

FIG. 5B are plots 510, 512 showing a coupling strength $g_{jC}$ between a tunable floating qubit device and a tunable floating coupler device and a static coupling strength $g_{12}$ between two tunable floating qubit devices in the example quantum processing unit 300 in FIG. 3 as functions of a direct residual capacitance $C_{12p}$. As shown in Equation (3) above, $C_{12p}=C_{12s}+C_{12g}$. As shown in the plot 510, the coupling strength $g_{jc}$ ($j \in \{1,2\}$) between each of the first and second tunable floating qubit devices 402, 404 and the tunable floating coupler device 406 remain constant as the residual capacitance $C_{12p}$ varies between 0 and 1 fF. As shown in the plot 512, the dashed line 514 represents the magnitude of the static coupling $g_{12}$ that is needed to cancel the effective virtual coupling so that the total coupling strength g is zero for $\Phi_{ec} \geq 0$, where $\Phi_{ec}$ is the external flux applied to the tunable floating coupler device. The solid line 516 in FIG. 5B shows that a static coupling strength $g_{12}$ with magnitude values greater than the first magnitude value represented by the dotted line 514 can be achieve even when the residual capacitance $C_{12p}=0$, implying that the direct capacitive coupling component between the two tunable floating qubit devices 402, 404 is not required to achieve a total coupling strength of zero (e.g., g=0). In some implementations, when using tunable floating qubit devices and tunable floating coupler devices, there exists a finite value of a control parameter (e.g., the coupler flux bias) applied to the tunable floating coupler device resulting in the total coupling strength of zero. In effect, this tunable floating coupler device enables a realization of total coupling strength on demand: turn ON and OFF the coupling between the first and second tunable floating qubit devices 402, 404 when needed. The systems and methods presented here enable scalable quantum processors. The systems and methods presented here relax the requirement of the pitch size between the first and second tunable qubit devices in order to obtain a residual coupling capacitance with a finite value. The greater pitch provides space to place other quantum circuit components of the quantum processor unit, for example, readout resonator devices, cap, etc. In some instances, the systems and methods presented here enable superconducting quantum circuit devices with a greater pitch size while maintaining the device performance. In some instances, increasing the pitch size between the two tunable floating qubit devices 402, 404 improves design flexibilities and allows an addition of additional circuit components. For example, Purcell filters can be added to the quantum processing unit for improving the readout fidelity and the coherence times of the tunable floating qubit devices, reducing the readout time, and for implementation of quantum error detection and corrections schemes.

Figure 5C:
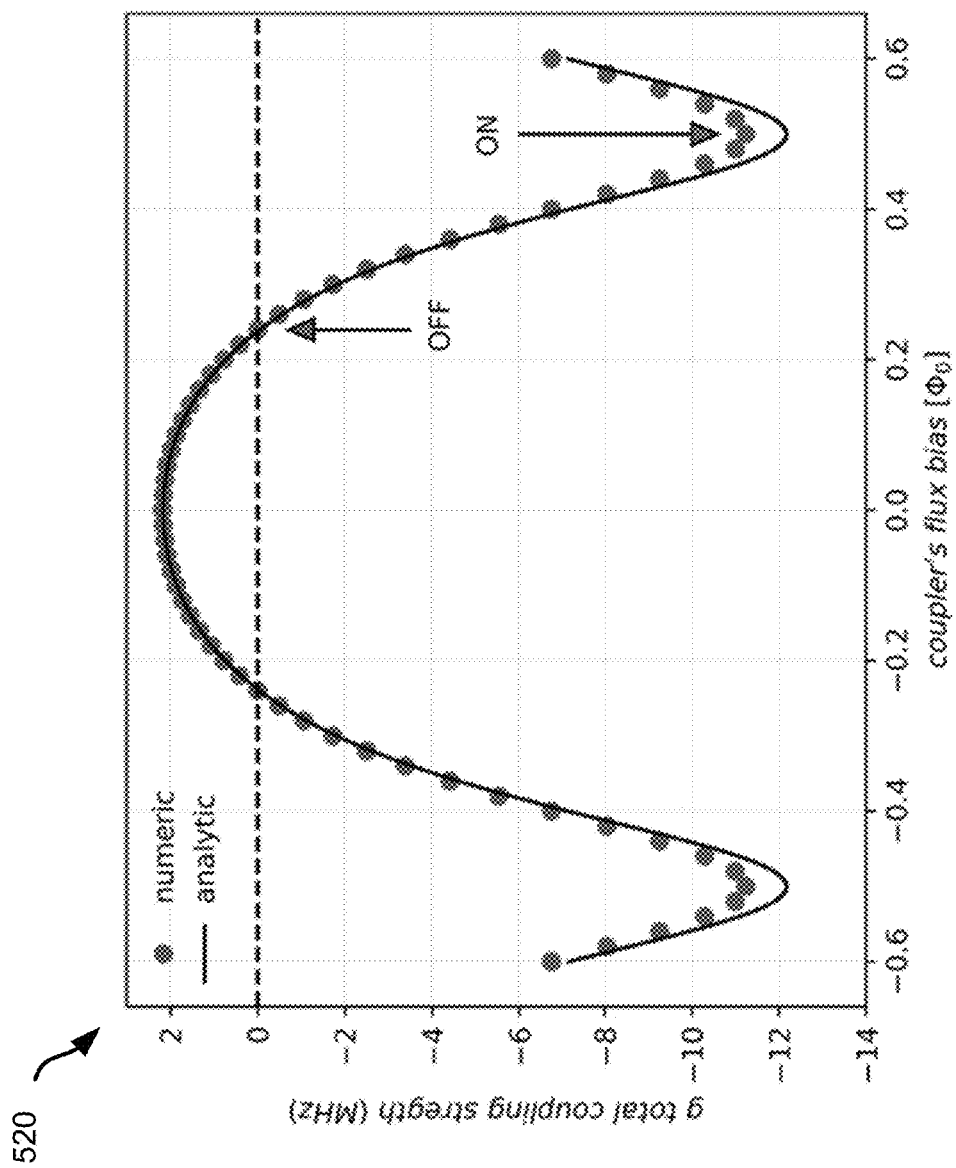
FIG. 5C is a plot showing a total coupling strength g as a function of a coupler flux bias $\Phi_{ec}$ applied to the tunable floating coupler device in the example quantum processing unit in FIG. 3 represented by the example equivalent circuit in FIG. 4.

FIG. 5C is a plot 520 showing a total coupling strength g as a function of a coupler flux bias $\Phi_{ec}$ applied to the tunable floating coupler device in the example quantum processing unit 300 in FIG. 3 represented by the example equivalent circuit 400 in FIG. 4. As shown in FIG. 5C, the solid line shows analytic results using Equations (10, 13, and 14) while the dotted line shows numerical results. The total coupling strength g at a coupler flux bias of zero ($\Phi_{ec}=0$) is equal to 2 MHz. In some implementations, the non-zero value of the total coupling strength at a coupler flux bias value of zero increases the chance of getting a total coupling strength of zero, for example when considering process-induced variations. In some cases, to ensure zero total coupling strength at a finite coupler flux bias $\Phi_{ec}$, the maximum frequency ($\omega_{c,max}$) of the tunable floating coupler device 406 can be placed even higher while keeping the minimum frequency ($\omega_{c,min}$) in the dispersive regime, e.g., $g_{jc}/(\omega_c-\omega_j) \ll 1$.

As shown in FIG. 5C, the total coupling strength crosses zero (e.g., g=0) at a coupler flux bias value of $0.22\Phi_0$. At this coupler flux bias value (e.g., $\Phi_{ec}=\pm 0.22\Phi_0$), the coupling between the first and second tunable floating qubit devices 402, 404 is deactivated. As the magnitude of the coupler flux bias increases, the total coupling strength g increases, reaching a maximum absolute value at a coupler flux bias of $\Phi_{ec}=\pm 0.5\Phi_0$. In some instances, when operating at a coupler flux bias of $\Phi_{ec}=\pm 0.5\Phi_0$, the value of the frequency of the tunable floating coupler device 406 is at its maximum value. In some instances, when operating at a coupler flux bias of $\Phi_{ec}=\pm 0.5\Phi_0$, the value of the frequency of the tunable floating coupler device 406 is at its minimum value. In some instances, the $\Phi_{ec}=\pm 0.22\Phi_0$ is the parking value of the coupler flux bias and the $\Phi_{ec}=\pm 0.5\Phi_0$ is a gate-activating value of the coupler flux bias. By adjusting the value of the coupler flux bias from the parking value to the gate-activating value, the total coupling can be turned on when preparing the tunable floating qubit devices for quantum logic gates; and when the quantum logic gates are completed, the value of the coupler flux bias can be tuned back to the parking value to turn off the coupling between the two tunable floating qubit devices 402, 404, e.g., suppress crosstalk between the two tunable floating qubit devices 402, 404.

The methods and techniques described here enable the realization of an adjustable coupling between the two tunable floating qubit devices. The methods and techniques described here eliminate the requirement on the direct residual capacitive coupling between the two tunable floating qubit devices to cancel the total coupling strength at a parking value of a coupler flux bias. This allows us to increase the pitch size between two neighboring qubit devices and thus for achieving a scalable architecture. Using asymmetric Josephson junctions in the tunable floating coupler device allows operating quantum logic gates at a minimum frequency value of the tunable floating coupler device, e.g., when the flux bias $\Phi_{ec}=0.5\Phi_0$, which is first-order insensitive to flux noise and flux fluctuations. In addition, the total coupling strength g is first-order insensitive to flux fluctuations, resulting in stable quantum logic gates.

In some instances, when the total coupling strength becomes less than or equal to a threshold value, the total coupling between two tunable floating qubit devices can be considered as deactivated. The threshold value of the total coupling strength is a nonvanishing residual coupling strength. In certain instances, the threshold value may be determined according to different performance requirements. For example, different values of gate fidelity may require different threshold values of the total coupling strength. In some implementations, the threshold value of the total coupling strength may be different according to another performance parameter or in another manner.

Figure 6:
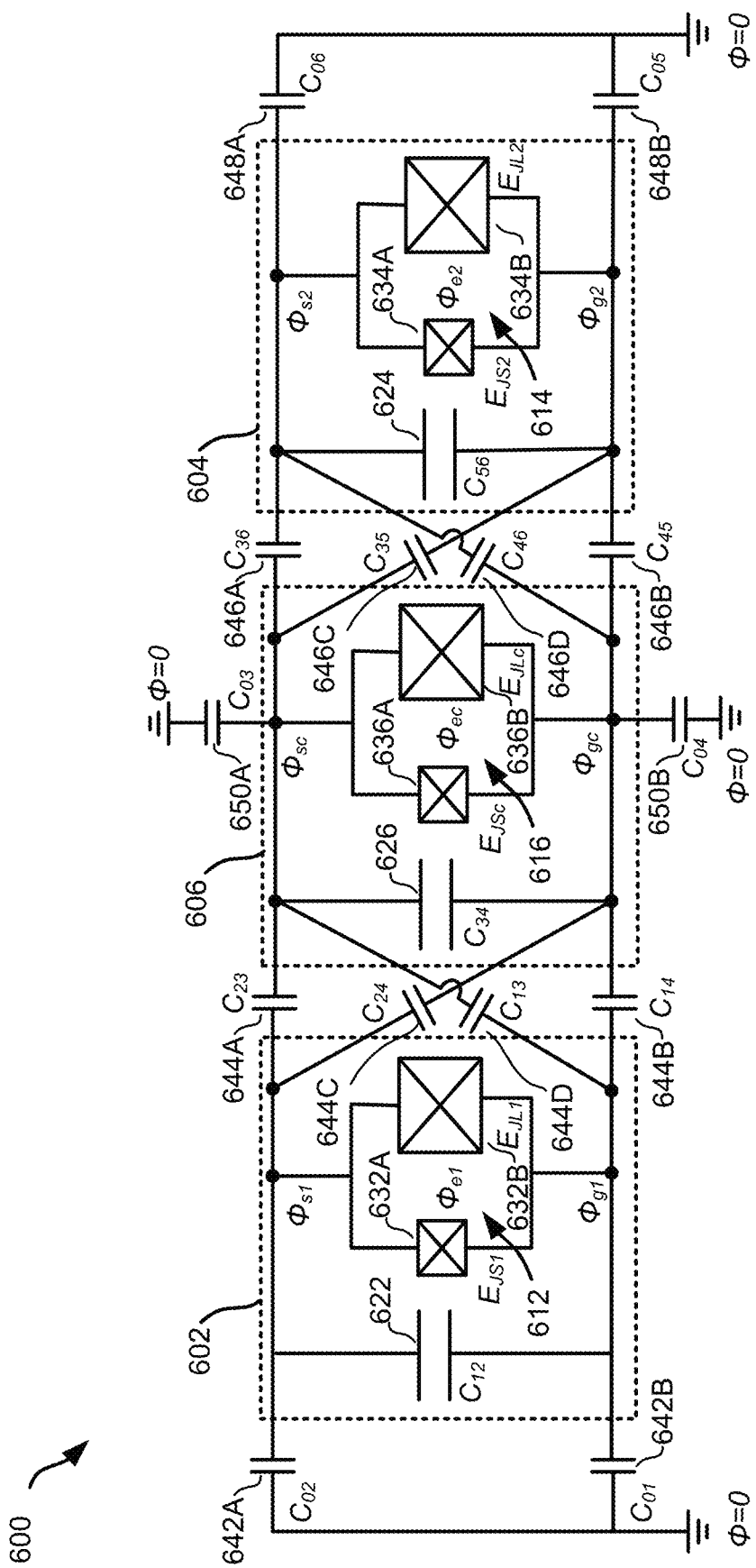
FIG. 6 is a circuit diagram showing an example equivalent circuit of the example quantum processing unit in FIG. 3.

FIG. 6 is a circuit diagram showing an example equivalent circuit 600 of the example quantum processing unit 300 in FIG. 3. The example equivalent circuit 600 represented in FIG. 6 includes a first tunable floating qubit device 602, a second tunable floating qubit device 604, and a tunable floating coupler device 606. For instance, the equivalent circuit 600 in FIG. 6 can represent a pair of qubit devices 212B, 212C and the tunable coupler device 214C in the quantum processing unit 204 in FIG. 2, or the equivalent circuit 600 in FIG. 6 can represent devices in another type of system or environment.

As shown, the first tunable floating qubit device 602 includes two Josephson junctions, e.g., a first Josephson junction 632A and a second Josephson junction 632B. The first and second Josephson junctions 632A, 632B having Josephson energies $E_{JS1}$ and $E_{JL1}$ are connected in parallel with each other to form a first superconducting circuit loop 612. The first tunable floating qubit device 602 also includes a shunt capacitor 622 with a capacitance $C_{12}$, which is connected in parallel with the two Josephson junctions 632A, 632B. The shunt capacitor 622 is introduced by two qubit electrodes of the first tunable floating qubit device 402, e.g., the two qubit electrodes 322A, 322B as shown in the first tunable floating qubit device 312 in FIG. 3.

The second tunable floating qubit device 604 includes two Josephson junctions, e.g., a third Josephson junction 634A and a fourth Josephson junction 634B. The third and fourth Josephson junctions 634A, 634B having Josephson energies $E_{JS2}$ and $E_{JL2}$ are connected in parallel with each other to form a second superconducting circuit loop 614. The second tunable floating qubit device 604 also includes a shunt capacitor 624 with a capacitance $C_{56}$, which is connected in parallel with the two Josephson junctions 634A, 634B. The shunt capacitor 624 is introduced by two qubit electrodes of the second tunable floating qubit device 604, e.g., the two qubit electrodes 324A, 324B as shown in the second tunable floating qubit device 314 in FIG. 3.

The tunable floating coupler device 606 includes two Josephson junctions, e.g., a fifth Josephson junction 636A and a sixth Josephson junction 636B. The fifth and sixth Josephson junctions 636A, 636B having Josephson energies $E_{JSC}$ and $E_{JL2}$ are connected in parallel with each other to form a third superconducting circuit loop 616. The tunable coupler device 606 also includes a shunt capacitor 626 with a shunt capacitance $C_{34}$, which is connected in parallel with the two Josephson junctions 636A, 636B. The shunt capacitor 626 is introduced by two electrodes of the tunable floating coupler device 606, e.g., the two coupler electrodes 326A, 326B as shown in the tunable floating coupler device 316 in FIG. 3.

In the example shown in FIG. 6, the first and second tunable floating qubit devices 602, 604 and the tunable floating coupler device 606 may be implemented as the first and second tunable floating qubit devices 402, 404 and the tunable floating coupler device 406, respectively, shown in FIG. 4. Each of the first and second tunable floating qubit devices 602, 604 and the tunable floating coupler device 606 is capacitively coupled to the ground plane (e.g., Φ=0) through respective residual capacitors. Particularly, the first tunable floating qubit device 602 is coupled to the ground plane via residual capacitors 642A, 642B having respective capacitances $C_{01}$ and $C_{02}$; the second tunable floating qubit device 604 is coupled to the ground plane via residual capacitors 648A, 648B having respective capacitances $C_{05}$ and $C_{06}$; and the tunable floating coupler device 606 is coupled to the ground plane via residual capacitors 650A, 650B having respective capacitances $C_{03}$ and $C_{04}$. As shown in FIG. 6, the tunable floating coupler device 606 is capacitively coupled to each of the first and second tunable floating qubit devices 602, 604 via respective residual capacitors. Particularly, the tunable coupler device 606 is coupled to the first tunable floating qubit device 602 via residual capacitors 644A, 644B with respective capacitances $C_{14}$ and $C_{23}$; and the tunable floating coupler device 606 is coupled to the second tunable floating qubit device 604 via residual capacitors 646A, 646B with respective capacitances $C_{45}$ and $C_{36}$. The residual capacitor 644A is caused by the capacitance between the electrodes 322A, 326A; and the second residual capacitor 644B is caused by the capacitance between the electrodes 322A, 326B. Unlike the example equivalent circuit 400 shown in FIG. 4, the first and second tunable floating qubit devices 602, 604 are not capacitively coupled to each other directly. In other words, a direct and static capacitive coupling between the first and second tunable qubit devices 602, 604 is zero or otherwise small and can be negligible, e.g., $C_{12s}+C_{12g}=0$ as shown in FIG. 4. The methods and systems presented here using a tunable floating coupler device between two tunable qubit devices do not require a direct, static capacitive coupling between the two tunable floating qubit devices to achieve a vanishing total coupling between the two tunable floating qubit devices.

In some implementations, control operations can be performed on the superconducting circuit by providing control signals to the first and second tunable floating qubit devices 602, 604 and the tunable floating coupler device 606 via respective control lines. When the two tunable floating qubit devices 602, 604 are coupled through the tunable floating coupler device 606, the coupling between the two tunable floating qubit devices 602, 604 can be activated/deactivated by tuning a magnetic flux applied to the tunable floating coupler device 606. For example, a separate control signal (e.g., a DC or an AC current) can be applied to a control line to tune the magnetic flux threading to the third superconducting circuit loop 616 (e.g., the coupler flux bias) of the tunable floating coupler device 606 to adjust the transition frequency of the tunable floating coupler device 606. When the coupler flux bias is at a parking value, the total coupling strength of an XX coupling or a ZZ coupling between the two tunable floating qubit devices 602, 604 can be turned off, deactivated, or vanished (e.g., less than or equal to a predetermined threshold value). When the magnetic flux on the tunable floating coupler device 606 is at a gate-activating value different from the parking value, the total coupling between the two tunable floating qubit devices 602, 604 can be turned on, enabled, or otherwise activated for performing a quantum logic gate. In other instances, operation for determining the parking value and the gate-activating value of the magnetic flux on the tunable floating coupler device 606 in a quantum processing unit 600 can be implemented with respect to the example process 1700 shown in FIG. 17 or in another manner.

To this end, the Lagrangian of the equivalent circuit 600 can be expressed as $$L = \frac{1}{2}\sum_{k=1}^{6} C_{0k}\dot{\Phi}_k^2 + \frac{1}{2}C_{12}(\dot{\Phi}_2 - \dot{\Phi}_1)^2 + \frac{1}{2}C_{23}(\dot{\Phi}_2 - \dot{\Phi}_3)^2 + \quad (15)$$

$$\frac{1}{2}C_{13}(\dot{\Phi}_1 - \dot{\Phi}_3)^2 + \frac{1}{2}C_{24}(\dot{\Phi}_2 - \dot{\Phi}_4)^2 + \frac{1}{2}C_{34}(\dot{\Phi}_3 - \dot{\Phi}_4)^2 +$$

$$\frac{1}{2}C_{45}(\dot{\Phi}_4 - \dot{\Phi}_5)^2 + \frac{1}{2}C_{46}(\dot{\Phi}_4 - \dot{\Phi}_6)^2 + \frac{1}{2}C_{35}(\dot{\Phi}_3 - \dot{\Phi}_5)^2 +$$

$$\frac{1}{2}C_{56}(\dot{\Phi}_5 - \dot{\Phi}_6)^2 + \frac{1}{2}C_{14}(\dot{\Phi}_1 - \dot{\Phi}_4)^2 + \frac{1}{2}C_{36}(\dot{\Phi}_3 - \dot{\Phi}_6)^2 +$$

$$E_{J1}\cos(\phi_{1m} + \phi_{01}) + E_{Jc}\cos(\phi_{cm} + \phi_{0c}) + E_{J2}\cos(\phi_{2m} + \phi_{02})$$

where $\Phi_k$ are node fluxes, $\dot{\Phi}_k = \partial\Phi_k/\partial t$, and $E_{Jj}$ are junction energies. The junction energies $E_{Jj}$ defined by $$E_{Jj}(\phi_k) = \sqrt{E_{JSj}^2 + E_{JLk}^2 + 2E_{JSk}E_{JLk}\cos(\phi_{ek})} \quad (16)$$

and $$\phi_{0k} = \tan^{-1}\left[\frac{E_{JSk} - E_{JLk}}{E_{JSk} + E_{JLk}}\tan\left(\frac{\phi_{ek}}{2}\right)\right] \quad (17)$$

where $\phi_{0j}=2\pi\Phi_{ek}/\Phi_0$ and k={1,2, c}, $\Phi_{ek}$ is the external flux biases applied to the respective superconducting circuit loops 612, 614, 616, and $\Phi_0$ is the flux quantum. The reduced fluxes are defined by:

$$\phi_{1m} = \frac{2\pi(\Phi_2 - \Phi_1)}{\Phi_0},$$

$$\phi_{2m} = \frac{2\pi(\Phi_6 - \Phi_5)}{\Phi_0},$$

$$\phi_{cm} = \frac{2\pi(\Phi_4 - \Phi_3)}{\Phi_0}, \quad (18)$$

In some implementations, a new set of flux variables can be introduced as below, $$\Phi_{1p/m}=\Phi_2\pm\Phi_1,$$

$$\Phi_{cp/m}=\Phi_4\pm\Phi_3,$$

$$\Phi_{2p/m}=\Phi_6\pm\Phi_5 \quad (19)$$

and corresponding conjugate charge variables can be expressed as below, $$Q_{1p/m} = \frac{\partial L}{\partial \dot{\Phi}_{1p/m}}, \quad (20)$$

$$Q_{cp/m} = \frac{\partial L}{\partial \dot{\Phi}_{cp/m}},$$

$$Q_{2p/m} = \frac{\partial L}{\partial \dot{\Phi}_{2p/m}},$$

The Hamiltonian can be expressed as $$H = \frac{1}{2}QC^{-1}Q^T - E_{J1}\cos(\phi_{1m} + \phi_{01}) - \quad (21)$$

$$E_{Jc}\cos(\phi_{cm} + \phi_{0c}) - E_{J2}\cos(\phi_{2m} + \phi_{02})$$

where the charge matrix Q is given by $$Q=[Q_{1p},Q_{1m},Q_{cp},Q_{cm},Q_{2p},Q_{2m}] \quad (22)$$

and the capacitance matrix C is given by:

$$C = \frac{1}{4}\begin{pmatrix} C_{1p} & C_{1m} & -C_{1pp} & C_{1pm} & 0 & 0 \\ C_{1m} & C_{1p}+4C_{12} & C_{1mp} & C_{1mm} & 0 & 0 \\ -C_{1pp} & C_{1pm} & C_{cp} & C_{cm} & -C_{2pp} & C_{2pm} \\ C_{1mp} & C_{1mm} & C_{cm} & C_{cp}+4C_{34} & C_{2mp} & C_{2mm} \\ 0 & 0 & -C_{2pp} & C_{2pm} & C_{2p} & C_{2m} \\ 0 & 0 & C_{2mp} & C_{2mm} & C_{2m} & C_{2p}+4C_{56} \end{pmatrix}, \quad (23)$$

where $C_{1p/m}=C_{02}+C_{23}+C_{24}\pm(C_{01}+C_{13}+C_{14}),$ $C_{cp/m}=C_{24}+C_{04}+C_{45}+C_{46}+C_{14}\pm(C_{13}+C_{23}+C_{35}+C_{03}+C_{36}),$ $C_{2p/m}=C_{06}+C_{46}+C_{36}\pm(C_{05}+C_{35}+C_{45}),$ $C_{1pp}=C_{13}+C_{23}+C_{24}+C_{14},$ $C_{1pm}=C_{13}+C_{23}-C_{24}-C_{14},$ $C_{1mp}=C_{13}+C_{14}-C_{23}-C_{24},$ $C_{1mm}=-C_{13}+C_{23}-C_{24},$ $C_{2pp}=C_{35}+C_{36}+C_{45}+C_{46},$ $C_{2pm}=C_{35}+C_{45}-C_{46}. \quad (24)$ Note that modes of the tunable floating qubit devices 602, 604, and the tunable floating coupler device 606 are represented by the charge variables $Q_{1m}$, $Q_{2m}$, and $Q_{cm}$. The modes represented by $Q_{1p}$, $Q_{2p}$, and $Q_{cp}$ are "free particles" rather than a harmonic oscillator because of its vanishing spring constants (e.g., no inductances associated with these modes). In some instances, the Lagrange equation corresponding to these modes can be mathematically expressed as, $$d\left(\frac{\partial L}{\partial}\dot{\Phi}_{jp}\right)/dt = 0 \quad (25)$$

indicating that these modes are constant of motion. These modes simply correspond to a uniform net charge distributed on the qubit electrodes of the first and second qubit devices 602, 604 and the tunable coupler device 606. In some instances, these modes altogether in the final Hamiltonian may be ignored. Keeping the modes of the tunable floating qubit devices 602, 604 and the tunable floating coupler device 606 only, the Hamiltonian can be written as $$H = 4E_{C1}^2 n_1^2 + 4E_{C2}^2 n_2^2 + 4E_{Cc}^2 n_c^2 + 4E_{12}n_1 n_2 + 4E_{1c}n_1 n_c + 4E_{2c}n_2 n_c - \quad (26)$$

$$E_{J1}\cos(\phi_{1m} + \phi_{01}) - E_{Jc}\cos(\phi_{cm} + \phi_{0c}) - E_{J2}\cos(\phi_{2m} + \phi_{02})$$

where $n_j=Q_j/2e$ is the Cooper pair number operation, $E_{Ck}$ is the charging energy, k∈{1,2, c}$E_{12}$, $E_{1C}$, $E_{2c}$ are coupling energies given by:

$$E_{Cc} \approx \frac{2e^2}{2C_*}[C_\| C_g + (C_g + C_\|)(C_g + C_{cx} + C_c)], \quad (27)$$

$$E_{12} \approx -\frac{e^2}{C_{cg}(2C_\| + C_g)^2(2C_{34} + C_{cg})}[C_{1c}C_{2c}(C_{2cx} + C_{34}) +$$

$$C_{1cx}C_{2cx}(C_{34} + C_{cg})], E_{jc} \approx -\frac{e^2(C_{1c} - C_{1cx})}{(2C_\| + C_g)(2C_{34} + C_{cg})}, j \in \{1, 2\}$$

where $$C_*\approx C_{cg}C_g C_\|+C_{cg}(C_g+C_\|)(C_g+C_{cx}+C_c)+C_g(C_{cx}+C_c) \\ (C_g+2C_\|) \quad (28)$$

The signs of the coupling energies $E_{12}$, $E_{1C}$, $E_{2c}$ have implications in achieving a vanishing total coupling strength between the first and second tunable floating qubit devices 602, 604. In some implementations, the capacitances of the shunt capacitors can be the same: e.g., $C_\|\equiv C_{12}=C_{56}$, including the capacitance caused by the two respective qubit electrodes and the capacitance of the Josephson junction. The capacitances between the qubit electrodes and the ground plane of the tunable floating qubit devices 602, 604, e.g., $C_g\equiv C_{01}=C_{02}=C_{05}=C_{06}$. Coupling capacitances between two closest qubit electrodes with one qubit electrode from the tunable floating qubit devices 602, 604 and one qubit electrode from the tunable floating coupler device 606, e.g., $C_{1c}=C_{23}$, $C_{2c}=C_{45}$. The coupling capacitances between the next nearest qubit electrodes with one qubit electrode from the tunable floating qubit devices 602, 604 and one qubit electrode from the tunable floating coupler device 606, e.g., $C_{1cx} \equiv C_{24}$, $C_{2cx} \equiv C_{35}$, and $C_{13} = C_{46} = 0$. It is assumed that the capacitances between of the qubit electrodes and the ground plane are the same, e.g., $C_{03} = C_{04} = C_{cg}$. In some implementations, the capacitance of the qubit electrode to the ground plane is the largest capacitance, e.g., $C_g > C_{cg} > \{C_\parallel, C_{34}, C_{jc}\}$ and $C_{jc} >> C_{jcx}$ in the case of a tunable floating coupler design shown in FIG. 3. In some implementations, according to Equation (27), the signs of the coupling energies $E_{12}$, $E_{1c}$, $E_{2c}$ are negative.

The Hamiltonian in Equation (26) can be written in harmonic oscillator basis by expanding the cosine potential up to the fourth order in flux variables. In some instances, the Hamiltonian can be expressed as $$H = \sum_{k=1,2,c} \left[ \omega_k + \frac{E_{Ck}}{2}\left(1 + \frac{\xi_k}{4}\right) - \frac{E_{Ck}}{2}\left(1 + \frac{9\xi_k}{16}\right) a_k^\dagger a_k \right] a_k^\dagger a_k + \quad (29)$$

$$g_{1c}(a_1^\dagger a_c + a_1 a_c^\dagger - a_1 a_c - a_1^\dagger a_c^\dagger) +$$

$$g_{2c}(a_2^\dagger a_c + a_2 a_c^\dagger - a_2 a_c - a_2^\dagger a_c^\dagger) + g_{12}(a_1^\dagger a_2 + a_1 a_2^\dagger - a_1 a_2 - a_1^\dagger a_2^\dagger)$$

where $\omega_k$ are the transition frequencies of the tunable floating qubit devices 602, 604 and the tunable floating coupler device 606. In some instances, the transition frequency $\omega_k$ is given by:

$$\omega_k = \sqrt{8 E_{Jk} E_{Ck}} - E_{Ck}\left(1 + \frac{\xi_k}{4}\right), k \in \{1, 2, c\}, \quad (30)$$

and the coupling strengths are given by:

$$g_{jc} = -\frac{|E_{jc}|}{\sqrt{2}}\left[\frac{E_{Jk}}{E_{Ck}} \frac{E_{Jc}(\Phi_{ec})}{E_{Cc}}\right]^{\frac{1}{4}}\left[1 - \frac{1}{8}(\xi_c + \xi_k)\right], \quad (31)$$

$$j = 1, 2$$

$$g_{12} = -\frac{|E_{12}|}{\sqrt{2}}\left[\frac{E_{J1}}{E_{C1}} \frac{E_{J2}(\Phi_{ec})}{E_{C2}}\right]^{\frac{1}{4}}\left[1 - \frac{1}{8}(\xi_1 + \xi_2)\right],$$

where $g_{jc}$ are coupling strengths between each of the tunable floating qubit devices and the tunable floating coupler device, $g_{12}$ is the static capacitive coupling strength, and $$\xi_k = \sqrt{\frac{2 E_{Ck}}{E_{Jk}}}.$$

The correction term $1-(\xi_i+\xi_j)/8$ is due to nonlinearities of the tunable floating qubit device. The static capacitive coupling strength $g_{12}$ includes the indirect capacitive coupling component mediated by the tunable floating coupler device.

Although each of the first and second tunable floating qubit devices 602, 604 are coupled to the tunable floating coupler device 606, the total coupling between the first and second tunable floating qubit devices 602, 604 can be turned off by tuning the transition frequency of the tunable floating coupler device 606 by tuning the coupler flux bias applied to the third superconducting circuit loop 616 of the tunable floating coupler device 606 to a parking value. The total coupling between the first and second tunable qubit devices 602, 604 can be tuned on, when two-qubit quantum logic gates are enacted, by tuning the transition frequency of the tunable floating coupler device 606 to a gate-activating value that maximizes the coupling strength. The tunable floating qubit devices 602, 604 and the tunable floating coupler device 606 may be approximated by their first three energy levels. In this case, the Hamiltonian of the system can be written as $$H = \Sigma_{k=1}^{2,c} \omega_k |1\rangle_k \langle 1| + (2\omega_k - \eta_k)|2\rangle_k \langle 2| + \Sigma_{k=1}^2 g_{kc}(\sigma_k +$$
$$\sigma_k^\dagger)(\sigma_c + \sigma_c^\dagger) + g_{12}(\sigma_1 + \sigma_1^\dagger)(\sigma_2 + \sigma_2^\dagger), \quad (32)$$

where $\sigma_k = |0\rangle_k \langle 1| + \sqrt{2}|1\rangle_k \langle 2|$ and $\omega_k$ and $\eta_k$ are the $|0\rangle \to |1\rangle$ transition frequency and anharmonicity of respective devices. Applying Schrieffer-Wolff transformation and assuming the tunable floating coupler device 606 remains in the grounded state $\langle \sigma_{zc} \rangle_{=-1}$, which is valid in the dispersive regime $$\left(\frac{g_{kc}}{|\omega_c - \omega_k|} \ll 1\right),$$

the effective Hamiltonian between the first and second tunable floating qubit devices 602, 604 can be expressed as:

$$H = \sum_{k=1,2} \omega_{01,k} |1\rangle_k \langle 1| + \omega_{02,k} |2\rangle_k \langle 2| + g_{01}(|10\rangle\langle 01| + |01\rangle\langle 10|) + \quad (33)$$

$$g_{02}(|11\rangle\langle 02| + |02\rangle\langle 11|) + g_{20}(|11\rangle\langle 20| + |20\rangle\langle 11|)$$

where $\omega_{01,k}$ and $\omega_{02,k}$ are dressed of the first and second tunable qubit devices 602, 604, $g_{01}$ is the total XX coupling strength, $g_{02}$ and $g_{20}$ are coupling strengths between $|11\rangle$ and $|02\rangle$, and $|11\rangle$ and $|20\rangle$ transitions, respectively. In some instances, the coupling strength of the XX coupling is given by:

$$g_{01} = g_{12} - g_{\mathit{eff}} \quad (34)$$

where $g_{\mathit{eff}}$ is the effective coupling between the first and second tunable floating qubit devices 602, 604, which is given by:

$$g_{\mathit{eff}} = \frac{g_{1c}(\Phi_{ec}) g_{2c}(\Phi_{ec})}{2} \sum_{k=1,2} \left(\frac{1}{\Delta_k} + \frac{1}{\Sigma_k}\right), \quad (35)$$

The coupling strength is given by:

$$g_{02} = \sqrt{2} g_{12} - \frac{g_{1c}(\Phi_{ec}) g_{2c}(\Phi_{ec})}{\sqrt{2}}\left(\frac{1}{\Delta_1} + \frac{1}{\Sigma_1} + \frac{1}{\Delta_2 + \eta_2} + \frac{1}{\Sigma_2 - \eta_2}\right), \quad (36)$$

$$g_{20} = \sqrt{2} g_{12} - \frac{g_{1c}(\Phi_{ec}) g_{2c}(\Phi_{ec})}{\sqrt{2}}\left(\frac{1}{\Delta_1 + \eta_1} + \frac{1}{\Sigma_1 - \eta_1} + \frac{1}{\Delta_2} + \frac{1}{\Sigma_2}\right),$$

where $\Delta_k = \omega_c - \omega_k$ and $\Sigma_k = \omega_c + \omega_k$.

For the example considered above, since values of all coupling energies $E_{12}$, $E_{1c}$, $E_{2c}$ are negative, the value of the coupling strengths, $g_{12}$, $g_{1c}$, $g_{2c}$ are negative. Thus, for the coupling strength of the XX coupling $g_{01}$ to vanish, the second term in Equation (34) is positive. This holds when $\Delta_k < 0$, e.g., when the transition frequency of the tunable floating coupler device 606 is less than the transition frequencies of the first and second tunable floating qubit devices 602, 604.

The condition for the coupling strength of the XX coupling to vanish, e.g., $g_{01}=0$, depends on the sign and magnitude of the three coupling strengths mediating the first and second tunable floating qubit devices 602, 604 and the tunable coupler device 606, e.g., $g_{12}$, $g_{1c}$, $g_{2c}$. In addition to the sign and magnitude of these coupling strengths, the transition frequency of the tunable floating coupler device 606 relative to the transition frequencies of the tunable floating qubit devices plays an important role. In some examples, all the coupling strengths have negative signs due to the arrangement of the electrodes of the tunable floating coupler device 606. This implies that to achieve a vanishing coupling strength of the XX coupling, e.g., $g_{01}=0$, the transition frequency of the tunable floating coupler device 606 has to be less than the transition frequencies of the first and second tunable floating qubit devices 602, 604, such that $|g_{12}|=|g_{eff}|$. In some implementations, when a total coupling strength is vanishing, the total coupling strength is zero, or less than or equal to a predetermined threshold value.

The coupling energies in terms of capacitances are $$E_{12} \approx -\frac{e^2}{\tilde{C}}[C_{1c}C_{2c}(C_{2cx}+C_{\|c}) + C_{1c}C_{2cx}(C_{\|c}+C_{gc})], \quad (37)$$

$$E_{jc} \approx -\frac{e^2(C_{jc}-C_{jcx})}{(2C_{\|}+C_g)(2C_{\|c}+C_{gc})}$$

where $\tilde{C}=C_{gc}(2C_{\|}+C_g)^2(2C_{\|c}+C_{gc})$.

As shown in Equation (37), the signs of the coupling energies are negative for the arrangement of electrodes of the tunable coupler device shown in FIG. 3. It is assumed that the first and second tunable qubit devices 602, 604 are sufficiently far apart that the capacitance between the respective qubit electrodes of the two tunable qubit devices is negligible. The signs of $g_{jc}$ and $g_{12}$ are determined by the coupling energies $E_{jc}$ and $E_{12}$, respectively. For the case where $C_{jcx}<C_{jc}$, according to Equation (37), the coupling strengths $g_{jc}$ and $g_{12}$ are negative.

Figure 13:
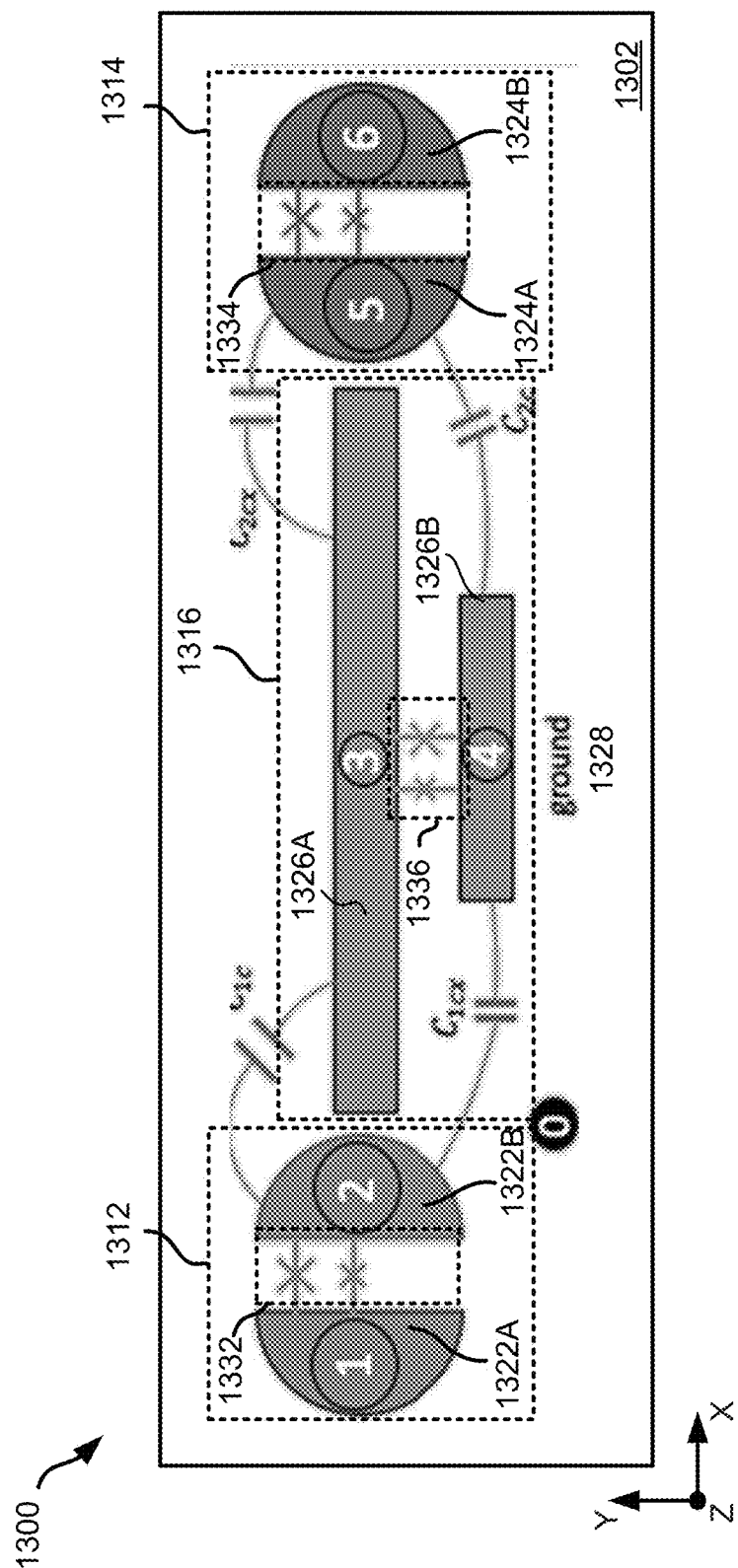
FIG. 13 is a schematic diagram of a top view of an example quantum processing unit.

If the coupler electrodes of the tunable floating coupler device 606 are arranged as shown in FIG. 13, the magnitude of the capacitances change. With this arrangement of the qubit electrodes, the capacitance $C_{1c}\equiv C_{23}$ remains greater than the capacitance $C_{1cx}\equiv C_{24}$, e.g., $C_{1c}>C_{1cx}$. However, the capacitance $C_{2cx}\equiv C_{35}$ is now greater than the capacitance $C_{2c}\equiv C_{45}$. This implies that according to Equation (37), the coupling $g_{jc}$ is negative while the coupling $g_{2c}$ is positive. The static capacitive coupling strength $g_{12}$ remains negative.

Figure 7:
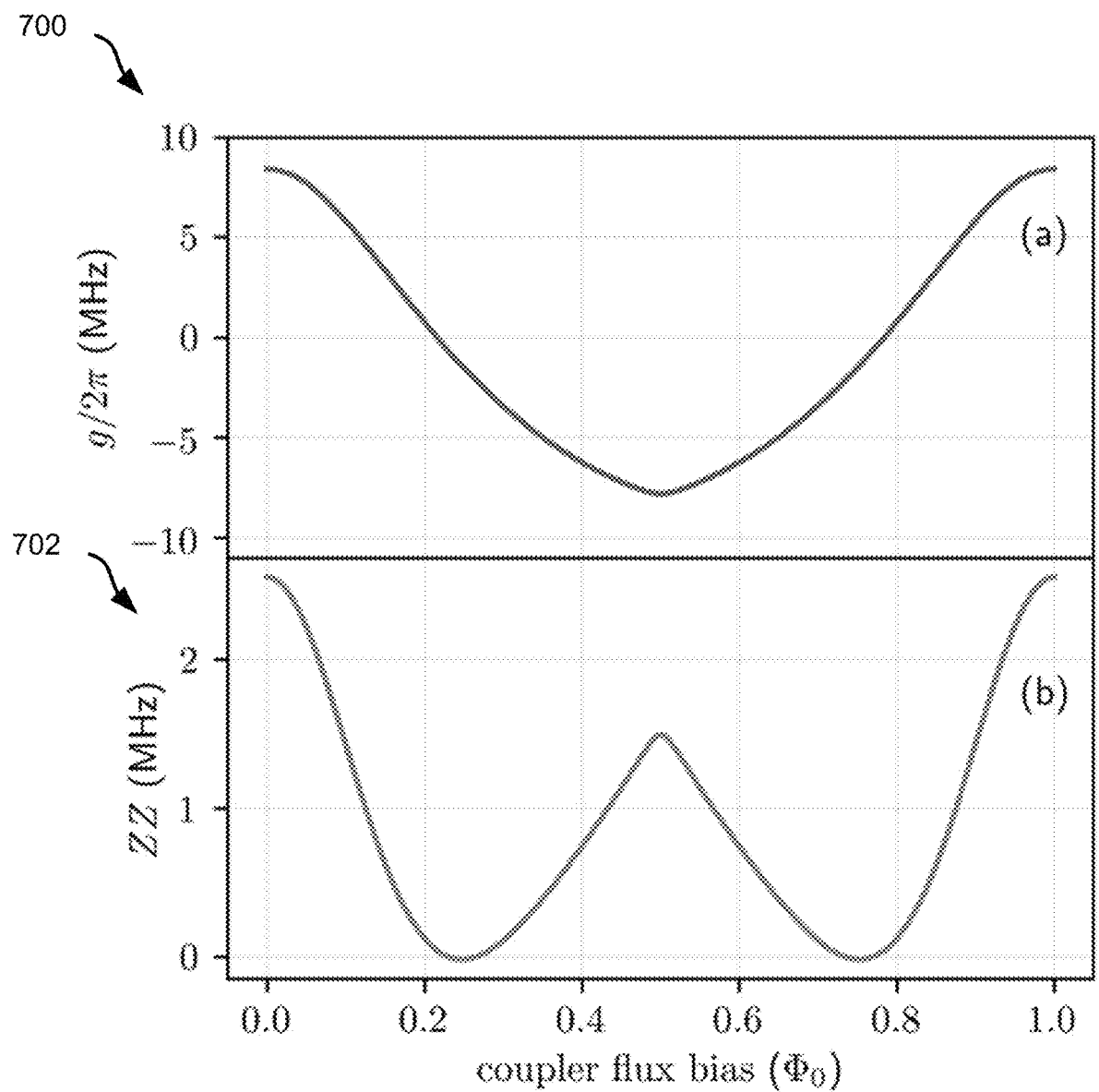
FIG. 7 are plots showing total coupling strengths of a XX coupling and a ZZ coupling as a function of a coupler flux bias applied to the tunable floating coupler device of the example quantum processing unit in FIG. 6.

FIG. 7 are plots 700, 702 showing total coupling strengths of an XX coupling and a ZZ coupling as a function of a coupler flux bias applied to the tunable floating coupler device of the example quantum processing unit in FIG. 6. The plot 700 is obtained when the two tunable floating qubit devices 602, 604 are in resonance; and the plot 702 is obtained when the first and second tunable floating qubit devices 602, 604 are parked at a DC sweet spot.

Depending on the arrangement of the electrodes of the tunable floating coupler device, the transition frequency of the tunable floating coupler device 606 can be designed to be greater than or less than the transition frequencies of the tunable floating qubit devices 602, 604 in order to obtain a vanishing coupling strength g of an XX coupling or a vanishing coupling strength $\zeta$ of a ZZ coupling. In the case of the symmetric arrangement of the coupler electrodes of the tunable floating coupler device 316 as shown in FIG. 3, since the static capacitive coupling strength $g_{12}$ is negative, the effective coupling $g_{eff}$ is negative in order to obtain a vanishing total coupling strength, e.g., $g_{01}=0$ or $g_{01}<g_{01,th}$, where $g_{01th}$ is a predetermined threshold value of the XX coupling. In some instances, the predetermined threshold value $g_{01th}$ is determined according to a gate fidelity requirement for the quantum processing unit 300. Given the coupling strength of the tunable floating qubit device and the tunable floating coupler device $g_{jc}$ is negative, the transition frequency of the tunable floating coupler device 606 is less than the transition frequencies of the tunable floating qubit devices 602, 604 according to Equation (35) such that $g_{eff}$ becomes negative and can offset the static capacitive coupling strength to achieve a vanishing total coupling strength. As an example, the following circuit parameters are used, e.g., $C_g=110$ fF, $C_{\|}=27.2$ fF, $C_{1c}=C_{2c}=27$ fF, $C_{1cx}=C_{2cx}=3.5$ fF, $C_{gc}=110$ fF, and $C_{\|c}=33.8$ fF and transition frequencies of the first and second tunable floating qubit devices 602, 604 $f_1=3.8$–4.366 GHz and $f_2=4$–4.522 GHz, the maximum frequency of the tunable floating coupler device 606 $f_c=0.65$–3.696 GHz, the static capacitive coupling strength is calculated to be $g_{12}/2\pi=-9.2$ MHz, the coupling strength of the first tunable floating qubit device 602 and the tunable floating coupler device 606 is $g_{1c}/2\pi=-110.8$ MHz, and the coupling strength of the second tunable floating qubit device 604 and the tunable floating coupler device 606 $g_{2c}/2\pi=-112$ MHz. The anharmonicities of the first and second tunable floating qubit devices 602, 604 and the tunable floating coupler device 606 are $\eta_1/2\pi=249$ MHz, $\eta_2/2\pi=244$ MHz, and $\eta_c/2\pi=215$ MHz. As illustrated in FIG. 7, with the circuit parameters it is possible to achieve both $g=0$ at a coupler flux bias of about 0.2 $\Phi_0$, e.g., $\Phi_{ec}=0.2$ $\Phi_0$. The residual ZZ interaction strength $\zeta$ can be numerically determined using $$\zeta = \omega\overline{|11\rangle} - \omega\overline{|10\rangle} - \omega\overline{|01\rangle}\left(\omega\frac{-}{k}\right)$$

are the eigenfrequencies of the first and second tunable floating qubit devices 602, 604), as a function of the coupler flux bias applied to the tunable floating coupler device 606 and when the transition frequencies of the first and second tunable floating qubit devices 602, 604 are tuned at their maximum values. The residual ZZ coupling strength $\zeta$ vanishes at a coupler flux bias $\Phi_{ec}=0.207$ $\Phi_0$. In this case, the $\zeta=0$ appears at a slightly different coupler flux bias than $g=0$ because of repulsion from higher energy levels.

FIG. 8A is a table 800 showing device parameters of the superconducting quantum circuit devices in the example quantum processing unit 300 in FIG. 3 represented by the example equivalent circuit 600 in FIG. 6. The table 800 of FIG. 8A include both designed values and measured values of the device parameters. Measured values of the device parameters were obtained on a quantum processing unit fabricated according to the processes described in FIG. 3. For example, the quantum processing unit 300 was fabricated using a standard lithographic technique on a Si wafer which is then diced to create individual dies. The Josephson junctions were fabricated through double-angle evaporation of aluminum. Superconducting circuit components, including the aluminum qubit electrodes for the Josephson junctions and niobium ground planes, signal lines (e.g., coplanar waveguides or other types of signal lines), and readout resonator devices, were fabricated using one or more of the following: patterning, deposition, or liftoff.

Figure 8B:
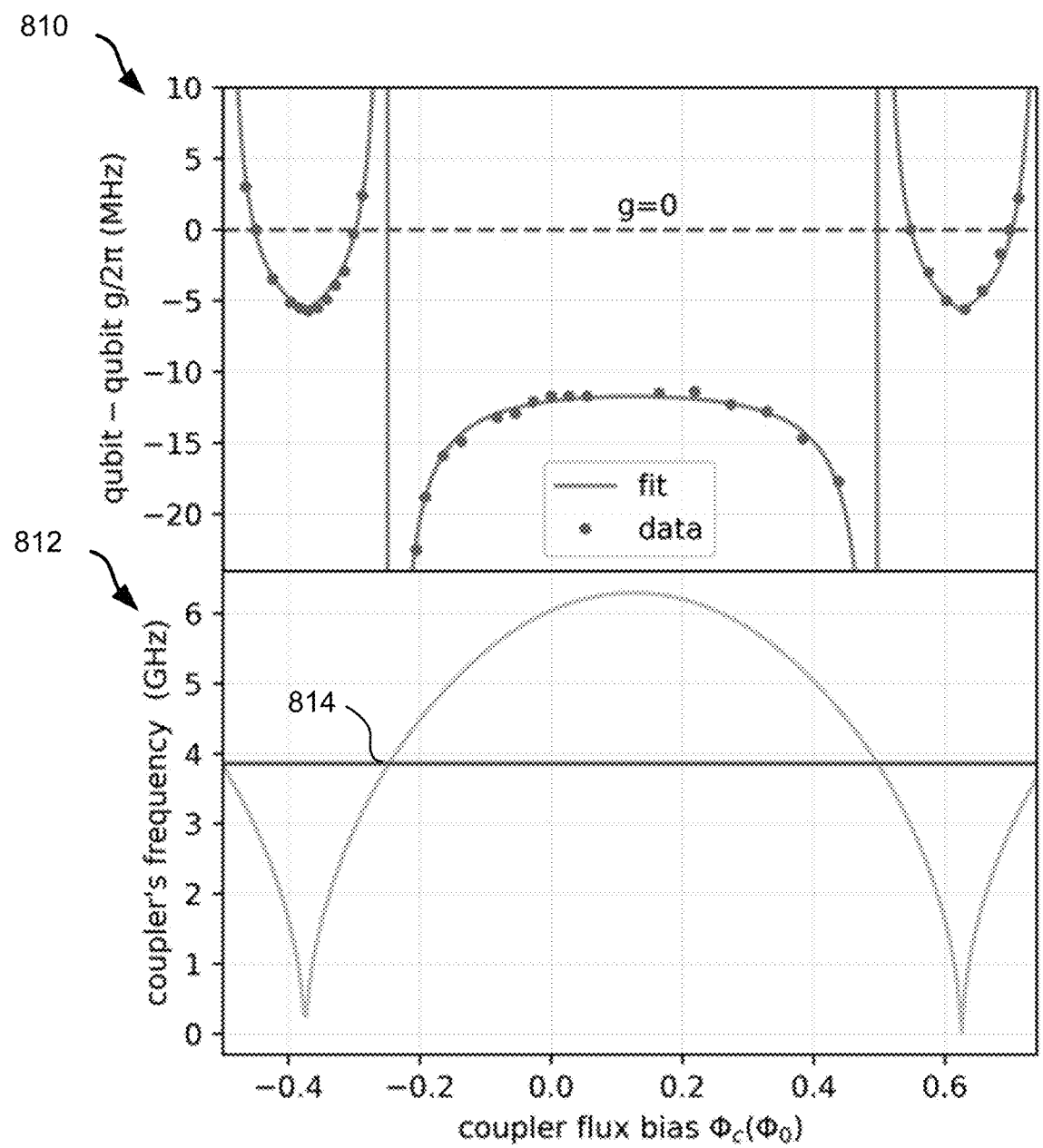
FIG. 8B are plots showing a total coupling strength g and a transition frequency of a tunable floating coupler device as a function of a coupler flux bias applied to the tunable floating coupler device in the example quantum processing unit in FIG. 3 represented by the example equivalent circuit in FIG. 6.

FIG. 8B is a plot 810 showing a total coupling strength g as a function of a coupler flux bias and a plot 812 showing a transition frequency of the tunable floating coupler device 606 as a function of the coupler flux bias. The plot 812 is resulted from the coupling fit. The line 814 presents the qubit frequencies where avoided crossing measurement was run.

Figure 9:
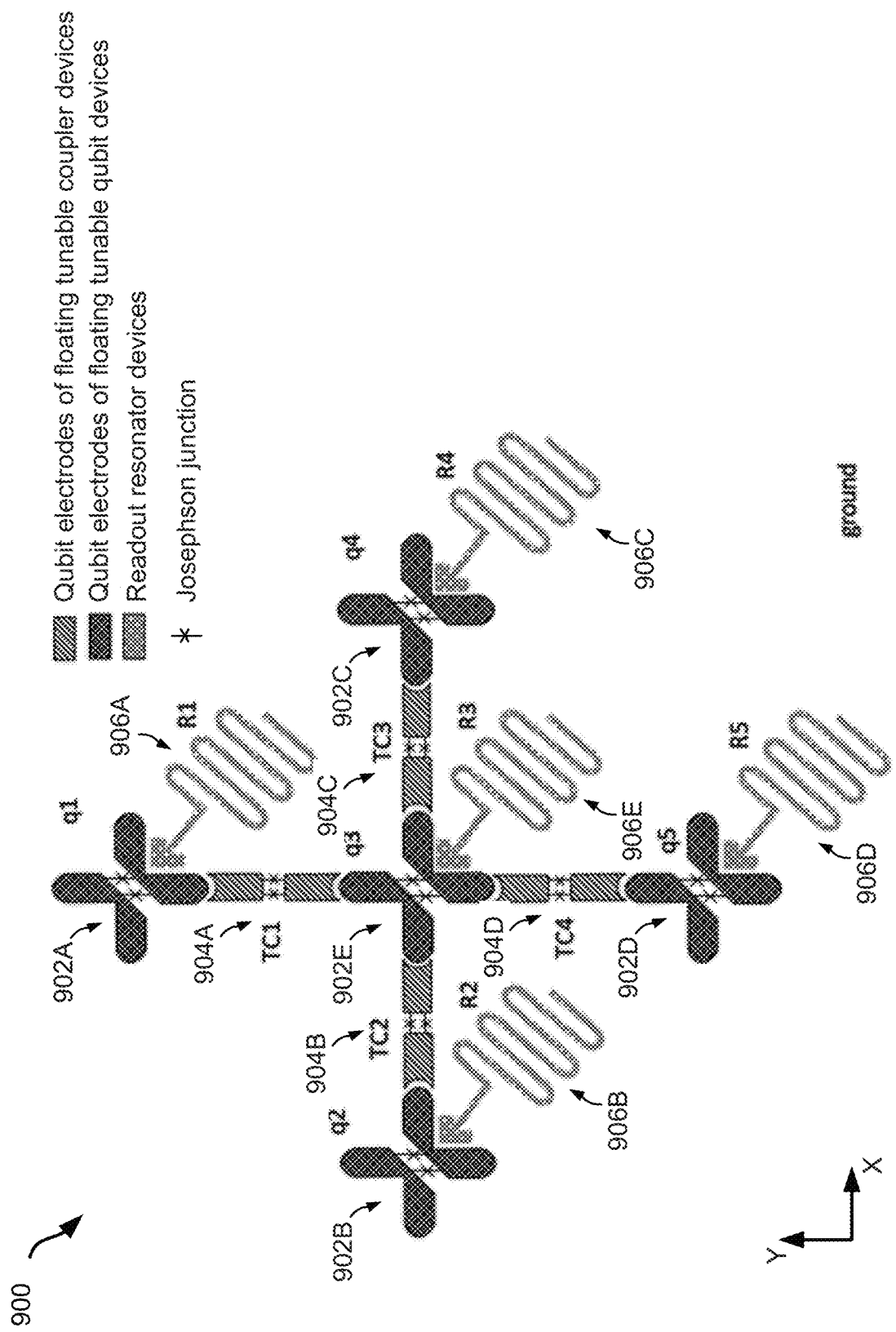
FIG. 9 is a schematic diagram showing a top view of an example quantum processing unit.

FIG. 9 is a schematic diagram showing aspects of an example quantum processing unit 900. In some implementations, the quantum processing unit 900 includes multiple unit cells in a two-dimensional grid or a three-dimensional lattice. The example quantum processing unit 900 includes five tunable floating qubit devices 902A, 902B, 902C, 902D, 902E, and four tunable floating coupler devices 904A, 904B, 904C, 904D. The example quantum processing unit 900 also includes five readout resonator devices 906A, 906B, 906C, 906D, 906E associated with the respective tunable floating qubit devices 902A, 902B, 902C, 902D, 902E. The example quantum processing unit 900 may include additional or different features and components, which may be configured in another manner. In some implementations, each of the tunable floating coupler devices and the tunable floating qubit devices includes two qubit electrodes. The qubit electrodes associated with the tunable floating coupler devices 904A, 904B, 904C, 904D and the tunable floating qubit devices 902A, 902B, 902C, 902D, 902E in the example quantum processing unit 900 may be arranged in another manner.

Qubit electrodes of the tunable floating qubit devices 902A, 902B, 902C, 902D, 902E are configured to form couplings with different superconducting circuit elements as shown in the example quantum processing unit 900. For example, the qubit electrodes of the tunable floating qubit devices 902A, 902B, 902C, 902D, 902E are configured to form couplings with the respective tunable floating coupler devices 904A, 904B, 904C, 904D in both X and Y directions. For example, the qubit electrodes of the tunable floating qubit devices 902A, 902B, 902C, 902D, 902E are configured to form couplings with the respective readout resonator devices 906A, 906B, 906C, 906D, 906E. In some instances, the qubit electrodes are also configured to form coupling with other superconducting circuit elements, for example, Purcell filter devices. The electrodes of the tunable floating qubit devices 902A, 902B, 902C, 902D, 902E and the tunable floating coupler devices 904A, 904B, 904C, 904D may be implemented as the respective electrodes 322A, 322B, 324A, 324B, 326A, and 326B in FIG. 3. The ground plane and the readout resonator devices 906A, 906B, 906C, 906D, 906E may be formed by patterning the same superconductive material as or different superconductive materials from that used in the qubit electrodes.

In the example shown in FIG. 9, a parking value of a respective coupler flux bias applied to a respective tunable floating coupler device 904A, 904B, 904C, or 904D can be obtained by measuring a total coupling strength of a pair of two neighboring tunable floating qubit devices including one of 902A, 902B, 902C, or 902D, and 902E. The total coupling strength may be a coupling strength (e.g., $g_{01}$) of a XX coupling or a coupling strength (e.g., $\zeta$) of a ZZ coupling. The measurement to find a vanishing total coupling strength $\zeta=0$ or $g_{01}=0$ can be performed by sending either a fast flux pulse or a modulated flux pulse to a first tunable floating qubit device with a higher frequency to bring it into resonance with a second tunable floating qubit device. Values of the total coupling strength of the first and second tunable floating qubit devices are measured as the value of the coupler flux bias varies from a maximal value to a minimal value. Based on the measured values of the coupling strength, the parking value of the coupler flux bias applied to the tunable floating coupler device is identified. In some implementations, operations of the quantum processing unit to determine the parking value of the coupler flux bias corresponding to a vanishing total coupling strength may be performed with respect to operations in the example process 1700 shown in FIG. 17 or in another manner.

In some implementations, when operating a multi-qubit quantum logic gate in the example quantum processing unit 900, the tunable floating coupler device is tuned by changing the coupler flux bias applied to the tunable floating coupler device from a parking value to a gate-activating value. While the coupler flux bias is at the gate-activating value, one or more control signals can be applied to one or more of the first and second tunable floating qubit devices to perform the multi-qubit quantum logic gate on qubits defined by the first and second qubit devices. When the multi-qubit quantum logic gate is performed, the tunable floating coupler device is tuned by changing the magnetic flux from the gate-activating value to the parking value. In some implementations, operations of the quantum processing unit to perform a quantum logic gate may be performed with respect to operations in the example process 1800 shown in FIG. 18 or in another manner.

FIG. 10 is a schematic diagram showing aspects of an example quantum processing unit 1000. The example quantum processing unit 1000 includes multiple tunable floating qubit devices 1002 and multiple tunable floating coupler devices 1004 arranged in an array. As shown, each of the multiple tunable floating qubit devices 1002 is coupled with four tunable floating coupler devices 1004; and each of the multiple tunable floating coupler devices 1004 is coupled with two tunable floating qubit devices 1002. Each of the multiple tunable floating coupler devices 1004 and multiple tunable floating qubit devices 1002 includes two qubit electrodes, which are electrically floating without being directly connected to the ground plane. In some instances, each of the tunable floating qubit devices 1002 and the tunable floating coupler devices 1004 may be implemented as the tunable floating qubit devices 312 and the tunable floating coupler device 316 shown in FIG. 3 or in another manner.

The example quantum processing unit 1000 may include additional or different features and components, which may be configured in another manner. For example, the example quantum processing unit 1000 includes other superconducting quantum circuit devices, e.g., readout resonator devices associated with each of the multiple tunable floating qubit devices 1002 for performing readout operations. For another example, the example quantum processing unit 1000 may include control lines (e.g., flux bias control lines and/or XY qubit control lines) for providing control signals (e.g., to activate or deactivate coupling between a pair of neighboring tunable floating qubit devices 1002) and performing multi-qubit quantum logic gates. In some implementations, each of the multiple tunable floating qubit devices 1002 has a dedicated flux bias control line. In some instances, each of the multiple tunable floating qubit devices has the flux bias control line combined with an RF drive line.

The methods and systems described here provide technical advantages. For example, the methods and systems can reduce leakage to outside the computational subspace as these types of tunable floating qubit devices have positive anharmonicity as opposed to transmon devices which have negative anharmonicity. In other words, capacitively shunted qubit devices with higher energy levels have less inter-level energy difference, thus reducing or eliminating leakage. In some cases, the use of floating couplers adds the flexibility of moving the qubit apart while getting enough coupling between them to achieve a vanishing total coupling strength. In some cases, floating qubits can have better coherence times than the grounded qubit counterpart, which has a positive impact on the performance of the single qubit and two-qubit quantum logic gates.

FIG. 11 is a schematic diagram showing aspects of an example quantum processing unit 1100. The example quantum processing unit 1100 includes multiple tunable floating qubit devices 1102 and multiple tunable floating coupler devices 1104 arranged in a three-dimensional lattice. As shown, each of the multiple tunable floating qubit devices 1102 is coupled with four tunable floating coupler devices 1104; and each of the multiple tunable floating coupler devices 1104 is coupled with two tunable floating qubit devices 1102. In some instances, each of the tunable floating qubit devices 1102 and the tunable floating coupler devices 1104 may be implemented as the tunable floating qubit devices 1002 and the tunable floating coupler device 1004 shown in FIG. 10 or in another manner. In some implementations, the example quantum processing unit 1100 in a three-dimensional lattice includes multiple layers of the example quantum processing unit 1000 in two-dimensional grid shown in FIG. 10. A coupling between two tunable floating qubit devices 1102 from two distinct layers includes a static capacitive coupling or other types of coupling. In some instances, control lines may reside on a second distinct surface of a substrate opposite to a first surface with the example quantum processing unit 1100.

Figure 12:
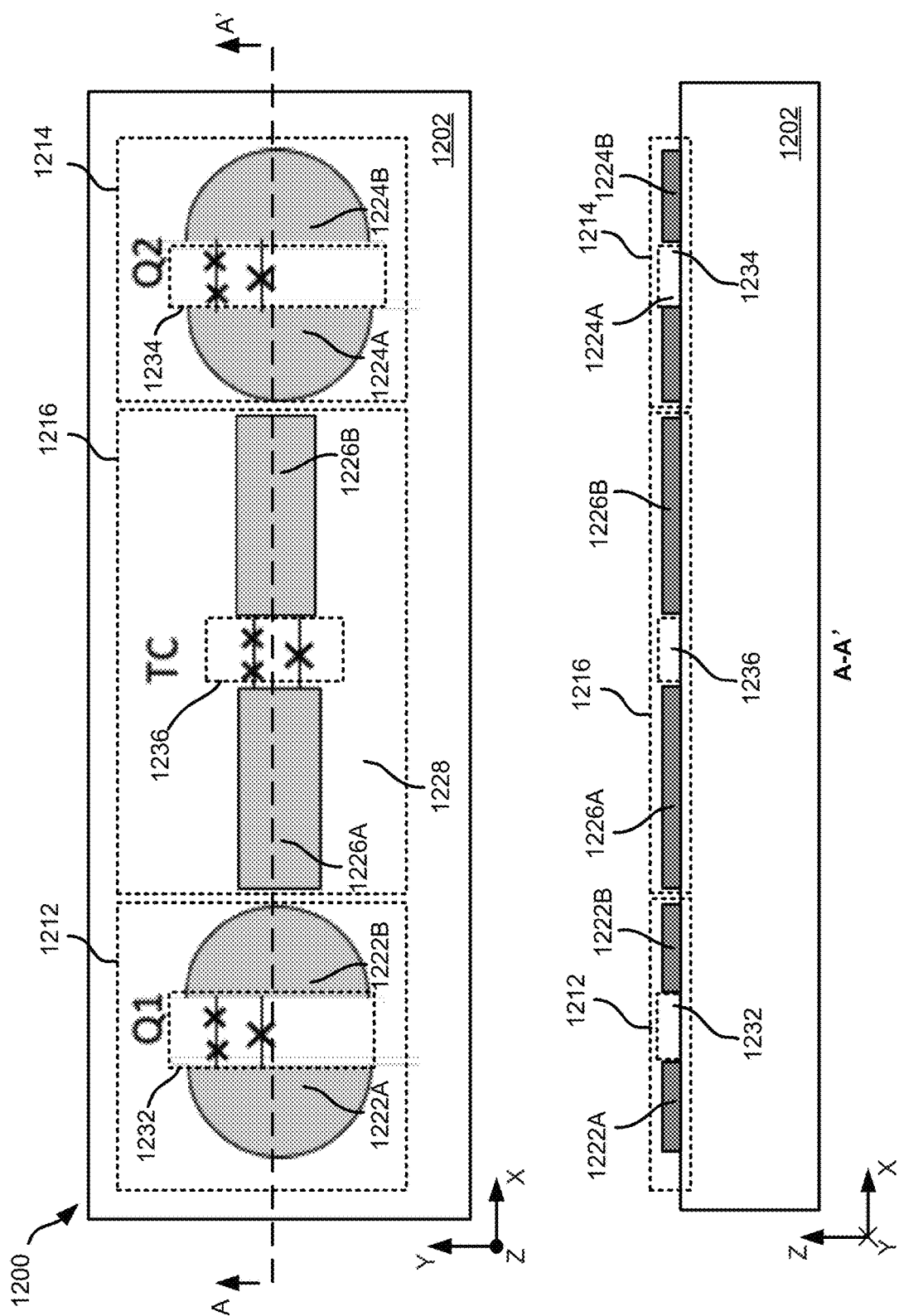
FIG. 12 are schematic diagrams of a top view and a cross-sectional view of an example quantum processing unit.

FIG. 12 are schematic diagrams of a top view and a cross-sectional view of an example quantum processing unit 1200. The example quantum processing unit 1200 includes superconducting quantum circuit devices. As shown in FIG. 12, the superconducting quantum circuit devices in the example quantum processing unit 1200 include a first tunable floating qubit device 1212, a second tunable floating qubit device 1214, and a tunable floating coupler device 1216. In some examples, the first and second tunable floating qubit devices 1212, 1214 and the tunable floating coupler device 1216 may be implemented by other types of systems. The example quantum processing unit 1200 shown in FIG. 12 resides on the top surface of a substrate 1202. The substrate 1202 may be implemented as the substrate 302 in FIG. 3. The example quantum processing unit 1200 may include additional or different features and components, which may be configured in another manner. For example, the superconducting quantum circuit devices may include readout resonator devices associated with the first and second tunable floating qubit devices 1212, 1214 for performing readout operations. For another example, the example quantum processing unit 1200 may include control lines (e.g., flux bias control lines and/or XY qubit control lines) for providing control signals (e.g., to activate or deactivate coupling between the first and second tunable floating qubit devices 1212, 1214) and performing multi-qubit quantum logic gates.

Each of the first and second tunable floating qubit devices 1212, 1214 and the tunable floating coupler device 1216 includes a respective superconducting circuit loop and is implemented as a persistent-current flux qubit device. Particularly, the first tunable floating qubit device 1212 includes a first superconducting circuit loop 1232; the second tunable floating device 1214 includes a second superconducting circuit loop 1234; and the tunable floating coupler device 1216 includes a third superconducting circuit loop 1236. In some implementations, the first and second tunable floating qubit devices 1212, 1214 and the tunable floating coupler device 1216 may be controlled with respect to operations described in FIGS. 3 and 17.

As shown in FIG. 12, each of the first and second tunable floating qubit devices 1212, 1214 and the tunable floating coupler device 1216 includes a pair of qubit electrodes. Particularly, the first tunable floating qubit device 1212 includes a first pair of qubit electrodes 1222A/1222B; the second tunable floating qubit device 1214 includes a second pair of qubit electrodes 1224A/1224B; and the tunable floating coupler device 1216 includes a third pair of qubit electrodes 1226A/1226B. The qubit electrodes 1222A/1222B, 1224A/1224B, and 1226A/1226B may be implemented as the qubit electrodes 322A/322B, 324A/324B, and 326A/326B, respectively, or in another manner.

FIG. 13 is a schematic diagram of a top view of an example quantum processing unit 1300. The example quantum processing unit 1300 includes superconducting quantum circuit devices. As shown in FIG. 13, the superconducting quantum circuit devices in the example quantum processing unit 1300 include a first tunable floating qubit device 1312, a second tunable floating qubit device 1314, and a tunable floating coupler device 1316. In some examples, the first and second tunable floating qubit devices 1312, 1314 and the tunable floating coupler device 1316 may be implemented by other types of systems. The example quantum processing unit 1300 shown in FIG. 13 resides on the top surface of a substrate 1302. The substrate 1302 may be implemented as the substrate 302 in FIG. 3. The example quantum processing unit 1300 may include additional or different features and components, which may be configured in another manner. For example, the superconducting quantum circuit devices may include readout resonator devices associated with the first and second tunable floating qubit devices 1312, 1314 for performing readout operations. For another example, the example quantum processing unit 1300 may include control lines (e.g., flux bias control lines and/or XY qubit control lines) for providing control signals (e.g., to activate or deactivate coupling between the first and second tunable floating qubit devices 1312, 1314) and performing multi-qubit quantum logic gates.

Each of the first and second tunable floating qubit devices 1312, 1314 and the tunable floating coupler device 1316 includes a respective superconducting circuit loop including two Josephson junctions. Particularly, the first tunable floating qubit device 1312 includes a first superconducting circuit loop 1332; the second tunable floating device 1314 includes a second superconducting circuit loop 1334; and the tunable floating coupler device 1316 includes a third superconducting circuit loop 1336. In some implementations, the first and second tunable floating qubit devices 1312, 1314 and the tunable floating coupler device 1316 may be controlled with respect to operations described in FIGS. 3 and 17.

As shown in FIG. 13, each of the first and second tunable floating qubit devices 1312, 1314 and the tunable coupler device 1316 includes a pair of qubit electrodes. Particularly, the first tunable floating qubit device 1312 includes a first pair of qubit electrodes 1322A/1322B; the second tunable floating qubit device 1314 includes a second pair of qubit electrodes 1324A/1324B; and the tunable floating coupler device 1316 includes a third pair of coupler electrodes 1326A/1326B.

In some implementations, the coupler electrodes 1326A, 1326B of the tunable floating coupler device 1316 are asymmetric. For example, the coupler electrodes 1326A, 1326B may have different shapes of footprints, different areas of the footprints, and/or different distances to the qubit electrodes of the tunable floating qubit devices 1312, 1314. The asymmetric design of the coupler electrodes 1326A, 1326B of the tunable floating coupler device 1316 between the two tunable floating qubit devices 1312, 1314 affects the magnitudes of the capacitances (e.g., $C_{1c}$, $C_{1cx}$, $C_{2c}$, $C_{2cx}$), and thus the signs of the coupling strengths. In the example shown in FIG. 13, the coupler electrodes 1326A, 1326B extend along the X direction and reside next to each other along the Y direction. Each of the coupler electrodes 1326A, 1326B has a rectangular footprint. The footprint of the coupler electrode 1326A is greater than that of the coupler electrode 1326B; and the distance between the coupler electrodes 1326A and the qubit electrode 1322B of the first tunable floating qubit device 1312 or the qubit electrode 1334 of the second tunable floating qubit device 1314 is smaller than that between the coupler electrode 1326B and the same qubit electrode of the same tunable floating qubit device.

In the example shown in FIG. 13, a first coupling strength of the first tunable floating qubit device 1312 and the tunable floating coupler device 1316 and a second coupler strength between the second tunable floating qubit device 1314 and the tunable floating coupler device 1316 have opposite signs, e.g., $g_{1c}$ and $g_{2c}$, as defined in Equation (31) have different signs. In some implementations, the coupler electrodes 1326A, 1326B of the tunable floating coupler device may be configured asymmetrically in another manner.

In the example shown in FIG. 13, since $g_{1c}$ and $g_{2c}$ have different signs, the effective coupling strength $g_{eff}$ as defined in Equation (35) may be negative when the transition frequency of the tunable floating coupler device 1316 is greater than that of the two tunable floating qubit devices 1312, 1314. Therefore, the effective coupling strength can offset the static coupling strength of the two tunable floating qubit devices 1312, 1314 to achieve a vanishing total coupling strength g. As shown in Equation (31), the coupling strength $g_{jc}(\Phi_{ec})$ is a function of the coupler flux bias applied to the tunable floating coupler device 1316. Therefore, the coupling strengths $g_{jc}$ may have different values when the tunable floating coupler device 1316 is parked at the extrema of the frequency range by controlling the coupler flux bias $\Phi_{ec}$. In some instances, due to the large tunability of the tunable floating coupler device 1316, the difference between the coupling strengths $g_{jc}$ when the tunable floating coupler device 1316 is parked at the minimal and maximal frequencies can be quite significant. In some examples, tunability of the tunable floating coupler device is defined by the maximal frequency and the minimal frequency of the tunable floating coupler device, e.g., tunability=maximal frequency-minimal frequency, where the maximal frequency occurs at a coupler flux bias of 0 and the minimal frequency occurs at a coupler flux bias of $0.5\Phi_0$, where $\Phi_0$ is flux quantum (a constant).

In some aspects, the methods and systems presented here provide flexibility in device design space by allowing controllable coupling capacitances to define the operating regimes of the tunable floating coupler device 1316. In some instances, the operating regimes of the tunable floating coupler device 1316 include one of the following: the frequency of the tunable floating coupler device 1316 is greater or less than the frequencies of the tunable floating qubit devices 1312, 1314. In the example shown in FIG. 13, $C_{1c} > C_{1cx}$ and $C_{2c} < C_{2cx}$, $g_{1c}$ and $g_{2c}$ have opposite signs, and the static coupling strength $g_{12}$ is negative. As a result, to get a vanishing total strength $g_{01}$, the frequency of the tunable floating coupler device 1316 is greater than that of the tunable floating qubit devices 1312, 1314.

Figure 14:
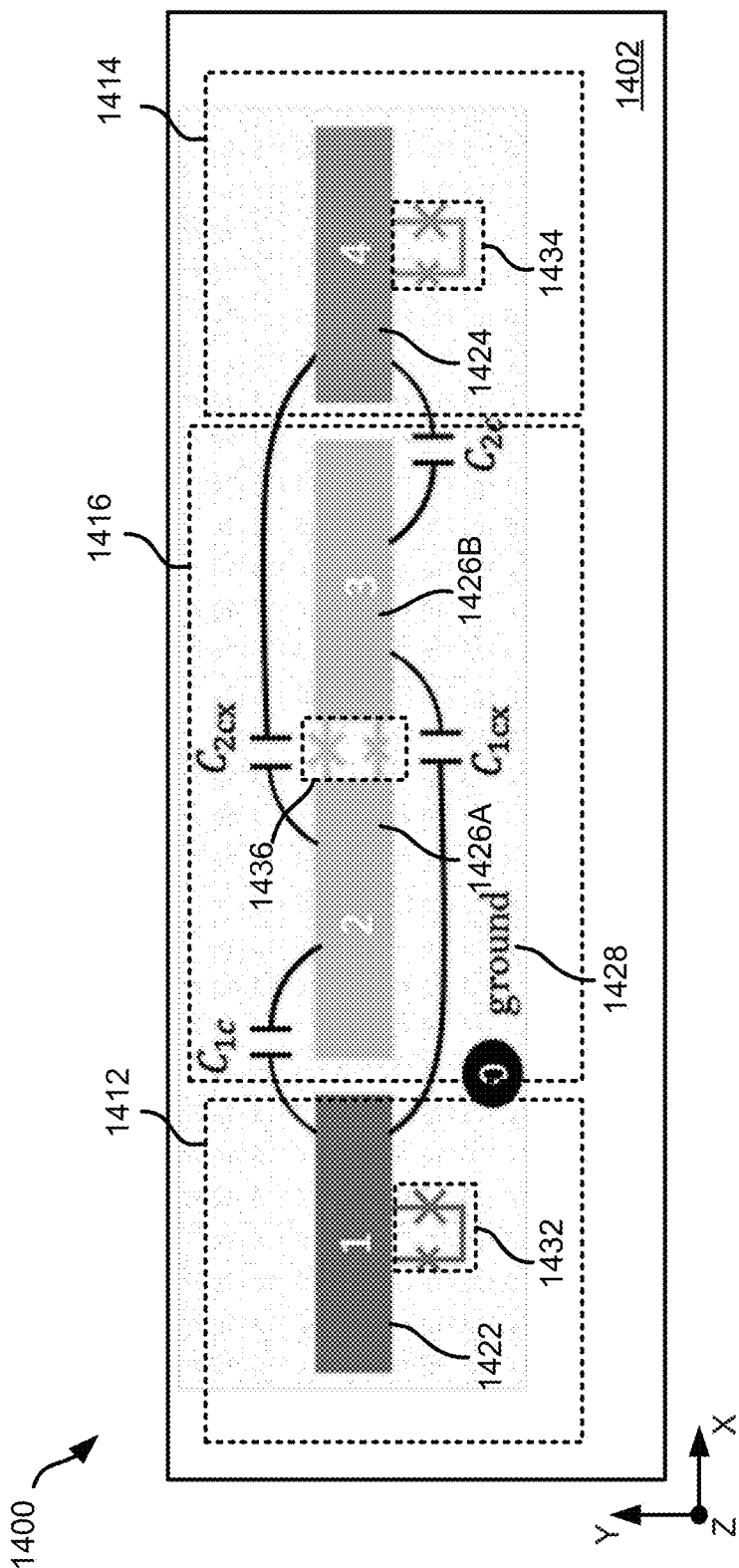
FIG. 14 is a schematic diagram showing a top view of an example quantum processing unit.

FIG. 14 is a schematic diagram showing a top view of an example quantum processing unit 1400. The example quantum processing unit 1400 includes superconducting quantum circuit devices. As shown in FIG. 14, the superconducting quantum circuit devices in the example quantum processing unit 1400 include a first tunable grounded qubit device 1412, a second tunable grounded qubit device 1414, and a tunable floating coupler device 1416. The example quantum processing unit 1400 shown in FIG. 14 resides on the top surface of a substrate 1402. The substrate 1402 may be implemented as the substrate 302 in FIG. 3. As shown in FIG. 14, the example quantum processing unit 1400 also includes a ground plane 1428 surrounding the first and second tunable grounded qubit devices 1412, 1414 and the tunable floating coupler devices 1416, and other superconducting quantum circuit devices. In some examples, the first and second tunable grounded qubit devices 1412, 1414 and the tunable floating coupler device 1416 may be implemented by other types of systems, and the features and components represented in FIG. 14 can be extended in a larger two-dimensional or three-dimensional array of devices. The example quantum processing unit 1400 may include additional or different features and components, which may be configured in another manner. For example, the superconducting quantum circuit devices may include readout resonator devices associated with the first and second tunable grounded qubit devices 1412, 1414 for performing readout operations. For another example, the example quantum processing unit 1400 may include flux control lines (e.g., with flux bias devices) for providing flux control signals and performing quantum logic gates.

The first and second tunable grounded qubit devices 1412, 1414 and the tunable floating coupler device 1416 includes superconducting circuit loops 1432, 1434, 1436, respectively. Each of the superconducting circuit loops 1432, 1434, 1436 includes two Josephson junctions connected in parallel. The superconducting circuit loops 1432, 1434, 1436 may be implemented and operated as the respective superconducting circuit loops 332, 334, 336 shown in FIG. 3 or in another manner. As shown in FIG. 14, each of the first and second tunable qubit devices 1412, 1414 includes one qubit electrode; and the tunable coupler device 316 includes a pair of qubit electrodes. Particularly, the first tunable grounded qubit device 1412 includes a qubit electrode 1422; the second tunable grounded qubit device 1414 includes a qubit electrode 1424; and the tunable coupler device 1416 includes a pair of qubit electrodes 1426A/1426B. Each of the qubit electrodes 1422, 1424, 1426A, 1426B are electrically floating at a certain potential without connecting conductively to the ground plane 1428 and may be implemented as the electrodes 322A, 324A, 326A, 326B of the example quantum processing unit 300 in FIG. 3. The two Josephson junctions in the first and second superconducting circuit loops 1432, 1434 are conductively coupled between the qubit electrodes 1422, 1424 and the ground plane 1428.

A qubit electrode may be capacitively coupled to one or more other qubit electrodes and/or the ground plane. For example, a residual capacitance can be formed between the qubit electrode 1422 of the first tunable qubit device 1412 and each of the qubit electrodes 1426A, 1426B of the tunable coupler device 1416. Similarly, a residual capacitance can be formed between the qubit electrode 1434 of the second tunable qubit device 1414 and each of the qubit electrodes 1426A, 1426B.

The example quantum processing unit 1400 shown in FIG. 14 resides on the top surface of a substrate 1402. In certain instances, the substrate 1402 may be implemented as the substrate 302 in FIG. 3 or in another manner. The qubit electrodes 1422, 1424, 1426A, 1426B, and the ground plane 1428 include superconductive materials and can be formed by patterning one or more superconductive (e.g. superconducting metal) layers or other materials on the surface of the substrate 1402. In some instances, the node 1422, 1424, 1426A, 1426B, and the ground plane 1428 may include a superconductive material.

Figure 15:
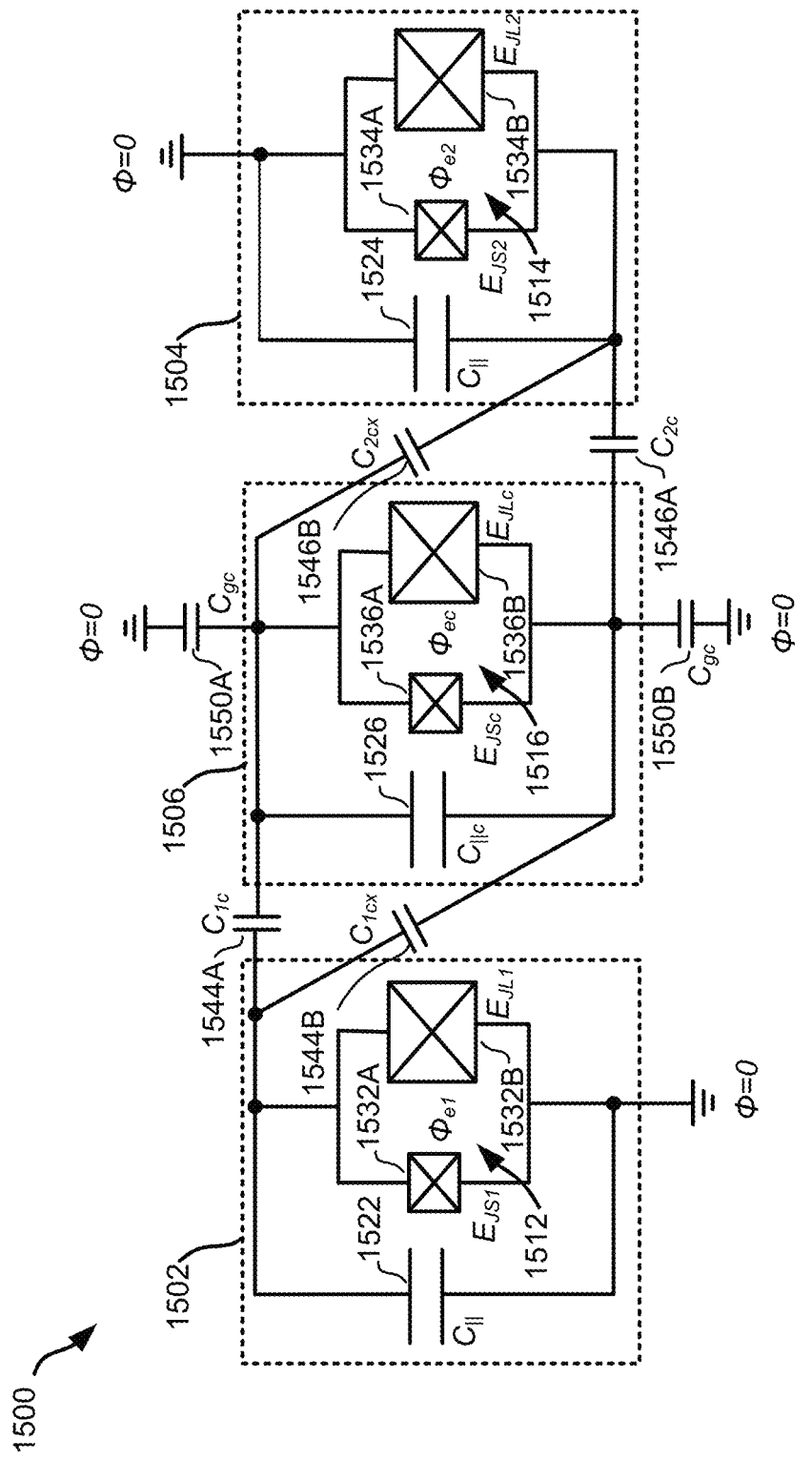
FIG. 15 is a circuit diagram showing an example equivalent circuit of the example quantum processing unit in FIG. 14.

FIG. 15 is a circuit diagram showing an example equivalent circuit 1500 of the example quantum processing unit 1400 in FIG. 14. The example equivalent circuit 1500 represented in FIG. 15 includes a first tunable grounded qubit device 1502, a second tunable grounded qubit device 1504, and a tunable coupler device 1506. For instance, the equivalent circuit 1500 in FIG. 15 can represent a pair of qubit devices 212B, 212C and the tunable coupler device 214C in the quantum processing unit 204 in FIG. 2, or the equivalent circuit 1500 in FIG. 15 can represent devices in another type of system or environment.

In the example shown in FIG. 15, each of the first and second tunable grounded qubit devices 1502, 1504 and the tunable floating coupler device 1506 is implemented as a tunable-frequency transmon qubit device. As shown, the first tunable grounded qubit device 1502 includes two Josephson junctions 1532A, 1532B having Josephson energies $E_{JS1}$ and $E_{JL1}$. The two Josephson junctions 1532A, 1532B are connected in parallel with each other to form a first superconducting circuit loop 1512. The first tunable qubit device 1502 also includes a shunt capacitor 1522 with a capacitance $C_\parallel$ caused by the qubit electrode 1422 and the ground plane. The second tunable qubit device 1504 includes two Josephson junctions 1534A, 1534B having Josephson energies $E_{JS2}$ and $E_{JL2}$. The two Josephson junctions 1534A, 1534B are connected in parallel with each other to form a second superconducting circuit loop 1514. The second tunable qubit device 1504 also includes a shunt capacitor 1524 with a capacitance $C_\parallel$ caused by the qubit electrode 1424 and the ground. The tunable coupler device 1506 includes two Josephson junctions 1536A, 1536B having Josephson energies $E_{JSC}$ and $E_{JLC}$. The two Josephson junctions 1536A, 1536B are connected in parallel with each other to form a third superconducting circuit loop 1516. The tunable coupler device 1506 also includes a shunt capacitor 1526 with a capacitance $C_{\parallel C}$ caused by two qubit electrodes 1426A, 1426B of the tunable coupler device 1416. The tunable floating coupler device 1506 is coupled to the ground plane via residual capacitors 1550A, 1550B having the same capacitance $C_{gc}$.

As shown in FIG. 15, the tunable floating coupler device 1506 is capacitively coupled to each of the first and second tunable grounded qubit devices 1502, 1504 via respective residual capacitors. Particularly, the tunable coupler device 1506 is coupled to the first tunable grounded qubit device 402 via residual capacitors 1544A, 1544B with respective capacitances $C_{1c}$ and $C_{1cx}$; and the tunable floating coupler device 1506 is coupled to the second tunable grounded qubit device 1504 via residual capacitors 1546A, 1546B with respective capacitances $C_{2c}$ and $C_{2cx}$. The residual capacitor 1544A is caused by the capacitance between the qubit electrodes 1422, 1426A; the residual capacitor 1544B is caused by the capacitance between the qubit electrodes 1422, 1426B; the residual capacitor 1546A is caused by the capacitance between the qubit electrodes 1424, 1426B; and the residual capacitor 1546B is caused by the capacitance between the qubit electrodes 1424, 1426A.

Figure 17:
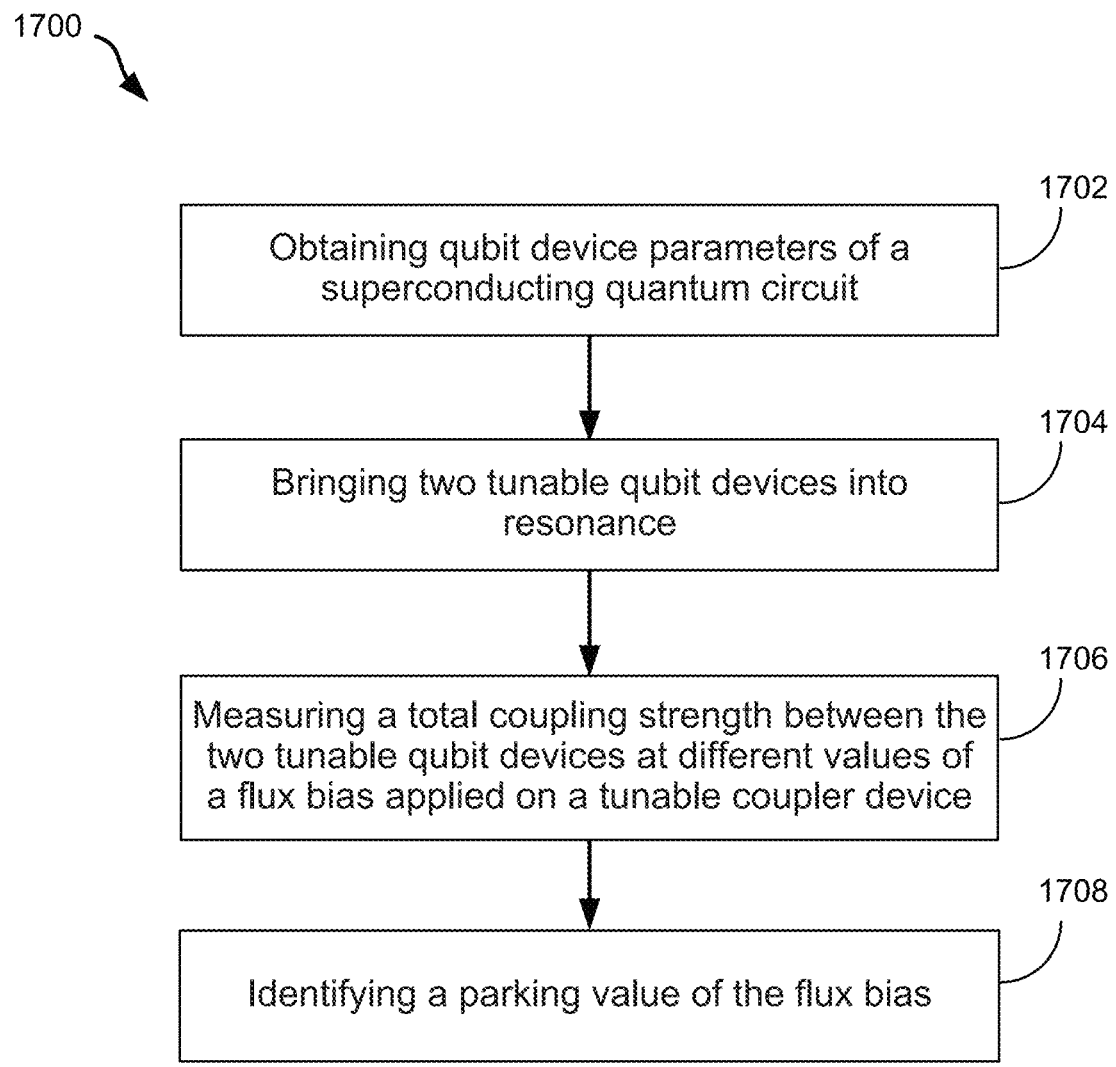
FIG. 17 is a flow chart showing aspects of an example process.

In some implementations, control operations can be performed on the quantum processing unit 1500 with respect to the operations described in FIG. 3, in the example process 1700 shown in FIG. 17, or in another manner.

Introducing node fluxes $\Phi_j$ and external flux biases $\Phi_{ej}$ through each of the superconducting circuit loops 1512, 1514, 1516, the Lagrangian of the circuit shown in FIG. 15 can be written as:

$$\mathcal{L} = V - U \tag{38}$$

$$T = \frac{1}{2}C_1\dot{\Phi}_1^2 + \frac{1}{2}C_2\dot{\Phi}_4^2 +$$

$$\frac{1}{2}C_c(\dot{\Phi}_3 - \dot{\Phi}_2)^2 + \frac{1}{2}C_{gc}(\dot{\Phi}_2^2 + \dot{\Phi}_3^2) + \frac{1}{2}C_{1c}(\dot{\Phi}_2 - \dot{\Phi}_1)^2 +$$

$$\frac{1}{2}C_{1cx}(\dot{\Phi}_3 - \dot{\Phi}_1)^2 + \frac{1}{2}C_{2c}(\dot{\Phi}_4 - \dot{\Phi}_3)^2 + \frac{1}{2}C_{2cx}(\dot{\Phi}_4 - \dot{\Phi}_2)^2$$

$$U = -E_{J1}\cos(2\pi\Phi_1/\Phi_0 + 2\pi\Phi_{e1}/\Phi_0) - E_{J2}\cos(2\pi\Phi_4/\Phi_0 + 2\pi\Phi_{e2}/\Phi_0) -$$

$$E_{J1}\cos[2\pi(\Phi_3 - \Phi_2)/\Phi_0 + 2\pi\Phi_{ec}/\Phi_0]$$

where $E_{Jk}$ are junction energies. Introducing new flux variables $\Phi_{p/m} = \Phi_3 \pm \Phi_2$ and defining conjugate variables $Q_1 = \partial\mathcal{L}/\partial\dot{\Phi}_1$, $Q_2 = \partial\mathcal{L}/\partial\dot{\Phi}_4$, $Q_{cp} = \partial\mathcal{L}/\partial\dot{\Phi}_{cp}$, and $Q_{cm} = \partial\mathcal{L}/\partial\dot{\Phi}_{cm}$, the corresponding Hamiltonian is given by $$H = \frac{1}{2}QC^{-1}Q^T - U \tag{39}$$

where the capacitance matrix C is given by $$C = \begin{pmatrix} C_{\Sigma 1} & -\frac{1}{2}(C_{1c} + C_{1cx}) & \frac{1}{2}(C_{1c} - C_{1cx}) & 0 \\ -\frac{1}{2}(C_{1c} + C_{1cx}) & \frac{1}{2}(C_{\Sigma 1} + C_{\Sigma 2} + 2C_{gc}) & \frac{1}{4}(C_{2c} - C_{2cx} + C_{1cx} - C_{1c}) & -\frac{1}{2}(C_{2c} + C_{2cx}) \\ \frac{1}{2}(C_{1c} - C_{1cx}) & \frac{1}{4}(C_{2c} - C_{2cx} + C_{1cx} - C_{1c}) & \frac{1}{2}(C_{\Sigma 1} + C_{\Sigma 2} + 2C_{gc}) & -\frac{1}{2}(C_{2c} - C_{2cx}) \\ 0 & -\frac{1}{2}(C_{2c} + C_{2cx}) & -\frac{1}{2}(C_{2c} - C_{2cx}) & C_{\Sigma 2'} \end{pmatrix} \tag{40}$$

where $C_{\Sigma j} = C_j + C_{jc} + C_{jcx}$. Keeping the modes represented by $Q_1$, $Q_2$ and $Q_{cm}$, the Hamiltonian can put in the form $$H = 4E_{C1}\hat{n}_1^2 + 4E_{C2}\hat{n}_2^2 + 4E_{Cc}\hat{n}_c^2 + 4E_{12}\hat{n}_1\hat{n}_2 + 4E_{1c}\hat{n}_1\hat{n}_c + 4E_{2c}\hat{n}_2\hat{n}_c = \tag{41}$$

$$-\sum_{j=1,2,c} E_{Jj}\cos(\hat{\phi}_{jm} + \phi_{0j}),$$

where $\hat{n}_j = Q_j/2e$ is the number of Cooper-pair operator, $E_{Cj}$ ($j \in \{1,2,c\}$), $E_{12}$, $E_{1C}$, $E_{2c}$ the charging energies, and coupling energies, respectively. The coupling energies are given by $$E_{12} = \frac{e^2}{4C_{tot}}[C_{1c}C_{2c}C_c + C_{1c}C_{2c}(C_{1cx} + C_{2cx}) + \qquad (42)$$

$$(C_c + C_{gc})(C_{1c}C_{2cx} + C_{2c}C_{1cx}) + C_{1cx}C_{2cx}(C_1 + C_2 + C_c)],$$

$$E_{1c} = -\frac{e^2}{C_{tot}}[C_2(C_{1c}C_{2c} - C_{1cx}C_{2cx}) + C_{gc}C_{\Sigma 2}(C_{1c} - C_{1cx})],$$

$$E_{2c} = \frac{e^2}{C_{tot}}[C_1(C_{1c}C_{2c} - C_{1cx}C_{2cx}) + C_{gc}C_{\Sigma 1}(C_{2c} - C_{2cx})],$$

$$E_{C1} \approx \frac{e^2}{2C_{tot}}\{C_{1c}C_{2c}C_2 +$$

$$C_cC_{gc}(C_2 + C_{2c}) + [(C_{2c} + C_{gc})(C_2 + C_{2c}) + C_2C_{2c}](C_c + C_{gc})\},$$

$$E_{C2} \approx \frac{e^2}{2C_{tot}}\{C_1C_{1c}C_{2c} + C_cC_{gc}(C_1 + C_{1c}) +$$

$$[(C_{2c} + C_{gc})(C_1 + C_{1c}) + C_1C_{1c}](C_c + C_{gc})\},$$

$$E_{Cc} \approx \frac{e^2}{C_{tot}}[C_1C_{1c}(C_2 + C_{2c}) + C_2C_{2c}(C_1 + C_{1c}) +$$

$$2(C_1 + C_{1c})(C_2 + C_{2c})C_{gc}],$$

where $$C_{tot} \approx C_1C_2C_{1c}C_{2c} + C_{gc}(C_1+C_{1c})(C_2+C_{2c})(2C_c+C_{gc}) + (C_c+c_{gc})[c_1c_{1c}(c_2+c_{2c})+c_2c_{2c}(c_1+C_{1c})]. \qquad (43)$$

Expressing the Cooper pair and reduced flux operators in terms of the harmonic oscillator basis, the coupling strength $$g_{jc} = \frac{E_{jc}}{\sqrt{2}}\left(\frac{E_{Jj}}{E_{Cj}}\frac{E_{Jc}(\Phi_{e1})}{E_{Cc}}\right)^{\frac{1}{4}}\left[1 - \frac{1}{8}(\xi_c + \xi_j)\right], j \in \{1, 2\}, \qquad (44)$$

$$g_{12} = \frac{E_{12}}{\sqrt{2}}\left(\frac{E_{J1}}{E_{C1}}\frac{E_{J2}}{E_{C2}}\right)^{\frac{1}{4}}\left[1 - \frac{1}{8}(\xi_1 + \xi_2)\right].$$

The coupling energies that determine the signs of the couplings $g_{12}$ and $g_{jc}$ are given by $$E_{12} = \frac{e^2}{4C_{tot}}[C_{1c}C_{2c}C_c + C_{1c}C_{2c}(C_{1cx} + C_{2cx}) + \qquad (45)$$

$$(C_c + C_{gc})(C_{1c}C_{2cx} + C_{2c}C_{1cx}) + C_{1cx}C_{2cx}(C_1 + C_2 + C_c)],$$

$$E_{1c} = -\frac{e^2}{C_{tot}}[C_2(C_{1c}C_{2c} - C_{1cx}C_{2cx}) + C_gC_{\Sigma 2}(C_{1c} - C_{1cx})],$$

$$E_{2c} = \frac{e^2}{C_{tot}}[C_1(C_{1c}C_{2c} - C_{1cx}C_{2cx}) + C_gC_{\Sigma 1}(C_{2c} - C_{2cx})],$$

where $C_{\Sigma j}=C_j+C_{jc}+C_{jcx}$ and $C_{tot}$ is the total capacitance and its explicit form is given in Equation (42). In some instances, the static coupling energy $E_{12}$ is positive, while the coupling energies $E_{1c}$ and $E_{2c}$ can be positive or negative depending on the relative magnitude of $C_{jc}$ and $C_{jcx}$ In the example quantum processing unit 1400 shown in FIG. 14, the nearest neighbour capacitance $C_{jc}$ between two qubit electrodes 1422/1426A, 1424/1426B has a greater capacitance value than that of the respective next-nearest neighbour capacitance $C_{jcx}$ between two qubit electrodes 1422/1426B, 1424/1426B. Under this condition, the coupling energy $E_{1c}$ is negative while $E_{2c}$ is positive. Since the signs of the coupling strengths are determined by the signs of the coupling energies, the coupling strength $G_{12}>0$ and $g_{1c}g_{2c}<0$. Therefore, according to Equations (34), (35), when the effective coupling strength $g_{eff}$ is positive, it can offset the static coupling strength $g_{12}$ when the frequency of the tunable floating coupler device 1506 is less than that of the tunable grounded qubit devices 1502, 1504.

As an example, considering circuit parameters $C_1$=95.74 fF, $C_2$=85.74 fF, $C_{1c}$=$C_{2c}$=10 fF, $C_{1cx}$=$C_{2cx}$=1 fF, $C_{gc}$=110 fF, and $C_c$=32.5 fF and device parameters $f_1$=4.167 GHz and $f_2$=4.542 GHz, the coupler frequency range $f_c$=0.625–3.658 GHz, anharmonicities $\eta_1/2\pi$=203 MHz, $\eta_2/2\pi$=225 MHz, and $\eta_c/2\pi$=240 MHz, the static coupling strength $g_{12}$ and the coupling strength $g_{1c}$, $g_{2c}$ can be determined, e.g., $g_{12}/2\pi$=6.1 MHz, $g_{1c}/2\pi$=−88 MHz, and $g_{2c}/2\pi$=96.6 MHz.

Figure 16:
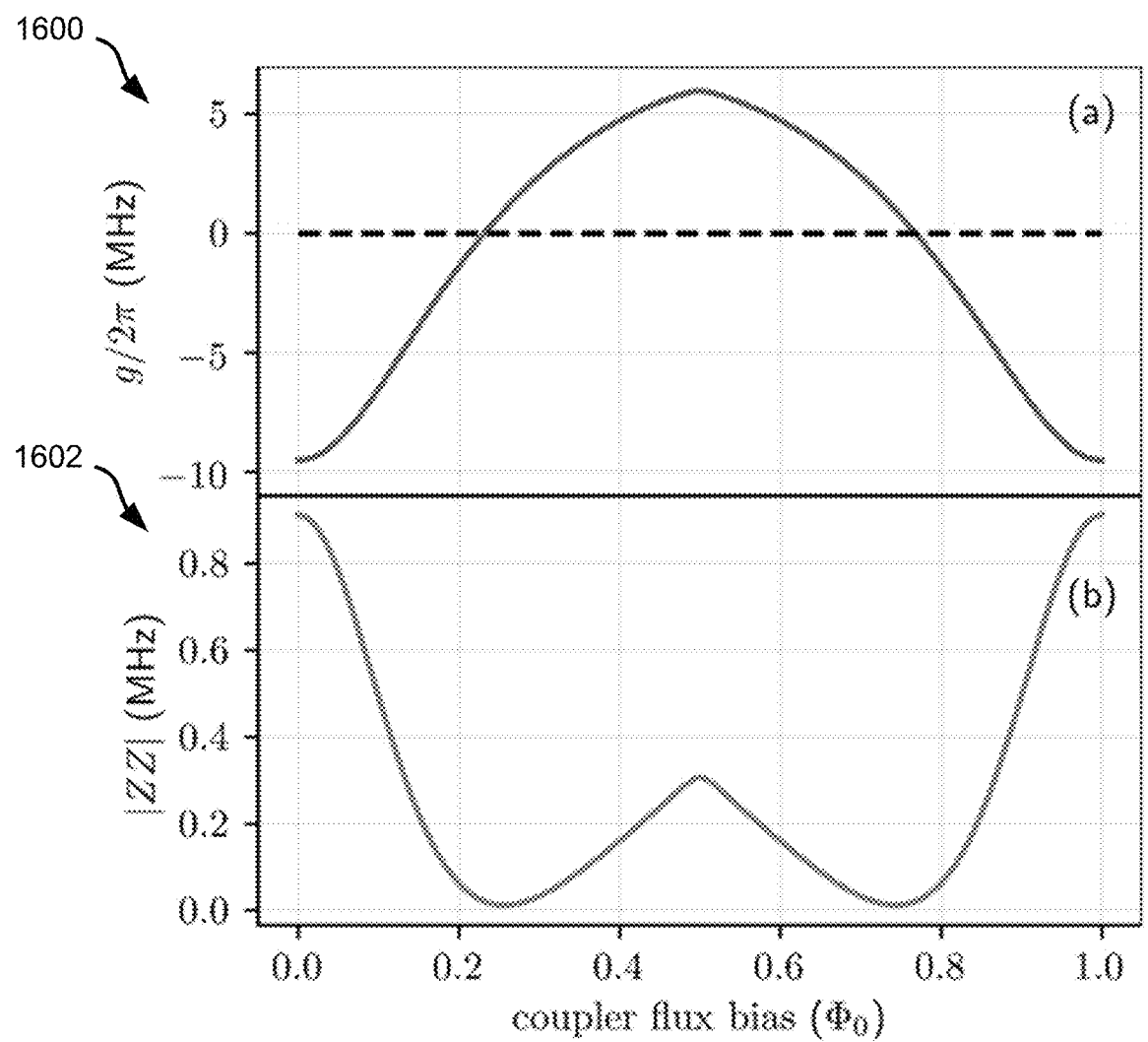
FIG. 16 are plots showing a total coupling strength of a XX coupling and a magnitude of a total coupling strength of a ZZ coupling as functions of a coupler flux bias applied to a tunable floating coupler device of the example quantum processing unit in FIG. 14 represented by the example equivalent circuit in FIG. 15.

FIG. 16 are plots 1600, 1602 showing a total coupling strength of an XX coupling and a magnitude of a total coupling strength of a ZZ coupling as functions of a coupler flux bias applied to a tunable floating coupler device of the example quantum processing unit 1400 in FIG. 14 represented by the example equivalent circuit 1500 in FIG. 15. The plot 1600 is obtained when the two tunable floating qubit devices 1502, 1504 are in resonance; and a plot 1602 is obtained when the first and second tunable grounded qubit devices 1502, 1504 are parked at a DC sweet spot.

As shown in FIG. 16, the total coupling strength g of the XX coupling vanishes at $\Phi_{ec}$=0.23 $\Phi_0$ and the coupling strength $\zeta$ of the ZZ coupling vanishes at a slightly different coupler flux bias $\Phi_{ec}$=0.255 $\Phi_0$. The value of the coupler flux bias that gives ZZ=0 is a parking value of the coupler flux bias, where single qubit gates are operated. It is worth noting that the vanishing g and ZZ are achieved without requiring to have a direct coupling capacitance between the first and second tunable grounded qubit devices 1502, 1504. When the qubit electrodes 1422, 1424, 1426A, 1426B in the quantum processing unit 1400 are arranged such that $C_{1c}>C_{1cx}$ and $C_{2cx}>C_{2c}$, the static coupling strength $g_{12}$ is positive, and both $E_{1c}$ and $E_{2c}$ are negative. The frequency of the tunable floating coupler device 1506 is greater than the frequencies of the fixed-frequency grounded qubit devices 1502, 1504. A direct coupling between the qubit electrodes 1422, 1424 is not required to achieve a vanishing total coupling strength.

FIG. 17 is a flow chart showing aspects of an example process 1700. The example process 1700 can be used, for example, to operate a quantum processing unit. For instance, the example process 1700 may be used for determining a parking value of a coupler flux bias applied in a tunable floating coupler device in a quantum processing unit (e.g., the tunable floating coupler device 316, 406, 606, 904A, 904B, 904C, 904D, 1004, 1104, 1216, 1316, 1416 shown in FIGS. 3, 4, 6, 9-14). In some instances, the quantum processing unit includes two tunable floating qubit devices which can be implemented as the quantum processing unit 300, 400, 600, 900, 1000, 1100, 1200, 1300 in FIGS. 3, 4, 9-13 or two tunable grounded qubit devices, which can be implemented as the quantum processing unit 1400 shown in FIG. 14. In some implementations, the quantum processing unit may include other superconducting quantum circuit devices, for example, readout resonator devices, flux bias devices, control lines, connections (e.g., capacitive coupling, galvanic coupling, inductive coupling, or combinations thereof). The example process 1700 may include additional or different operations, and the operations can be performed in the order shown or in another order.

In some implementations, one or more operations in the example process 1700 can be performed by a computer system, for instance, by a digital computer system having one or more digital processors (e.g., a microprocessor or other data processing apparatus) that execute instructions (e.g., instructions stored in a digital memory or other computer-readable medium), or by another type of digital, quantum, or hybrid computer system. As an example, in some cases the quantum processing unit can be deployed as the quantum processing unit 102 shown in FIG. 1, and operations in the example process 1700 shown in FIG. 17 can be controlled, executed, or initiated by one or more components of the control system 105 shown in FIG. 1.

At 1702, device parameters are obtained. The device parameters representing the quantum circuit devices (e.g., the tunable qubit devices and the tunable floating coupler device) in a quantum processing unit can be determined by performing a measurement or characterization process, a calibration process, or another type of process. For example, a calibration process can be executed in a quantum computing system to obtain the device parameters for each of the quantum circuit devices in the quantum processing unit. In some instances, a calibration process can characterize the quantum circuit devices that a quantum logic gate operation is to be applied to. In some cases, the calibration process can also characterize neighboring qubit devices in the quantum processing unit. In certain examples, the process for obtaining the device parameters of the quantum circuit devices is executed by the control system 202 of FIG. 2 or by another component in a computing system (e.g., the computing system 101). In some instances, the device parameters may be predetermined using another process, which can be stored and obtained in another manner.

In some implementations, the device parameters may include one or more of the device parameters of the tunable qubit devices (e.g., floating or grounded) and tunable floating coupler device in the quantum processing unit. For example, device parameters, such as the drive frequency, a range of operating frequencies (e.g., minimal and a maximal frequencies), and anharmonicity of each of the tunable qubit devices and the tunable floating coupler device involved in the interaction, or another qubit device parameter, may be obtained.

At 1704, the two tunable qubit devices are brought into resonance with each other. In some implementations, the two tunable qubit devices can be brought into resonance with each other by tuning a frequency of one of the two tunable qubit devices, for example, by tuning a flux bias in a superconducting circuit loop associated with the one of the two tunable qubit devices. In some instances, one of the two tunable qubit devices is a tunable qubit device with a higher transition frequency. In some implementations, prior to bringing the two tunable qubit devices into resonance with each other, values of signal parameters for a control signal can be identified according to the device parameters.

At 1706, a total coupling strength of the two tunable qubit devices are measured. In some instances, the total coupling strength of the two tunable qubit devices is measured at different values of a coupler flux bias applied to the tunable floating coupler device. For example, a first value of the coupler flux bias can be applied to the tunable floating coupler device to tune the frequency of the tunable floating coupler device to the maximal value. When the tunable floating coupler device is tuned to the maximal value, a π pulse signal can be applied to one of the two tunable qubit devices and an oscillation of a population of the other one of the two tunable qubit devices can be measured. In some instances, the total coupling strength at the first value of the coupler flux bias may be determined according to the oscillation period. This process is repeated as coupler flux bias is varied from the first value to a second value of the coupler flux bias causing the tunable floating coupler device to park at the minimal frequency. In some instances, the total coupling strength as a function of the coupler flux bias may be determined using a different control signal or in another manner. In some instances, the process 1700 is used to determine a total XX coupling and a separately measurement can be performed for determining the ZZ coupling separately.

In some implementations, if there is flux crosstalk between the flux control lines of the tunable qubit devices and the tunable floating coupler device, one needs to correct the flux crosstalk to fine tune the total coupling strength. In some implementations, the flux crosstalk can be quantified using single qubit gate simultaneous randomized benchmarking or another method.

At 1708, a parking value of the coupler flux bias is identified. In some instances, the parking value of the coupler flux bias is identified as the value of the coupler flux bias at a vanishing total coupling strength, e.g., g=0 or $g \leq g_{01,th}$. In certain instances, the predetermined threshold value (e.g., $g_{01,th}$) of the total coupling strength is determined according to a performance parameter, e.g., a gate fidelity. For example, a different gate fidelity value may result in a different threshold value for the total coupling strength.

Figure 18:
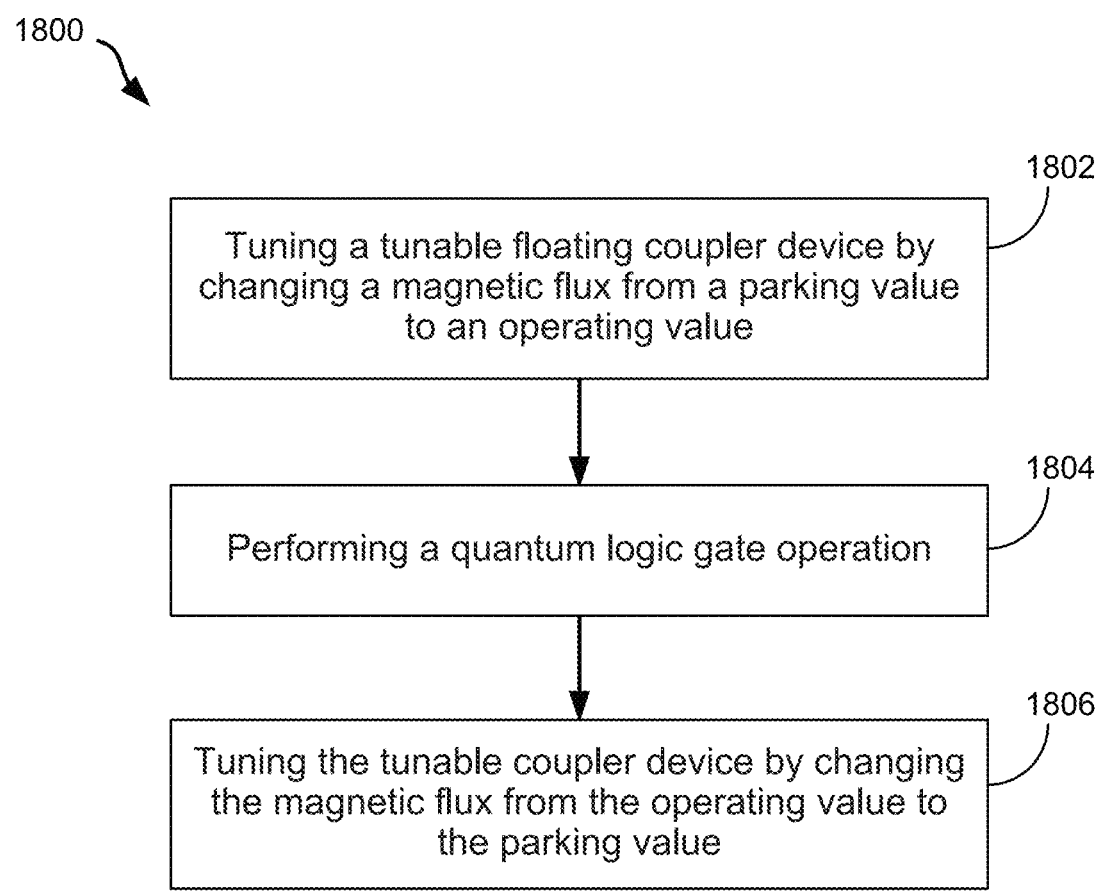
FIG. 18 is a flow chart showing aspects of an example process.

In some instances, a gate-activating value of the coupler flux bias can be also identified. In certain examples, when the frequency of the tunable floating coupler device is greater or less than both of the frequencies of the two tunable qubit devices, the gate-activating value of the coupler flux bias is a value of the coupler flux bias that causes the total coupling strength to reach a local maximal value. In some instances, when the tunable floating coupler device includes asymmetric Josephson junctions and its minimum frequency is greater than both the frequencies of the tunable qubit devices, the gate-activating value of the coupler flux bias is a value that causes the tunable floating coupler device to park at the minimal frequency or another value. FIG. 18 is a flow chart showing aspects of an example process 1800. The example process 1800 can be used, for example, to operate a quantum processing unit. For instance, the example process 1800 may apply one or more quantum logic gates or another type of control operation to a pair of qubits defined by two tunable qubit devices in a superconducting quantum processing unit. Examples of quantum logic gates include single-qubit quantum logic gates, two-qubit quantum logic gates, and other multi-qubit quantum logic gates. Examples of two-qubit quantum logic gates include iSWAP gates, SWAP gates, XY gates, controlled-Z gates and other controlled-rotation gates, controlled-NOT gates, and Bell-Rabi gates. The example process 1800 may include additional or different operations, and the operations can be performed in the order shown or in another order.

In some implementations, the quantum processing unit may include a superconducting circuit that includes quantum circuit devices. The quantum circuit devices may include, for example, tunable qubit devices, tunable floating coupler devices, readout resonator devices, flux bias devices, control lines, connections (e.g., capacitive coupling, galvanic coupling, inductive coupling, or combinations thereof), and other types of circuit devices. In some examples, the tunable qubit devices include tunable floating coupler devices or tunable grounded qubit devices. For instance, the example process 1800 shown in FIG. 18 may be used to manage control operations, e.g., parametrically activated quantum logic gates, for a quantum processing unit including a quantum processing unit 300, 400, 600, 900, 1000, 1100, 1200, 1300, 1400, 1500 shown in FIGS. 3, 4, 6, 9-15, or another type of superconducting circuit.

In some implementations, one or more operations in the example process 1800 can be performed by a computer system, for instance, by a digital computer system having one or more digital processors (e.g., a microprocessor or other data processing apparatus) that execute instructions (e.g., instructions stored in a digital memory or other computer-readable medium) to perform the example process 1800, or by another type of digital, quantum or hybrid computer system. As an example, in some cases the quantum processing unit can be deployed as the quantum processing unit 102 shown in FIG. 1, and operations in the example process 1800 shown in FIG. 18 can be controlled, executed, or initiated by one or more components of the control system 105 shown in FIG. 1.

At 1802, the tunable floating coupler device is tuned by changing a coupler flux bias from a parking value to a gate-activating value. In some instances, the parking value and the gate-activating value of the coupler flux bias applied to the tunable floating coupler device may be obtained with respect to the example process 1700 shown in FIG. 17 or in another manner. The gate-activating value of the coupler flux bias is the value of the coupler flux bias applied to the tunable floating coupler device that causes the tunable floating coupler device to park at the minimal frequency. In some instances, a magnitude of the coupling strength between the first and second tunable qubit devices is maximal when the gate-activating value of the coupler flux bias is applied to the tunable floating coupler device.

At 1804, a quantum logic gate operation is performed. In some instances, values of parameters for a control signal are identified according to the device parameters obtained in operation 1802. In some implementations, the control signal may be generated according to control information. In some implementations, the control information may be provided by a user device (e.g., the user device 110) or in another manner. In some implementations, the control information contains higher-level quantum instructions, such as a quantum algorithm, quantum operations that are to be performed on qubits defined by one or more tunable qubit devices in a quantum processing unit.

In some implementations, the control information may be converted to one or more control signals by operation of a processing unit. The control signal, which can be implemented as the control signals 206, can be communicated by operation of a control system, e.g., the control system 202 in FIG. 2, and delivered to the quantum processing unit, e.g., the quantum processing unit 204 in FIG. 2. The control signals converted from the control information depend on the quantum processing unit where the control signals are implemented. For example, the frequency of the control signal depends on the modality of the quantum processing unit. When the quantum processing unit contains superconducting quantum circuit devices, the control signal may have a frequency in a radiofrequency or microwave domain.

In some implementations, the control signal may be used to operate devices in the quantum processing unit, including the tunable qubit devices, the tunable floating coupler devices, readout resonator devices, bias devices, flux bias devices, or another type of component in the quantum processing unit, e.g., the quantum processing unit 102 of the quantum computing system 103 as shown in FIG. 1. In some instances, values of parameters of the control signal are determined according to the device parameters of the qubit devices of the quantum processing unit determined during the operation 1702.

In some implementations, the control signal is a current signal, a voltage signal, or another type of electrical signal that is used to control the magnetic flux applied to tunable floating qubit devices in a quantum processing unit, e.g., the tunable floating qubit devices 312, 314 in FIG. 3 or applied to tunable ground qubit devices, e.g., the tunable grounded qubit devices 1421, 1414 in FIG. 14. In some instances, the control signal is used to control a flux bias device to generate and modulate the magnetic flux that is applied to the tunable qubit devices. In some implementations, the control signals are used to control a magnetic flux applied to the tunable floating coupler device to park a frequency value that causes the total coupling strength of the tunable qubit devices to vanish, e.g., g=0 or $g \leq g_{01,th}$.

In some implementations, the values of the parameters of the control signal that are applied to the flux bias device can be determined according to the values of the values of the coupler flux bias to be achieved. In some instances, the values of the parameters of the control signal that are applied to the flux bias device can be determined using a measurement process, a calibration process, or another type of process. In some implementations, the values of the parameters of the control signal are determined according to the design of the other quantum circuit devices in the quantum processing unit.

In some instances, the control signal can be applied to the tunable qubit devices to bring the tunable qubit devices into resonance, for example, by tuning the magnetic flux on a superconducting circuit loop of one of the two tunable qubit devices to tune the frequency of the one of the two tunable qubit devices. When the control signals are applied on the first and second tunable qubit devices, a coupling of the first and second tunable qubit devices is allowed to evolve for a predetermined time period. In some examples, a time evolution of initial states of the first and second tunable qubit devices is determined by a unitary operation that is applied to the first and second tunable qubit devices within the predetermined time period. The predetermined time period is an evolution time or a gate time.

By adiabatically eliminating the degrees of freedom of a tunable floating coupler device, the effective virtual coupling between the two tunable qubit devices can be described by the Hamiltonian as below:

$$\tilde{H} \approx \tilde{\omega}_1 |1\rangle_1 \langle 1| + \tilde{\omega}_2 |1\rangle_2 \langle 1| + g_{XY}(|10\rangle\langle 01| + |01\rangle\langle 10|) + \quad (46)$$
$$g_{CZ02}(|11\rangle\langle 02| + |02\rangle\langle 11| + g_{CZ20}(|11\rangle\langle 20| + |20\rangle\langle 11|)$$

where $$g_{XY} = g_{12} - \frac{1}{2} g_{1c} g_{2c} \left( \frac{1}{\omega_c - \omega_1} + \frac{1}{\omega_c - \omega_2} \right), \quad (47)$$

$$g_{CZ02} = \sqrt{2} g_{12} - \frac{1}{\sqrt{2}} g_{1c} g_{2c} \left( \frac{1}{\omega_c - \omega_1} + \frac{1}{\omega_c - \omega_2 + \eta_2} \right),$$

$$g_{CZ02} = \sqrt{2} g_{12} - \frac{1}{\sqrt{2}} g_{1c} g_{2c} \left( \frac{1}{\omega_c - \omega_1 + \eta_1} + \frac{1}{\omega_c - \omega_2} \right).$$

This Hamiltonian is a generator of a unitary $$U(\theta, \phi) = \begin{pmatrix} 1 & 0 & 0 & 0 \\ 0 & \cos\frac{\theta}{2} & -i\sin\frac{\theta}{2} & 0 \\ 0 & -i\sin\frac{\theta}{2} & \cos\frac{\theta}{2} & 0 \\ 0 & 0 & 0 & e^{-i\phi} \end{pmatrix} \quad (48)$$

where the angle $\theta=2g_{XY}t_{gate}$ determines the family of iSWAP or XY($\theta$) entangling gates, while $\phi$ is the phase accumulated due to the interaction $|11\rangle \leftrightarrow |02\rangle$, or $|11\rangle \leftrightarrow |20\rangle$, and defines the CPHASE($\phi$) entangling gate family.

The unitary of the iSWAP gate family can be obtained by setting $\phi=2\pi n$, where n is an integer and n=0,1,2, . . . , $$U(\theta) = \begin{pmatrix} 1 & 0 & 0 & 0 \\ 0 & \cos\frac{\theta}{2} & -i\sin\frac{\theta}{2} & 0 \\ 0 & -i\sin\frac{\theta}{2} & \cos\frac{\theta}{2} & 0 \\ 0 & 0 & 0 & 1 \end{pmatrix} \quad (49)$$

For example, by choosing $\theta=\pi$, the iSWAP unitary can be recovered and setting $\theta=\pi/2$ yields a unitary for $\sqrt{\text{iSWAP}}$.

In some implementations, two-qubit quantum logic gates for arbitrary rotation angle $\theta$ and phase angle $\phi$ may enacted. The unitary is given by $$U_{Hybrid}(\theta, \phi) = \begin{pmatrix} 1 & 0 & 0 & 0 \\ 0 & \cos\frac{\theta}{2} & -i\sin\frac{\theta}{2} & 0 \\ 0 & -i\sin\frac{\theta}{2} & \cos\frac{\theta}{2} & 0 \\ 0 & 0 & 0 & e^{-i\phi} \end{pmatrix} \quad (50)$$

In some implementations, the rotation angle can be set to $\pi$ or close to $\pi$ and the phase angle is varied by controlling the detuning between $|11\rangle$ and $|02\rangle$ or $|20\rangle$ states. In particular, for very fast two-qubit quantum logic gates, there can be significant phase accumulations. The leakage outside the computation subspace can be minimized by synchronizing the Rabi oscillation between $|10\rangle$ and $|01\rangle$ states of the qubits and $|11\rangle$ and $|02\rangle+|20\rangle$ states. In this case, the quantum logic gate is also known as a Fermionic simulation gate.

The CPHASE($\phi$) family unitary can obtained by setting $\theta=0$ $$U(\theta, \phi) = \begin{pmatrix} 1 & 0 & 0 & 0 \\ 0 & 1 & 0 & 0 \\ 0 & 0 & 1 & 0 \\ 0 & 0 & 0 & e^{-i\phi} \end{pmatrix} \quad (51)$$

when the phase $\phi=\pi$, the unitary of the controlled phase is controlled Z(CZ) gate. To activate a CZ gate, the frequency of the tunable floating coupler device can be tuned to its minimum frequency by changing a coupler flux bias applied to the tunable floating coupler device; and while the frequency of the tunable floating coupler device is at its minimal value, the qubit flux bias applied to the tunable qubit device with a higher frequency can be tuned such that the $|11\rangle$ state of the tunable qubit device is in resonance with the $|20\rangle$ state or the $|02\rangle$ state of the tunable floating coupler device (e.g., CZ20 or CZ02). In some instances, the gate time can be determined by $g_{CZ02}$ or $g_{CZ20}$. In this case, a phase shift of it on state $|11\rangle$ can be introduced to realize the CZ gate.

In some instances, the native quantum logic gates such as the class of XY($\theta$), CPHASE ($\phi$), and/or f sim($\theta$, $\phi$) gates can be performed.

In some implementations, quantum logic gates between the pair of qubits defined by the two tunable qubit devices can be activated by modulating the frequency one of the qubits at certain modulation frequency. This is particularly useful when there is significant detuning between the two tunable qubit devices or a TLS at the operating frequency of the qubits. The frequency of the tunable floating coupler device can be tuned to a maximal or minimal value. For example, the frequency of the tunable qubit device can be modulated as $$\omega_1 = \overline{\omega}_1 + \delta\omega \cos(\omega_{mc}t + \phi_1), \quad (52)$$

where $\overline{\omega}_1$ is the average frequency of the tunable qubit device, and $\omega_m$ is the modulation frequency, and $\phi$ is the phase. A family of XY and CPHASE gates can be activated by modulating one of the frequency of the tunable qubit device at $\omega_{XY}=(\overline{\omega}_1-\overline{\omega}_2)/2$ and $\omega_{CPHASE}=(\overline{\omega}_1-\overline{\omega}_2-\overline{\eta}_1)/2$ or $\omega_{CPHASE}=(\overline{\omega}_1-\overline{\omega}_2+\overline{\eta}_2)/2$, respectively. In some instances, a Bell-Rabi gate can be activated by modulating the frequency of the tunable floating coupler device at $\omega_{BR}=(\overline{\omega}_1+\overline{\omega}_2)/2$.

In some implementations, a parametrically activated quantum logic gate between two tunable qubit device can be activated by tuning the tunable floating coupler device at its maximum frequency by modulating the frequency of the tunable floating coupler device as $$\omega_c = \overline{\omega}_c + \delta\omega \cos(\omega_{mc}t + \phi_c), \quad (53)$$

An XY($\theta$) family can be activated by modulating the coupler at $\omega_{XY}=(\overline{\omega}_1-\overline{\omega}_2)/2$ and CPHASE family by modulating at $\omega_{CPHASE}=(\overline{\omega}_1-\overline{\omega}_2-\overline{\eta}_1)/2$ or $\omega_{CPHASE}=(\overline{\omega}_1-\overline{\omega}_2+\overline{\eta}_2)/2$.

The XY($\beta$, $\theta$) family can be activated by calibrating a single flux base. The XY($\beta$, $\theta$) can be constructed by two $\sqrt{\text{iSWAP}}$ gates in a row with a relative phase between the two pulses determining the angle of the XY ($\beta$, $\theta$) gate and with additional two Z rotations.

$$XY(\beta, \theta) = \begin{pmatrix} 1 & 0 & 0 & 0 \\ 0 & \cos\frac{\theta}{2} & -ie^{i\beta}\sin\frac{\theta}{2} & 0 \\ 0 & -ie^{i\beta}\sin\frac{\theta}{2} & \cos\frac{\theta}{2} & 0 \\ 0 & 0 & 0 & 1 \end{pmatrix} \quad (54)$$

where $\beta$ is controlled by the phase of the flux pulse.

In some implementations, performance of the quantum logic gate operation can be quantified using randomized benchmarking, quantum process tomography, or cross-entropy benchmarking, etc.

At 1806, the tunable floating coupler device is tuned by changing a coupler flux bias from the gate-activating value to the parking value, after performing the quantum logic gate operation. In some implementations, one of the tunable qubit devices is tuned by changing the qubit coupler flux bias to its parking flux which causes the tunable qubit device to park at the maximum frequency.

Figure 19:
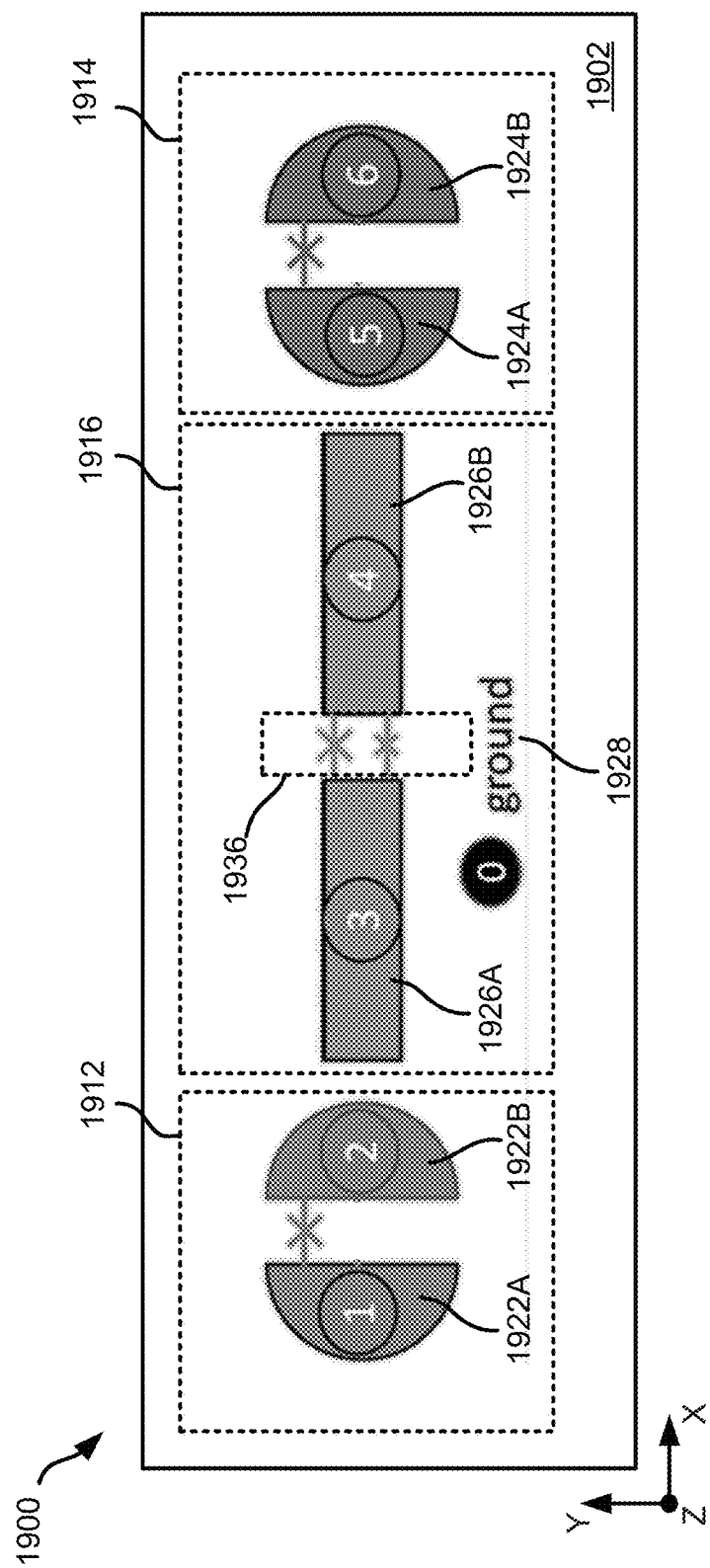
FIG. 19 is a schematic diagram showing a top view of an example quantum processing unit.

FIG. 19 is a schematic diagram showing a top view of an example quantum processing unit 1900. The example quantum processing unit 1900 includes superconducting quantum circuit devices. As shown in FIG. 19, the superconducting quantum circuit devices in the example quantum processing unit 1900 include a first fixed-frequency floating qubit device 1912, a second fixed-frequency floating qubit device 1914, and a tunable floating coupler device 1916. The example quantum processing unit 1900 shown in FIG. 19 resides on the top surface of a substrate 1902. The substrate 1902 may be implemented as the substrate 302 in FIG. 3. In some examples, the first and second fixed-frequency floating qubit devices 1912, 1914 and the tunable floating coupler device 1916 may be implemented by other types of systems, and the features and components represented in FIG. 19 can be extended in a larger two-dimensional or three-dimensional array of devices. The example quantum processing unit 1900 may include additional or different features and components, which may be configured in another manner. For example, the superconducting quantum circuit devices may include readout resonator devices associated with the first and second fixed-frequency floating qubit devices 1912, 1914 for performing readout operations. For another example, the example quantum processing unit 1900 may include flux control lines (e.g., with flux bias devices) for providing flux control signals to the tunable floating coupler device 1916 and performing quantum logic gates.

In some implementations, each of the fixed-frequency floating qubit devices 2002, 2004 has a fixed transition frequency $\omega_{Fj01}, j \in \{1,2\}$. As shown in FIG. 19, each of the first and second fixed-frequency floating qubit devices 1912, 1914 and the tunable floating coupler device 1216 includes a pair of qubit electrodes. The first and second fixed-frequency floating qubit devices 1912, 1914 includes a Josephson junction connected between two qubit electrodes 1922A and 1922B, and between 1924A, 1924B, respectively. The tunable floating coupler device 1916 includes a superconducting circuit loop 1936 between two coupler electrodes 1926A, 1926B and can be implemented as the superconducting circuit loops 336, 1336, or 1436 in FIGS. 3, 13, 14. In some implementations, the tunable floating coupler device 1916 may be controlled with respect to operations described in FIGS. 3 and 17. The electrodes 1922A/1922B, 1924A/1924B, and 1926A/1926B in FIG. 19 may be implemented as the electrodes 322A/322B, 324A/324B, and 326A/326B in FIG. 3, respectively, or in another manner.

Figure 20:
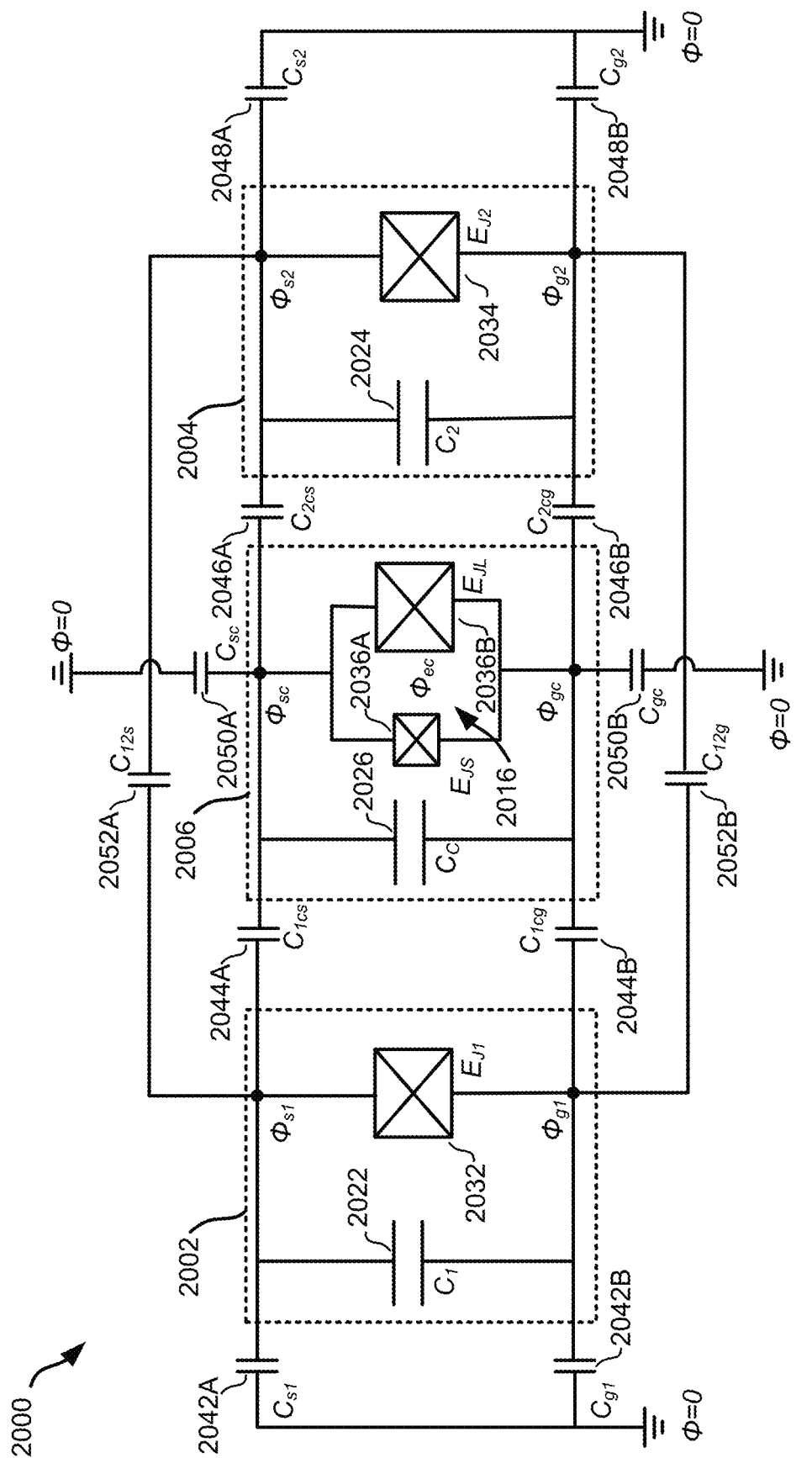
FIG. 20 is a circuit diagram showing an example equivalent circuit of the example quantum processing unit in FIG. 19.

FIG. 20 is a circuit diagram showing an example equivalent circuit 2000 of the example quantum processing unit in FIG. 19. The example equivalent circuit 2000 represented in FIG. 20 includes a first fixed-frequency floating qubit device 2002, a second fixed-frequency floating qubit device 2004, and a tunable floating coupler device 2006. For instance, the equivalent circuit 2000 in FIG. 20 can represent a pair of qubit devices 212B, 212C and the tunable coupler device 214C in the quantum processing unit 204 in FIG. 2, or the equivalent circuit 2000 in FIG. 20 can represent devices in another type of system or environment.

In the example shown in FIG. 20, the tunable floating coupler device 2006 is a tunable-frequency transmon qubit device, which may be implemented as the tunable floating coupler device 406, 606, or 1506 shown in FIG. 4, 6, or 15. As shown, the first fixed-frequency floating qubit device 402 includes a first Josephson junction 2032 having a Josephson energy $E_{J1}$. The first fixed-frequency floating qubit device 2002 also includes a shunt capacitor 2022 with a capacitance $C_1$ caused by two qubit electrodes of the first fixed-frequency floating qubit device 2002, e.g., the two qubit electrodes 1922A, 1922B as shown in the first fixed-frequency floating qubit device 1912 in FIG. 19. The second fixed-frequency floating qubit device 2004 includes a second Josephson junction 2034 having a Josephson energy $E_{J2}$. The second fixed-frequency floating qubit device 2004 also includes a shunt capacitor 2024 with a capacitance $C_2$ caused by two qubit electrodes of the second fixed-frequency floating qubit device 2004, e.g., the two qubit electrodes 1924A, 1924B as shown in the second fixed-frequency floating qubit device 1914 in FIG. 19.

The tunable floating coupler device 2006 includes two Josephson junctions 2036A, 2036B having Josephson energies $E_{JS}$ and $E_{JL}$. The tunable floating coupler device 2006 also includes a shunt capacitor 2026 with a capacitance $C_c$ caused by two coupler electrodes of the tunable floating coupler device 2006, e.g., the two coupler electrodes 1926A, 1926B as shown in the tunable floating coupler device 1916 in FIG. 19.

Each of the fixed-frequency tunable qubit devices 2002, 2004 is capacitively coupled to the tunable floating qubit device 2006 through capacitors 2044A, 2044B, 2046A, 2046B with capacitances $C_{1cs}$, $C_{1cg}$, $C_{2cs}$, $C_{2cg}$. The fixed-frequency tunable qubit devices 2002, 2004 are capacitively coupled to each other through capacitors 2052A, 2052B with capacitances $C_{12s}$, $C_{12g}$.

Figure 21:
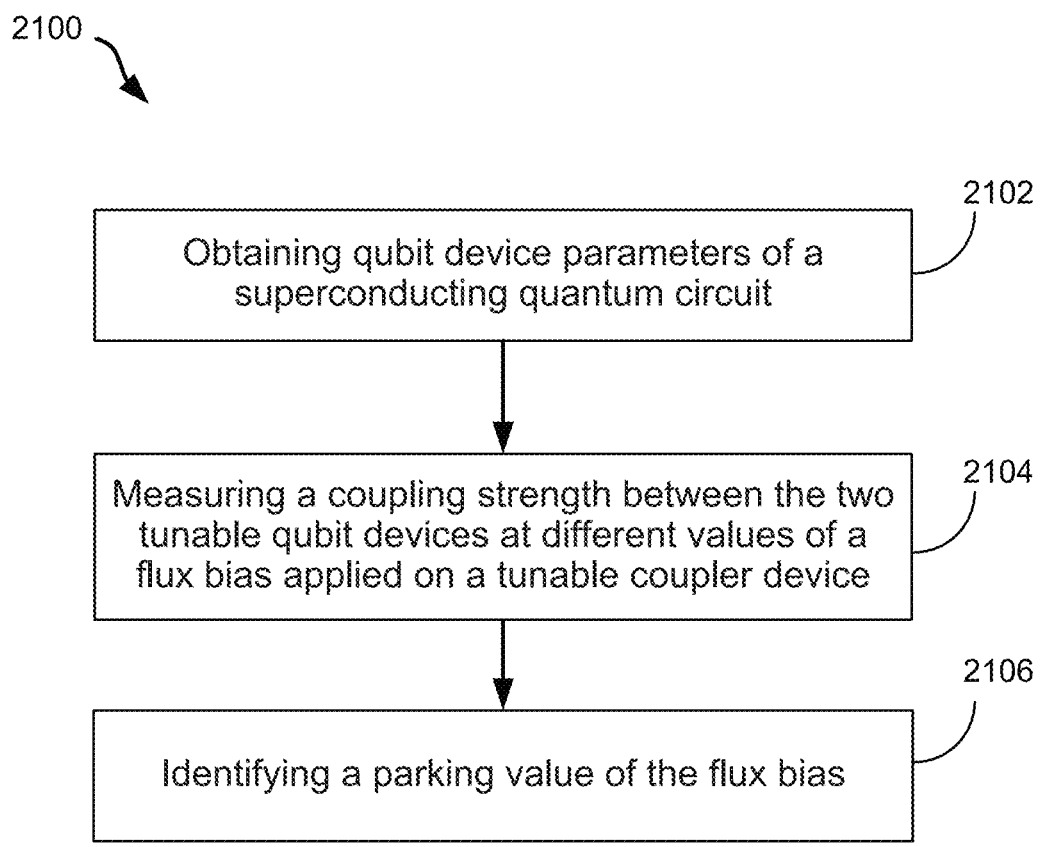
FIG. 21 is a flow chart showing aspects of an example process.

In some implementations, the first and second fixed-frequency floating qubit devices 2002, 2004 and the tunable floating coupler device 2006 may be controlled with respect to operations described FIG. 21.

FIG. 21 is a flow chart showing aspects of an example process 2100. The example process 2100 can be used, for example, to operate a quantum processing unit. For instance, the example process 2100 may be used for determining a parking value of a coupler flux bias applied in a tunable floating coupler device in a quantum processing unit (e.g., the tunable floating coupler device 1916, 2006 shown in FIGS. 19, 20). In some instances, the quantum processing unit includes two fixed-frequency qubit devices. The two fixed-frequency qubit devices can be implemented as the fixed-frequency floating qubit devices in the quantum processing unit 1900, 2000 in FIGS. 19, 20. In certain instances, the two fixed-frequency qubit devices may be implemented as fixed-frequency grounded qubit devices. In some implementations, the quantum processing unit may include other superconducting quantum circuit devices, for example, readout resonator devices, flux bias devices, control lines, connections (e.g., capacitive coupling, galvanic coupling, inductive coupling, or combinations thereof). The example process 2100 may include additional or different operations, and the operations can be performed in the order shown or in another order.

In some implementations, one or more operations in the example process 2100 can be performed by a computer system, for instance, by a digital computer system having one or more digital processors (e.g., a microprocessor or other data processing apparatus) that execute instructions (e.g., instructions stored in a digital memory or other computer-readable medium), or by another type of digital, quantum, or hybrid computer system. As an example, in some cases the quantum processing unit can be deployed as the quantum processing unit 102 shown in FIG. 1, and operations in the example process 2100 shown in FIG. 21 can be controlled, executed, or initiated by one or more components of the control system 105 shown in FIG. 1.

At 2102, device parameters of the fixed-frequency qubit devices are obtained. In some implementations, the operation may be implemented with respect to the operation 1702 in the example process 1700 or in another manner.

At 2104, a total coupling strength of the two fixed-frequency qubit devices is measured. In some instances, the total coupling strength of the two fixed-frequency qubit devices is measured at different values of a coupler flux bias applied to the tunable floating coupler device. For example, a first value of the coupler flux bias can be applied to the tunable floating coupler device causing the tunable floating coupler device to park at the maximal frequency. A cross-Ramsey type experiment can be performed to measure a total coupling strength $\zeta$ of the ZZ coupling. A conditional phase accumulation $\varphi$ of a first fixed-frequency qubit device can be measured while initializing a second fixed-frequency qubit device in one of its state, e.g., ground or excited state. The conditional phase accumulation $\varphi$ can be measured at full periods of the swap oscillation of $|10\rangle$ and $|01\rangle$ states of the two fixed-frequency qubit devices, where the net amount of excitation exchange is zero. In some instances, the total strength $\zeta$ of the ZZ coupling can be obtained by dividing the conditional phase accumulation $\varphi$ by the swap period. This process is repeated as the coupler flux bias is varied from the first value to a second value of the coupler flux bias causing the tunable floating coupler device to park at the minimal frequency. In some instances, the total strength $\zeta$ of the ZZ coupling as a function of the coupler flux bias may be determined in another manner.

At 2106, a parking value of the coupler flux bias is identified. In some instances, the parking value of the coupler flux bias is identified as the value of the coupler flux bias at a vanishing total strength $\zeta$ of the ZZ coupling, e.g., $\zeta=0$ or $\zeta_{th}$. In certain instances, the predetermined threshold value (e.g., $\zeta_{th}$) of the total strength of the ZZ coupling is determined according to a performance parameter, e.g., a target gate fidelity, or a target error rate of a single-qubit quantum logic gate. For example, a different gate fidelity value may result in a different threshold value for the total coupling strength. In some instances, a gate-activating value of the coupler flux bias can be also identified. In certain examples, the gate-activating value of the coupler flux bias is a value of the coupler flux bias that causes the total strength $\zeta$ of the ZZ coupling to reach a local maximal value. In some instances, the gate-activating value of the coupler flux bias is a value that causes the tunable floating coupler device to park at the minimal frequency or another value.

In some implementations, after identifying the parking value, entangling quantum logic gates can be activated by parametrically modulating the coupler flux bias at half the frequency difference of the transition frequencies of the two fixed-frequency qubit devices.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

In a general aspect, a quantum processing unit with tunable coupler devices is presented.

In a first example, a superconducting quantum processing unit includes a first qubit device, a second qubit device, and a tunable floating coupler device which is coupled between the first and second qubit devices. Values of a coupling strength of the first and second qubit devices are measured, by operation of a control system, at a plurality of operating points of the tunable floating coupler device. The operating points correspond to respective values of a magnetic flux applied to the tunable floating coupler device. Based on the measured values of the coupling strength, a parking value of the magnetic flux applied to the tunable floating coupler device is identified by operation of the control system. The parking value of the magnetic flux corresponds to a magnitude of the coupling strength which is less than or equal to a threshold value. The threshold value is associated with a target gate fidelity for the superconducting quantum processing unit.

Implementations of the first example may include one or more of the following features. The coupling strength includes a first coupling strength of an XX coupling of the first and second qubit devices or a second coupling strength of a ZZ coupling of the first and second qubit devices. The coupling strength (g) comprises a static coupling strength component ($g_{12}$) and an effective virtual coupling strength component ($g_{eff}$). The effective virtual coupling strength component ($g_{eff}$), coupling strengths of the first or the second qubit devices, and the tunable floating coupler device ($g_{1c}$ and $g_{2c}$), a transition frequency of the tunable floating coupler device ($\omega_c$), and transition frequencies of the first and second qubit devices ($\omega_j$), are related such that, $$g_{eff} = \frac{g_{1c}g_{2c}}{2}\sum_{j=1,2}\left(\frac{1}{\omega_c - \omega_j} + \frac{1}{\omega_c + \omega_j}\right).$$

Implementations of the first example may include one or more of the following features. The parking value of the magnetic flux corresponds to the coupling strength being zero. The coupling strength comprises a coupling strength ($\zeta$) of a ZZ coupling of the first and second qubit devices. The coupling strength of the ZZ coupling that the parking value of the magnetic flux corresponds to, the target gate fidelity (F), and a gate time ($t_g$) of a single-qubit quantum logic gate are related such that $$\zeta \leq \frac{2}{t_g}\sqrt{6(1-F)}.$$

The target gate fidelity of a single-qubit quantum logic gate is 0.9999, and the parking value of the magnetic flux corresponds to the coupling strength $$\left(\frac{\zeta}{2\pi}\right)$$

is less than or equal to 260 kilohertz (kHz).

Implementations of the first example may include one or more of the following features. The tunable floating coupler device includes two qubit electrodes that are electrically floating and not directly connected to ground. Each of the first and second qubit devices includes at least one qubit electrode. A capacitance between the at least one qubit electrode of the first qubit device and the at least one qubit electrode of the second qubit device is equal to zero. Each of the first and second qubit devices includes two qubit electrodes, and one of the two qubit electrodes is conductively connected to ground. Each of the first and second qubit devices includes two qubit electrodes capacitively connected to ground.

Implementations of the first example may include one or more of the following features. The first qubit device includes a first fixed-frequency qubit device; and the second qubit device includes a second fixed-frequency qubit device. Each of the values of the coupling strength are measured by a process. The process includes initializing the first fixed-frequency qubit device in one of a ground state or an excited state; and measuring a conditional phase accumulation of the second fixed-frequency qubit device.

Implementations of the first example may include one or more of the following features. The first qubit device comprises a first tunable qubit device; and the second qubit device comprises a second tunable qubit device. When the values of the coupling strength of the first and second qubit devices is measured at the plurality of operating points of the tunable floating coupler device, at least one of the first and second tunable qubit devices is tuned to bring the first and second tunable qubit devices into resonance with each other; and, while the first and second tunable qubit devices are in resonance with each other, the values of the coupling strength of the first and second tunable qubit devices are measured at the plurality of operating points. Before the at least one of the first and second tunable qubit devices is tuned, values of device parameters of the superconducting quantum processing unit are determined. The device parameters comprise at least one of a range of operating frequencies and anharmonicities of the first and second tunable qubit devices. When the values of the coupling strength of the first and second tunable qubit devices are measured at the plurality of operating points of the tunable floating coupler device, iteratively, a first value of the magnetic flux is applied to the tunable floating coupler device, which tunes the tunable floating coupler device to a first frequency value; a first pulse is applied on the first tunable qubit device while the tunable floating coupler device is tuned to the first frequency value; an oscillation of a population of the second tunable qubit device is measured; and a first value of the coupling strength is determined according to a period of the oscillation. When the at least one of the first and second tunable qubit devices are tuned, control signals are applied to the superconducting quantum processing unit. The control signals control respective magnetic fluxes applied to the first and second tunable qubit devices, and parameters of the control signals are determined according to the values of the device parameters. The superconducting quantum processing unit includes a first flux bias device associated with the first tunable qubit device, a second flux bias device associated with the second tunable qubit device, and a coupler flux bias device associated with the tunable floating coupler device. When the control signals are applied, a first control signal is applied on the first flux bias device; a second control signal is applied on the second flux bias device; and a third control signal is applied on the coupler flux bias device.

In a second example, a quantum computing system includes a superconducting quantum processing unit and a control system. The superconducting quantum processing unit includes a first qubit device, a second qubit device, and a tunable floating coupler device coupled between the first and second qubit devices. The control system is communicably coupled to the superconducting quantum processing unit and is configured to perform one or more operations of the first example.

In a third example, a superconducting quantum processing unit includes a first qubit device, a second qubit device, and a tunable floating coupler device coupled between the first and second qubit devices. The tunable floating coupler device is tuned, by operation of a control system, by changing a magnetic flux applied to the tunable floating coupler device from a parking value to a gate-activating value. While the magnetic flux is at the gate-activating value, one or more control signals are applied, by operation of the control system, to at least one of the first and second qubit devices to perform a multi-qubit quantum logic gate on qubits defined by the first and second qubit devices. After performing the multi-qubit quantum logic gate, the tunable floating coupler device is tuned, by operation of the control system, by changing the magnetic flux from the gate-activating value to the parking value.

Implementations of the third example may include one or more of the following features. Each of the first and second qubit devices comprises two qubit electrodes; and one of the two qubit electrodes is conductively connected to ground. The gate-activating value is associated with the coupling strength having a maximal magnitude. Each of the first and second qubit devices includes two qubit electrodes capacitively coupled to ground. The first qubit device includes a first tunable qubit device; and the second qubit device includes a second tunable qubit device. The first qubit device includes a first fixed-frequency qubit device; and the second qubit device includes a second fixed-frequency qubit device. The parking value of the magnetic flux corresponds to a coupling strength of the first and second qubit devices being less than or equal to a threshold value associated with a target gate fidelity for the superconducting quantum processing unit. The parking value of the magnetic flux, when applied to the tunable floating coupler device, causes the coupling strength to be zero.

Implementations of the third example may include one or more of the following features. When the one or more control signals are applied to the at least one of the first and second qubit device, a coupling of the first and second qubit devices is allowed to evolve for a predetermined time period. The first qubit device includes a first tunable qubit device; the second qubit device includes a second tunable qubit device; the quantum logic gate includes a parametric two-qubit quantum logic gate applied to a pair of qubits defined by the first and second tunable qubit devices. When the one or more control signals are applied to the at least one of the first and second qubit device, a magnetic flux applied to at least one of the first and second tunable qubit devices is modulated.

In a fourth example, a quantum computing system includes a superconducting quantum processing unit and a control system. The superconducting quantum processing unit includes a first qubit device, a second qubit device, and a tunable floating coupler device coupled between the first and second qubit devices. The control system is communicably coupled to the superconducting quantum processing unit and is configured to perform one or more operations of the third example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A quantum computing system comprising:
a superconducting quantum processing unit comprising a first qubit device, a second qubit device, and a tunable floating coupler device coupled between the first and second qubit devices; and
a control system communicably coupled to the superconducting quantum processing unit, the control system configured to perform operations comprising:
measuring values of a coupling strength of the first and second qubit devices at a plurality of operating points of the tunable floating coupler device, wherein the operating points correspond to respective values of a magnetic flux applied to the tunable floating coupler device; and
based on the measured values of the coupling strength, identifying a parking value of the magnetic flux applied to the tunable floating coupler device, wherein the parking value of the magnetic flux corresponds to a magnitude of the coupling strength being less than or equal to a threshold value associated with a target gate fidelity for the superconducting quantum processing unit.

2. The quantum computing system of claim 1, wherein the coupling strength comprises a first coupling strength of an XX coupling of the first and second qubit devices or a second coupling strength of a ZZ coupling of the first and second qubit devices.

3. The quantum computing system of claim 1, wherein:
the coupling strength (g) comprises a static coupling strength component ($g_{12}$) and an effective virtual coupling strength component ($g_{eff}$); and
the effective virtual coupling strength component ($g_{eff}$), coupling strengths of the first or the second qubit devices and the tunable floating coupler device ($g_{1c}$ and $g_{2c}$), a transition frequency of the tunable floating coupler device ($\omega_c$), and transition frequencies of the first and second qubit devices ($\omega_j$), are related such that, $$g_{eff} = \frac{g_{1c} g_{2c}}{2} \sum_{j=1,2} \left( \frac{1}{\omega_c - \omega_j} + \frac{1}{\omega_c + \omega_j} \right).$$

4. The quantum computing system of claim 1, wherein the parking value of the magnetic flux corresponds to the coupling strength being zero.

5. The quantum computing system of claim 1, wherein the coupling strength comprises a coupling strength of a ZZ coupling of the first and second qubit devices, and the threshold value is determined based on a gate time.

6. The quantum computing system of claim 1, wherein the coupling strength comprises a coupling strength of a ZZ coupling of the first and second qubit devices, and the threshold value is equal to $$\frac{2}{t_g}\sqrt{6(1-F)},$$

where F represents the target gate fidelity, and $t_g$ represents a gate time ($t_g$) of a single-qubit quantum logic gate associated with the target gate fidelity.

7. The quantum computing system of claim 6, wherein the target gate fidelity is 0.9999, and the threshold value is less than or equal to 260 kilohertz (kHz).

8. The quantum computing system of claim 1, wherein the tunable floating coupler device comprises two coupler electrodes that are electrically floating.

9. The quantum computing system of claim 1, wherein each of the first and second qubit devices comprises at least one qubit electrode, and a capacitance between the at least one qubit electrode of the first qubit device and the at least one qubit electrode of the second qubit device is equal to zero.

10. The quantum computing system of claim 1, wherein each of the first and second qubit devices comprises two qubit electrodes, and one of the two qubit electrodes is conductively connected to ground.

11. The quantum computing system of claim 1, wherein each of the first and second qubit devices comprises two qubit electrodes capacitively connected to ground.

12. The quantum computing system of claim 1, wherein the first qubit device comprises a first fixed-frequency qubit device, the second qubit device comprises a second fixed-frequency qubit device, and each of the values of the coupling strength are measured by a process comprising:
  initializing the first fixed-frequency qubit device in one of a ground state or an excited state; and
  measuring a conditional phase accumulation of the second fixed-frequency qubit device.

13. The quantum computing system of claim 1, wherein the first qubit device comprises a first tunable qubit device, the second qubit device comprises a second tunable qubit device, and measuring the values of the coupling strength of the first and second qubit devices at the plurality of operating points of the tunable floating coupler device comprises:
  tuning at least one of the first and second tunable qubit devices to bring the first and second tunable qubit devices into resonance with each other; and
  while the first and second tunable qubit devices are in resonance with each other, measuring the values of the coupling strength of the first and second tunable qubit devices at the plurality of operating points.

14. The quantum computing system of claim 13, comprising:
  before tuning the at least one of the first and second tunable qubit devices, determining values of device parameters of the superconducting quantum processing unit.

15. The quantum computing system of claim 14, wherein the device parameters comprise at least one of a range of operating frequencies and anharmonicities of the first and second tunable qubit devices.

16. The quantum computing system of claim 14, wherein measuring the values of the coupling strength of the first and second tunable qubit devices at the plurality of operating points of the tunable floating coupler device comprises iteratively:
  applying a first value of the magnetic flux to the tunable floating coupler device, which tunes the tunable floating coupler device to a first frequency value;
  applying a first pulse to the first tunable qubit device while the tunable floating coupler device is tuned to the first frequency value;
  measuring an oscillation of a population of the second tunable qubit device; and
  determining a first value of the coupling strength according to a period of the oscillation.

17. The quantum computing system of claim 14, wherein tuning the at least one of the first and second tunable qubit devices comprises:
  applying control signals to the superconducting quantum processing unit, the control signals control respective magnetic fluxes applied to the first and second tunable qubit devices, and parameters of the control signals are determined according to the values of the device parameters.

18. The quantum computing system of claim 17, wherein the superconducting quantum processing unit comprises a first flux bias device associated with the first tunable qubit device, a second flux bias device associated with the second tunable qubit device, and a coupler flux bias device associated with the tunable floating coupler device, and applying the control signals comprises:
  applying a first control signal on the first flux bias device;
  applying a second control signal on the second flux bias device; and
  applying a third control signal on the coupler flux bias device.

19. A quantum computing system comprising:
  a superconducting quantum processing unit comprising a first qubit device, a second qubit device, and a tunable floating coupler device coupled between the first and second qubit devices; and
  means for identifying a parking value of a magnetic flux applied to the tunable floating coupler device, wherein the parking value of the magnetic flux corresponds to a magnitude of the coupling strength being less than or equal to a threshold value associated with a target gate fidelity for the superconducting quantum processing unit.

* * * * *